US008308555B2

(12) United States Patent
Kojima

(10) Patent No.: US 8,308,555 B2
(45) Date of Patent: *Nov. 13, 2012

(54) GAMING MACHINE

(75) Inventor: Sakiko Kojima, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/043,243

(22) Filed: Mar. 8, 2011

(65) Prior Publication Data

US 2011/0159947 A1 Jun. 30, 2011

Related U.S. Application Data

(63) Continuation of application No. 11/808,917, filed on Jun. 13, 2007, now Pat. No. 7,922,580.

(30) Foreign Application Priority Data

Jun. 13, 2006 (JP) ................................ 2006-163111

(51) Int. Cl.
*G06F 17/00* (2006.01)

(52) U.S. Cl. ........................................................ 463/25

(58) Field of Classification Search .............. 463/16–25, 463/40–43; 273/143 R
See application file for complete search history.

(56) References Cited

U.S. PATENT DOCUMENTS

| | | | | |
|---|---|---|---|---|
| 7,207,883 | B2 | 4/2007 | Nozaki et al. | |
| 7,651,393 | B2 | 1/2010 | Okada et al. | |
| 7,690,998 | B2 | 4/2010 | Okada | |
| 8,128,482 | B2 * | 3/2012 | Yoshizawa | 463/20 |
| 2001/0021666 | A1 | 9/2001 | Yoshida et al. | |
| 2007/0287524 | A1 * | 12/2007 | Sato | 463/20 |
| 2008/0153569 | A1 * | 6/2008 | Tanabe | 463/20 |
| 2009/0104972 | A1 * | 4/2009 | Itagaki et al. | 463/20 |
| 2009/0233712 | A1 * | 9/2009 | Okada | 463/35 |
| 2010/0184511 | A1 * | 7/2010 | Hirato et al. | 463/30 |

FOREIGN PATENT DOCUMENTS

| | | | |
|---|---|---|---|
| JP | 2001-286601 | A | 10/2001 |
| JP | 2002-320713 | A | 11/2002 |

* cited by examiner

*Primary Examiner* — Ronald Laneau

(74) *Attorney, Agent, or Firm* — KMF Patent Services, PLLC; Kenneth M. Fagin, Esq.

(57) ABSTRACT

A gaming machine is provided so as to comprise: a display device for displaying symbols variably and statically; a starting device for an operation to start a variable display of the symbols; a storage device for storing a plurality of predictive effect images corresponding to respective payout levels; and a processor being operable to: conduct an internal lottery to determine a combination of symbols to be displayed statically; select one of the predictive effect images corresponding to a predetermined winning combination when it is determined that the determined combination to be displayed statically matches the predetermined winning combination; and cause the selected one predictive effect image to be displayed as well as the variable display of symbols, wherein the plurality of predictive effect images indicate a degree of the payout levels such that a payout level to be awarded can be expected before an operation to stop the variable display.

9 Claims, 64 Drawing Sheets

Fig.8A1
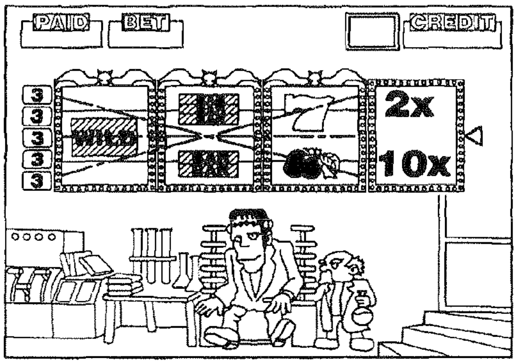
Fig.8A2
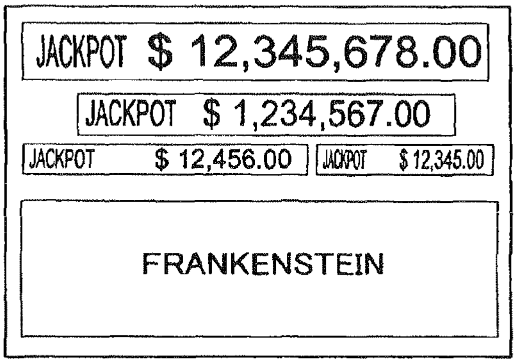
Fig.8B1
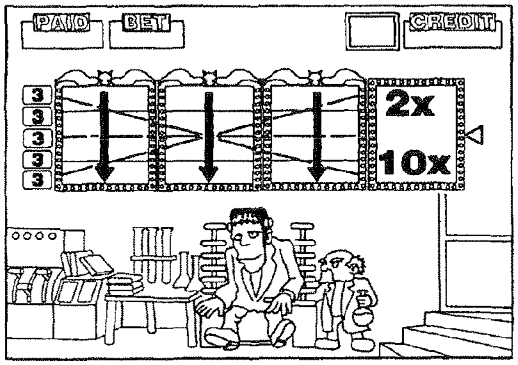
Fig.8B2
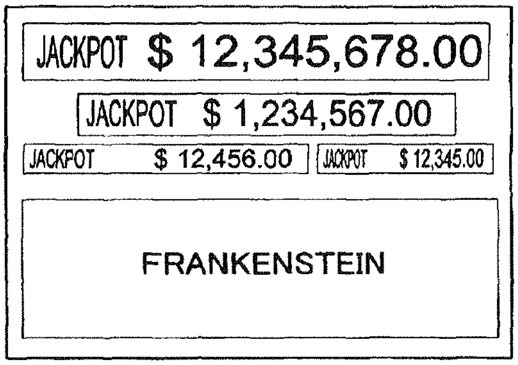
Fig.8C1
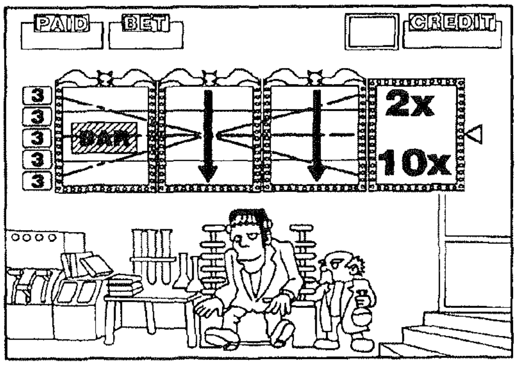
Fig.8C2
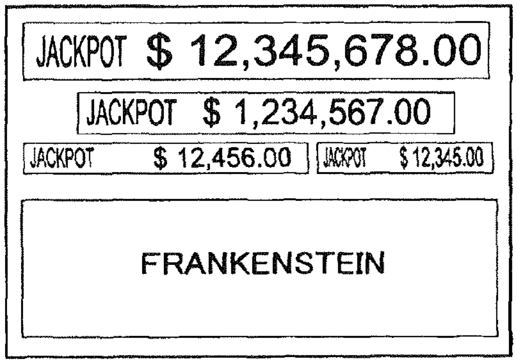

Fig.9A1
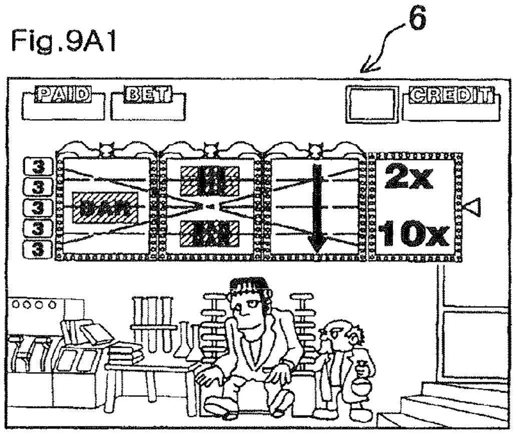
Fig.9A2
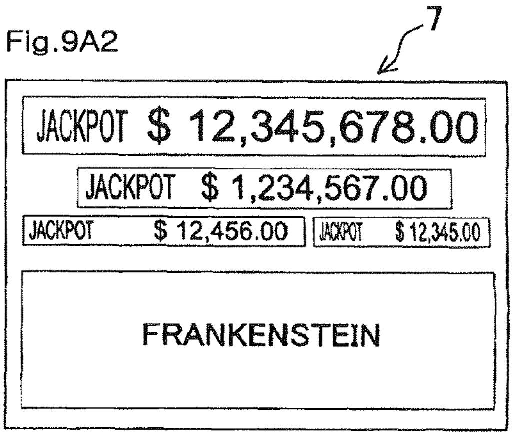
Fig.9B1
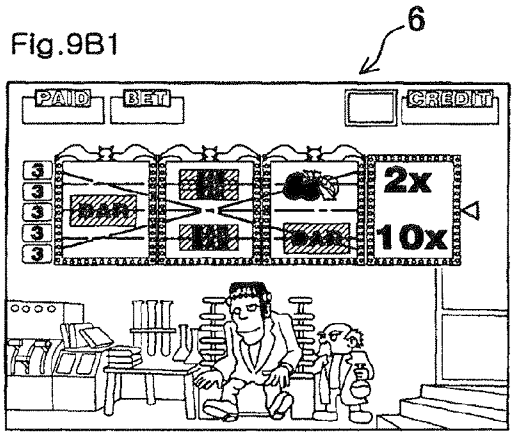
Fig.9B2
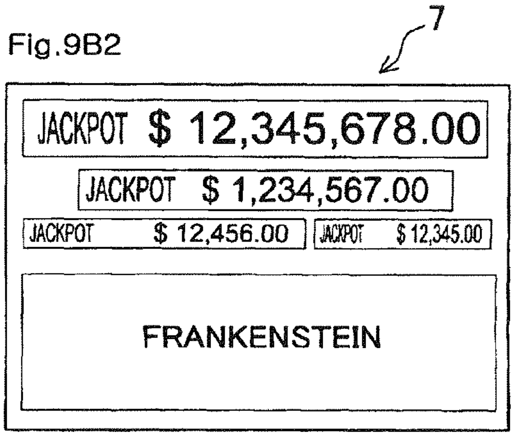
Fig.9C1
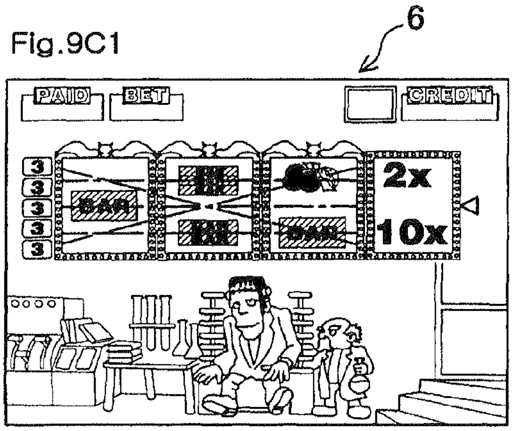
Fig.9C2
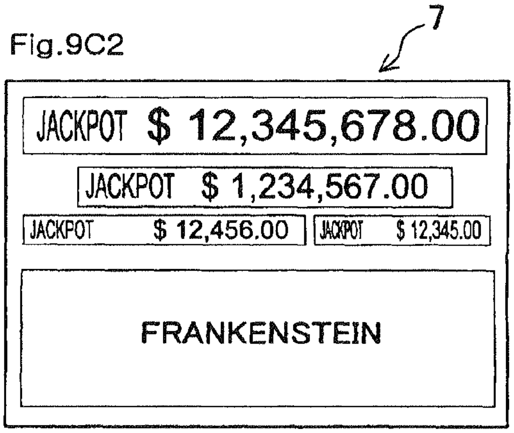

Fig.10A1
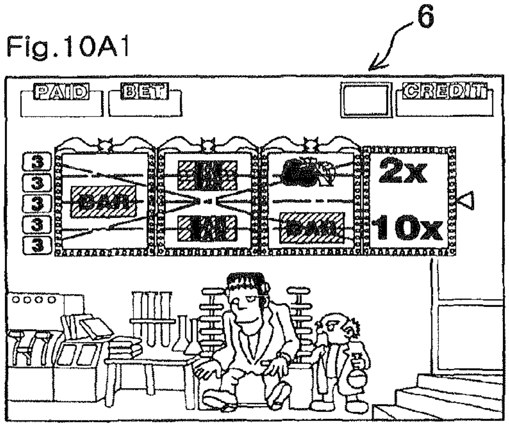
Fig.10A2
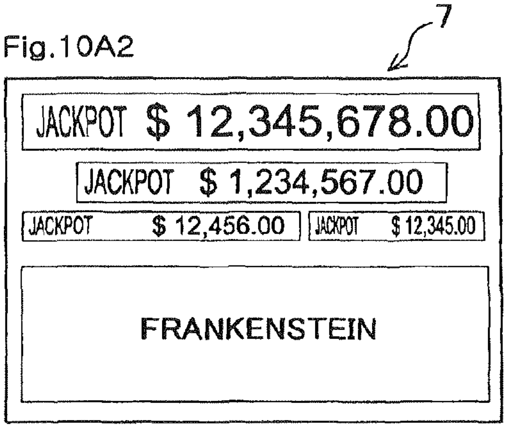
Fig.10B1
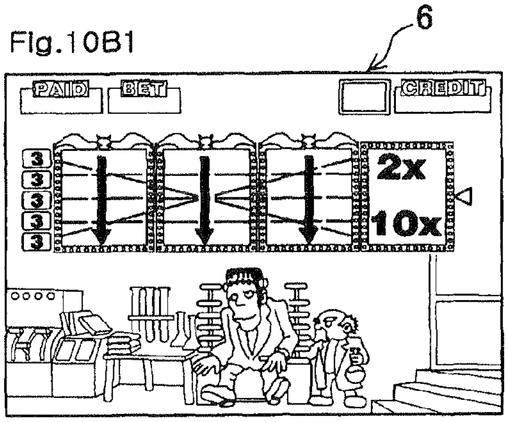
Fig.10B2
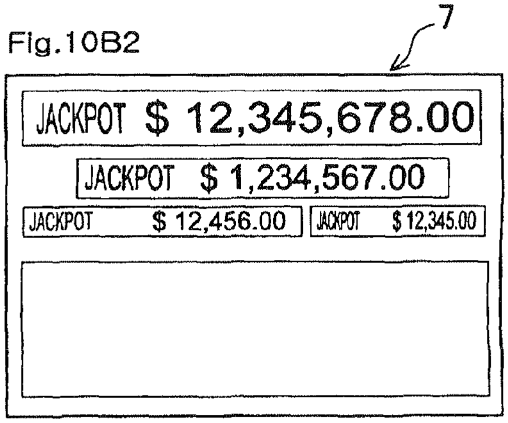
Fig.10C1
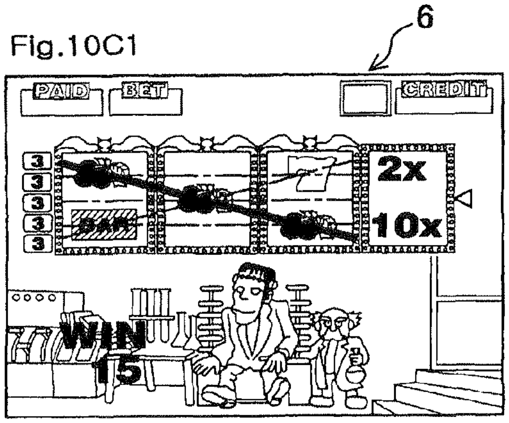
Fig.10C2
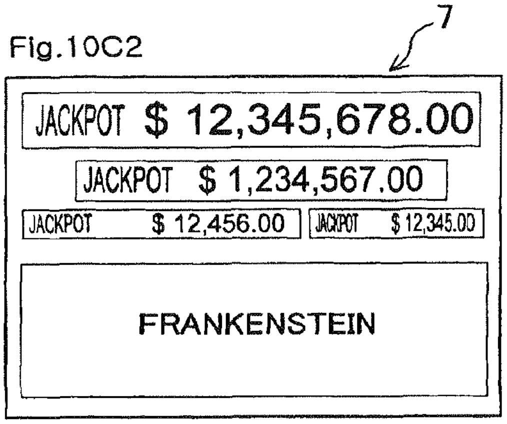

Fig.11A1
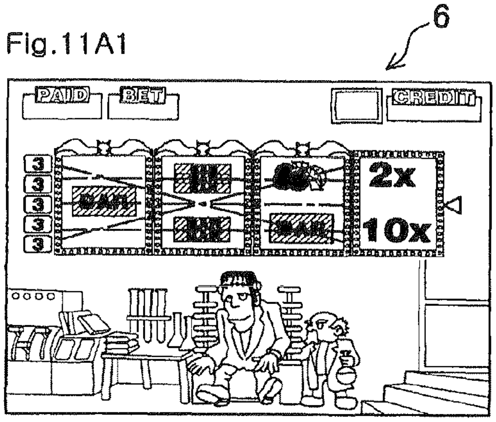
Fig.11A2
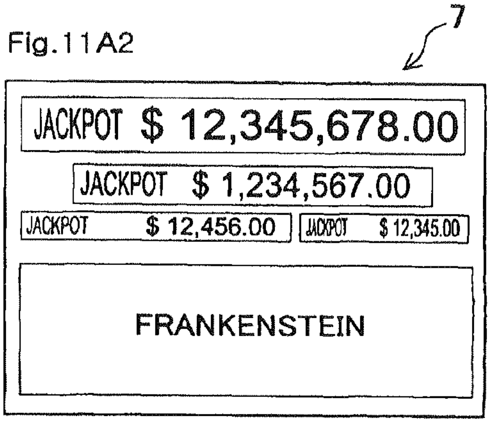
Fig.11B1
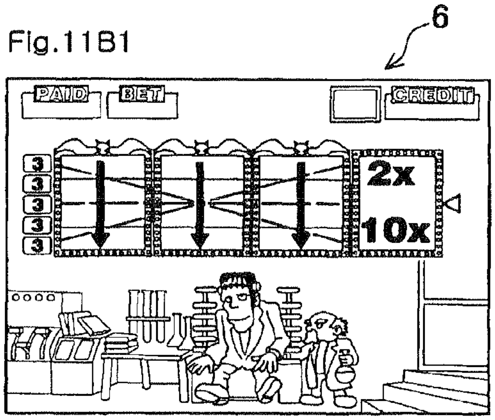
Fig.11B2
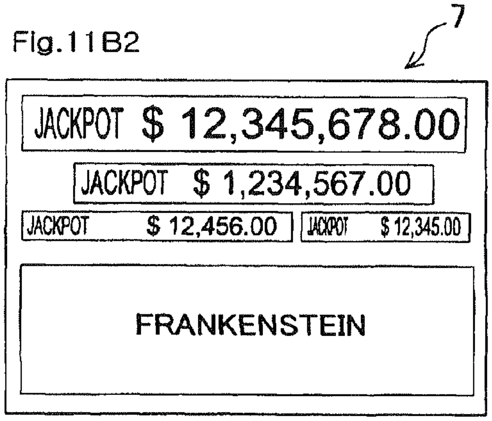
Fig.11C1
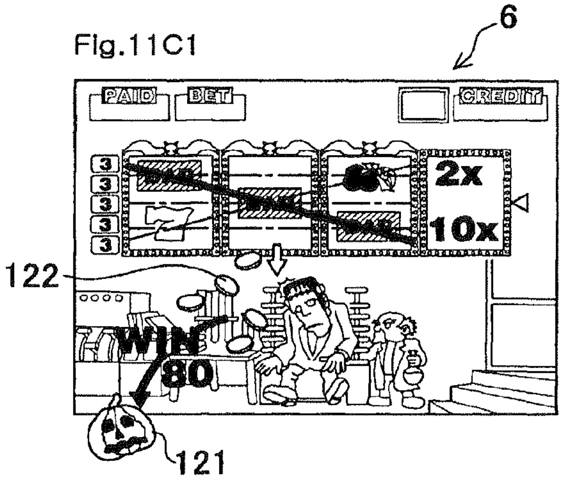
Fig.11C2
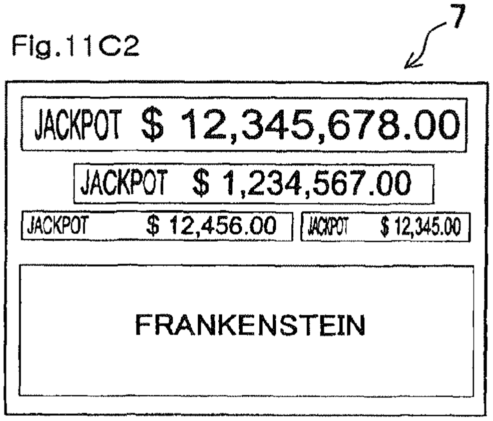

Fig.12A1
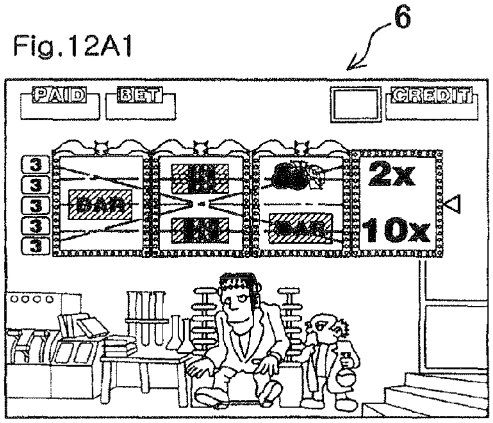
Fig.12A2
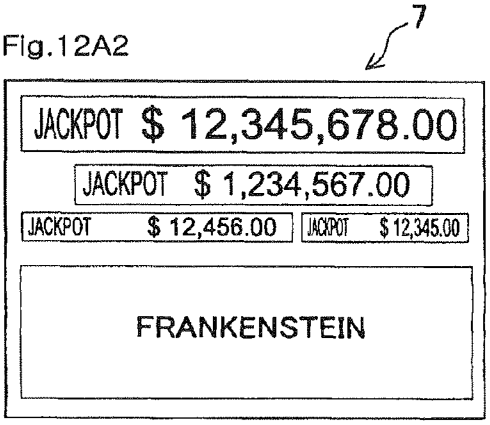
Fig.12B1
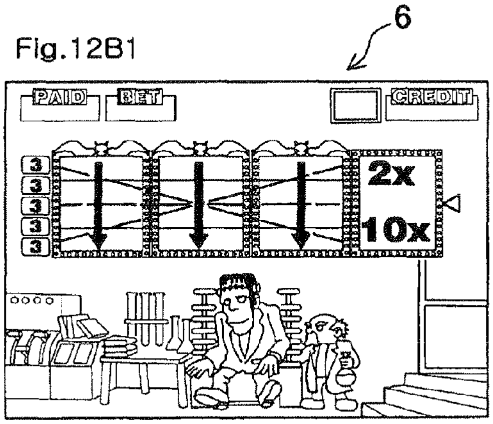
Fig.12B2
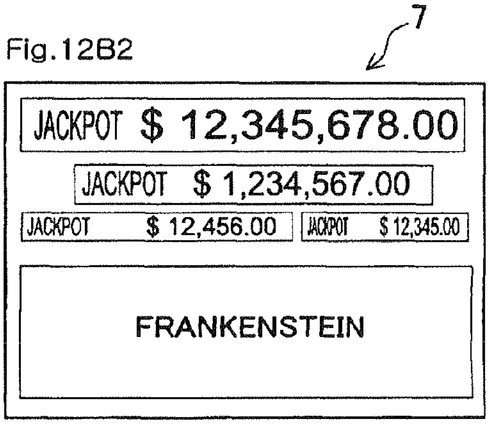
Fig.12C1
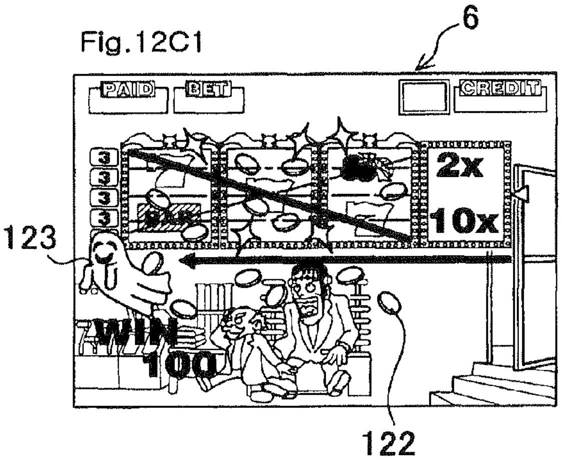
Fig.12C2
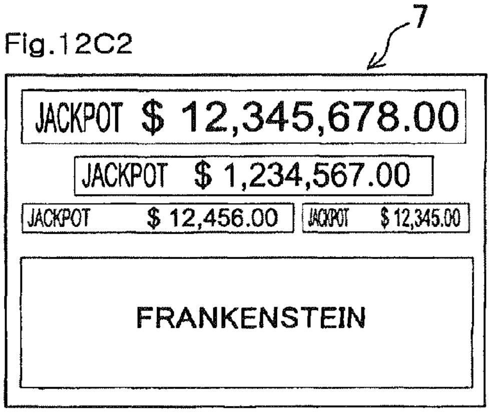

Fig.13A1
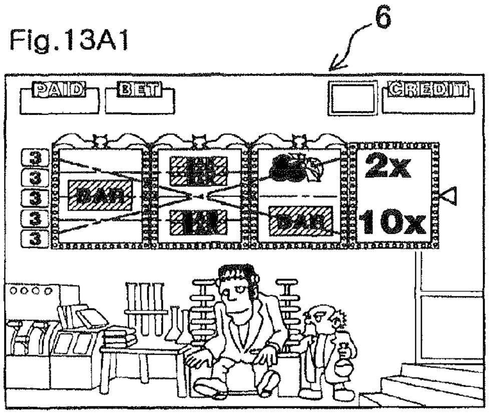
Fig.13A2
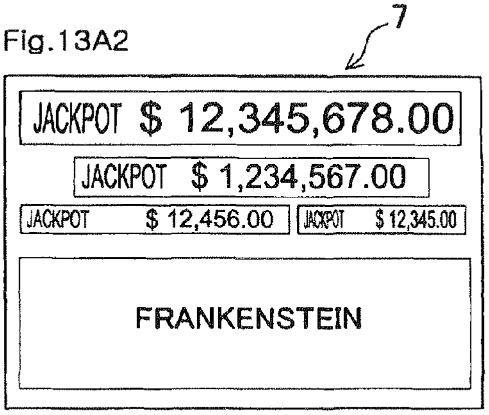
Fig.13B1
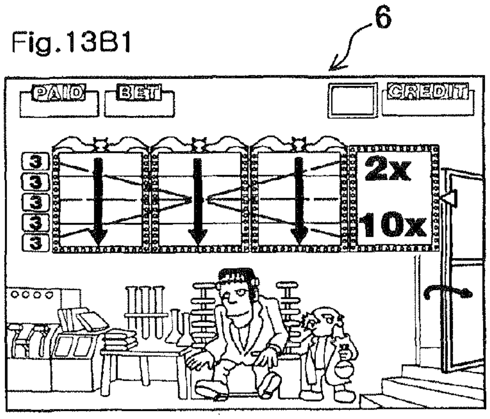
Fig.13B2
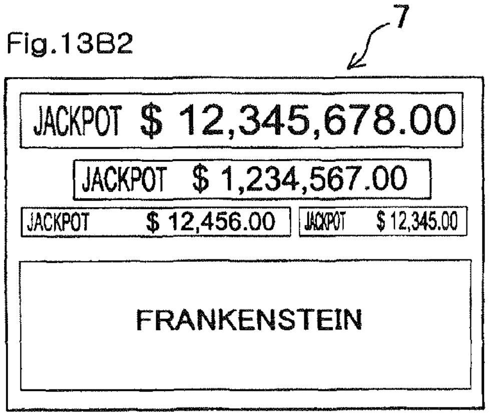
Fig.13C1
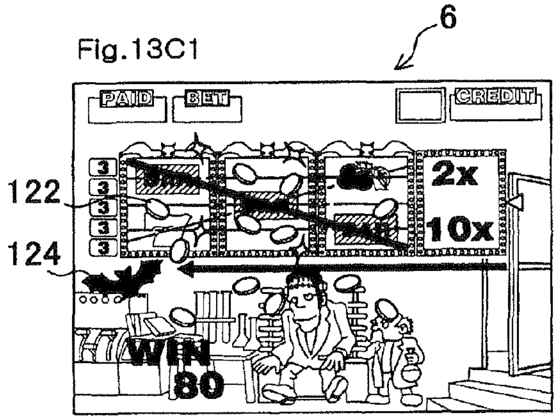
Fig.13C2
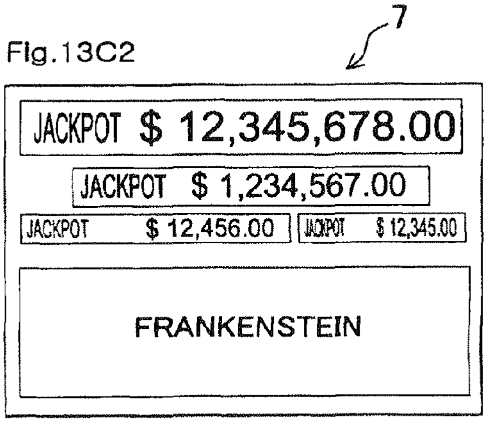

Fig.14A1
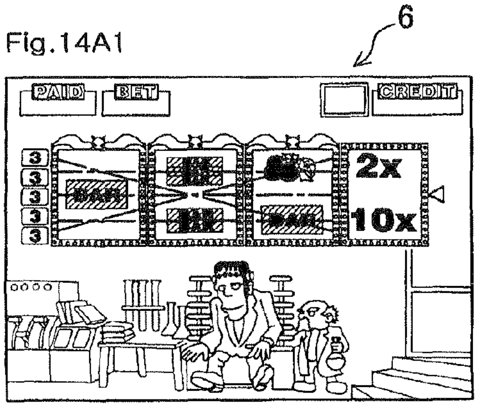
Fig.14A2
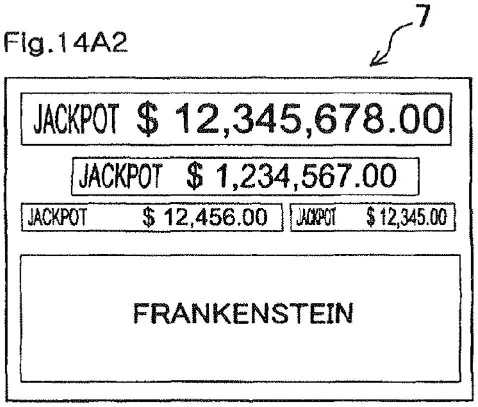
Fig.14B1
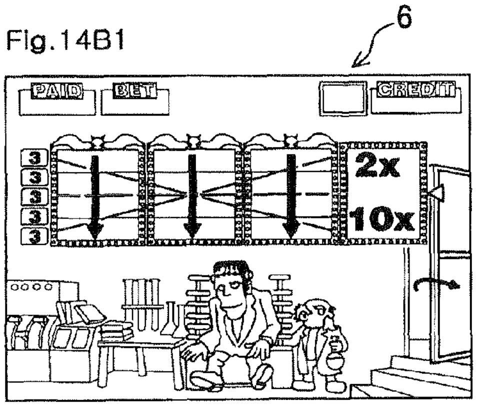
Fig.14B2
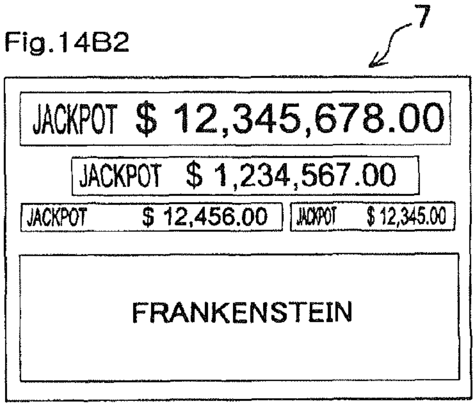
Fig.14C1
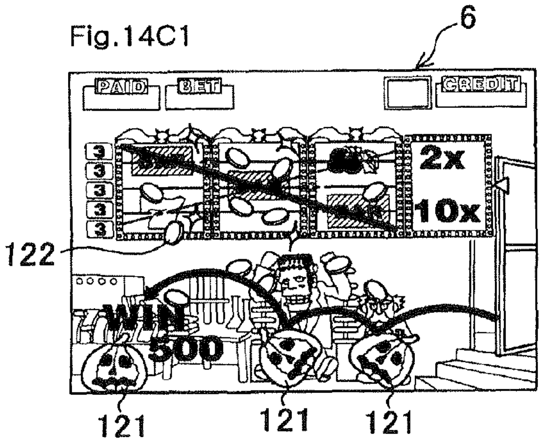
Fig.14C2
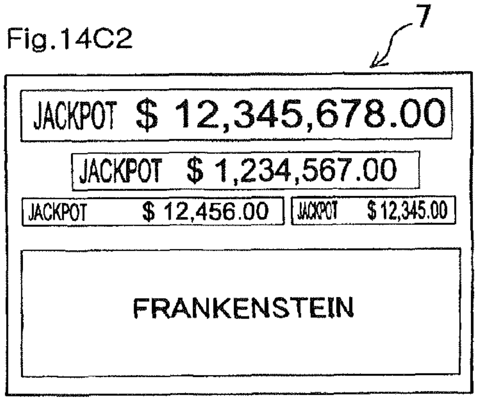

Fig.15A1
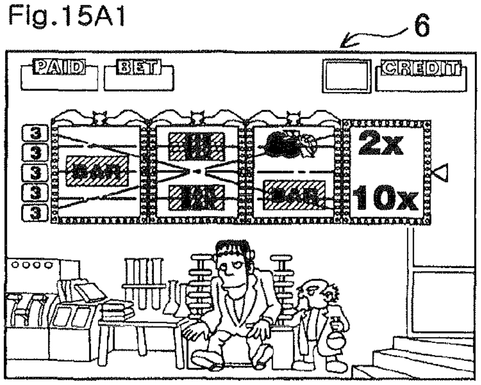
Fig.15A2
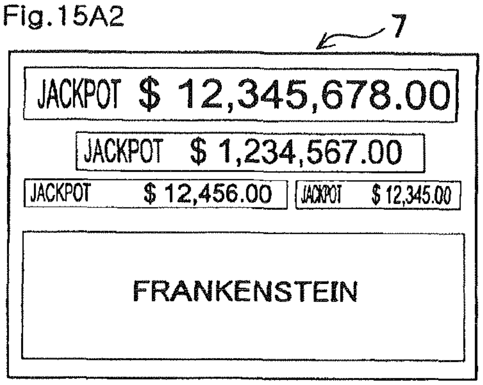
Fig.15B1
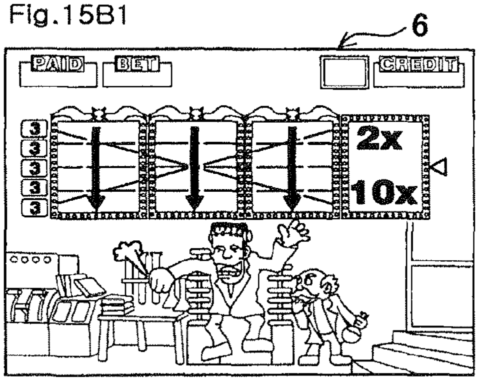
Fig.15B2
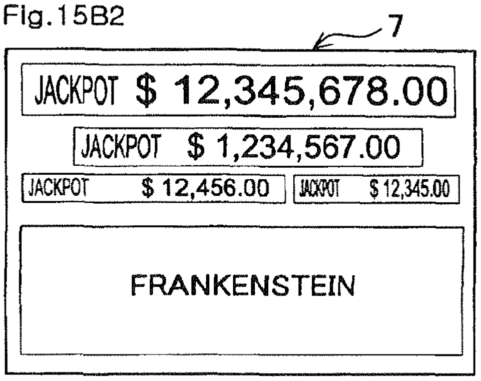
Fig.15C1
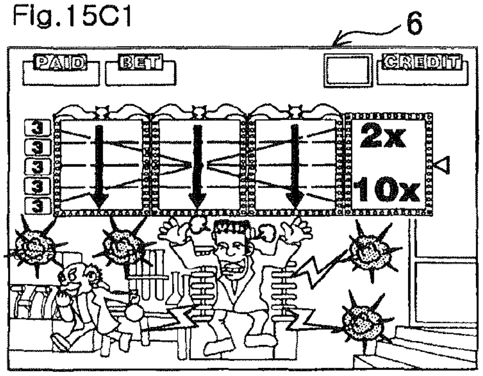
Fig.15C2
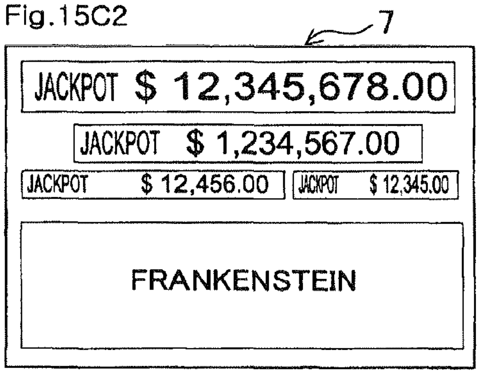
Fig.15D1
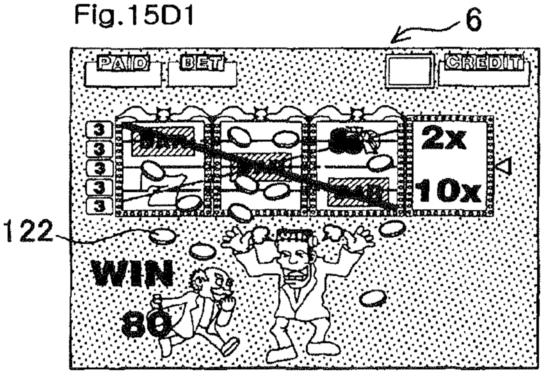
Fig.15D2
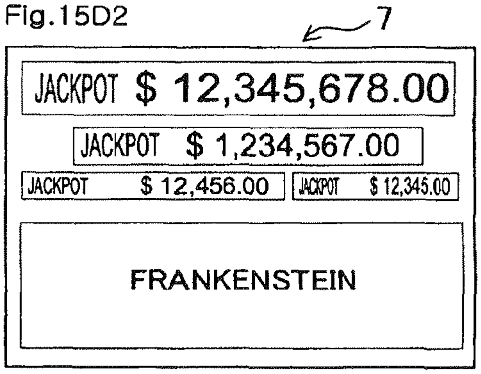

Fig.16A1
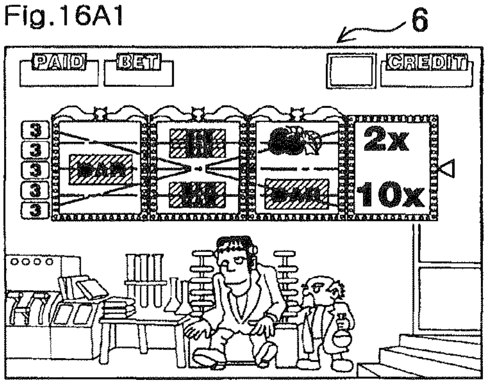
Fig.16A2
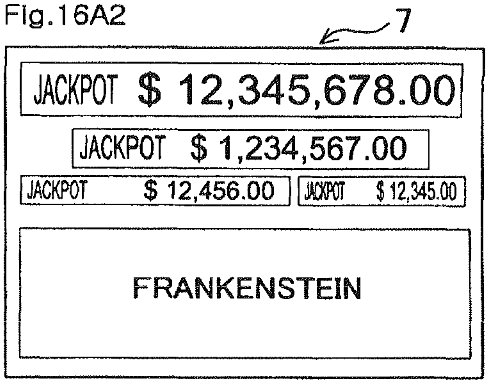
Fig.16B1
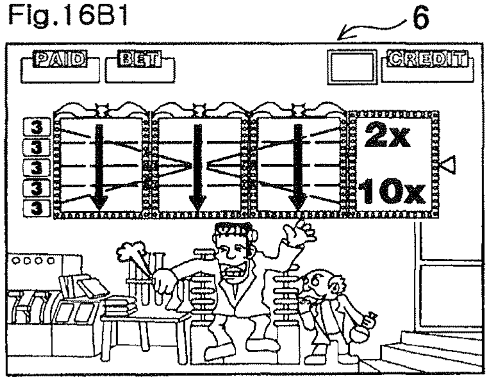
Fig.16B2
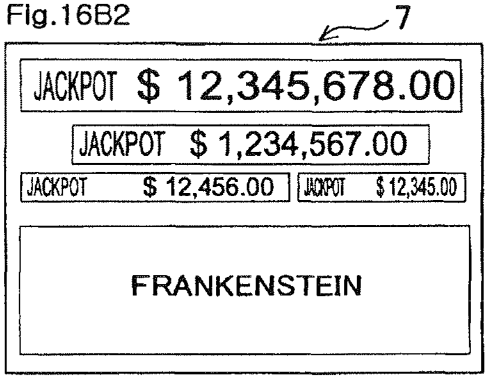
Fig.16C1
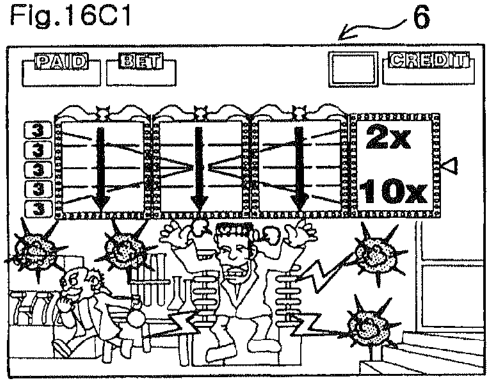
Fig.16C2
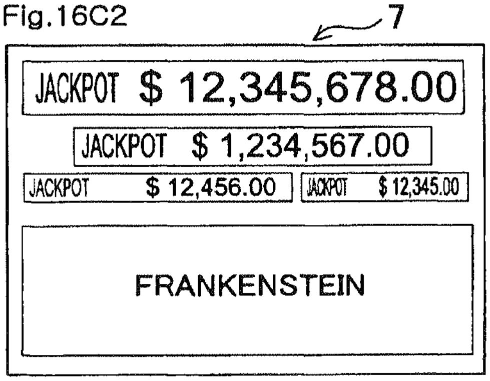
Fig.16D1
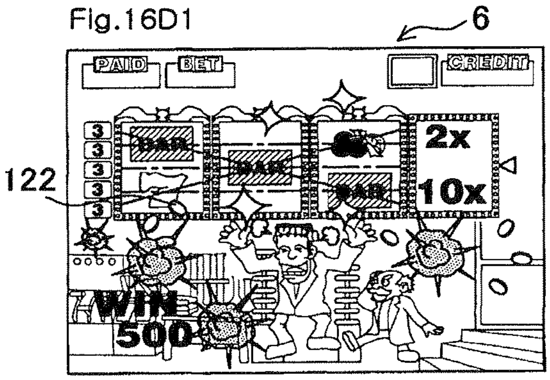
Fig.16D2
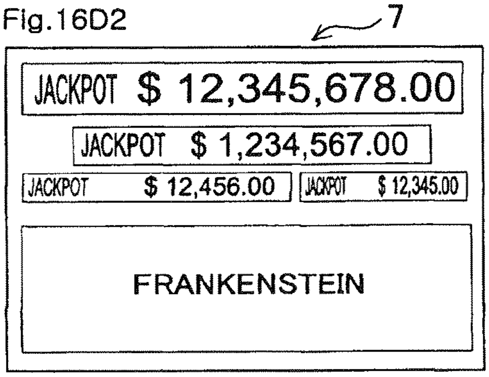

Fig.17A1
6
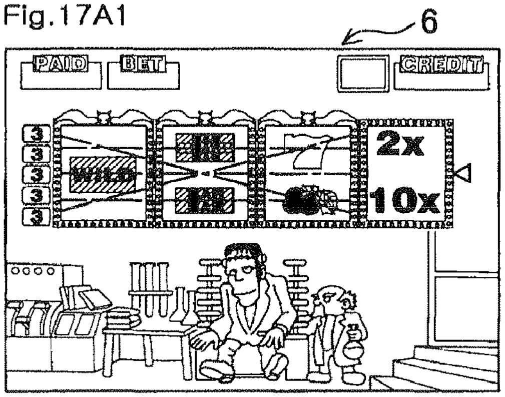
Fig.17A2
7
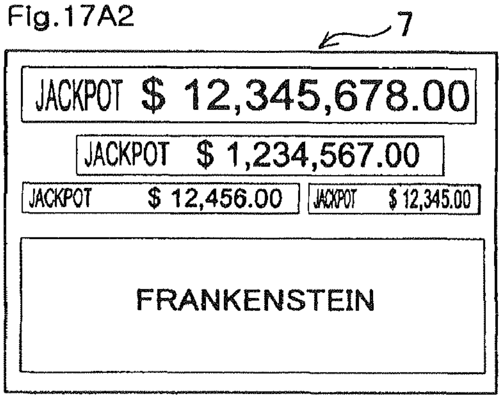
Fig.17B1
6
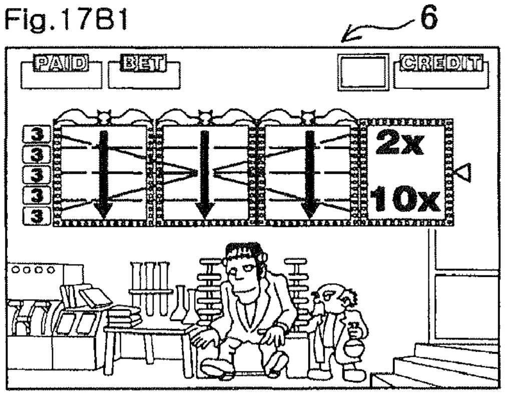
Fig.17B2
7
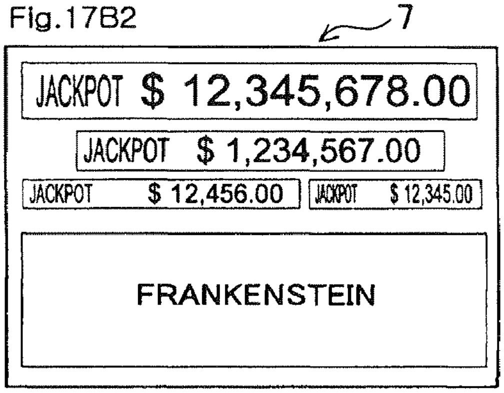
Fig.17C1
6
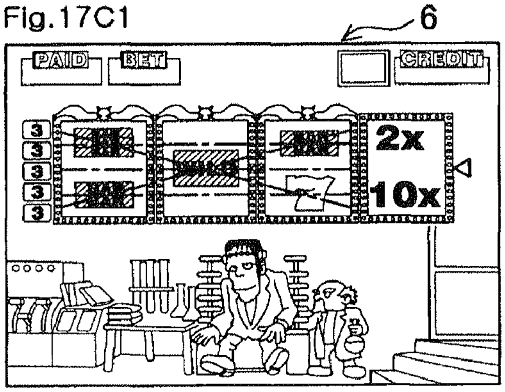
Fig.17C2
7
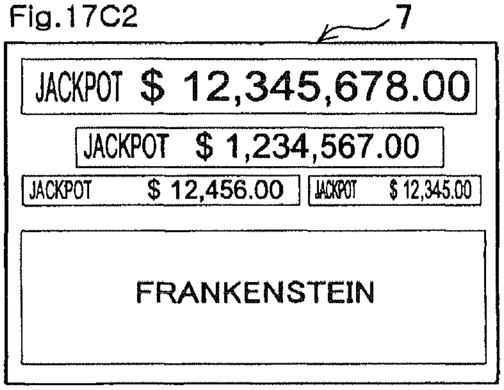
Fig.17D1
6
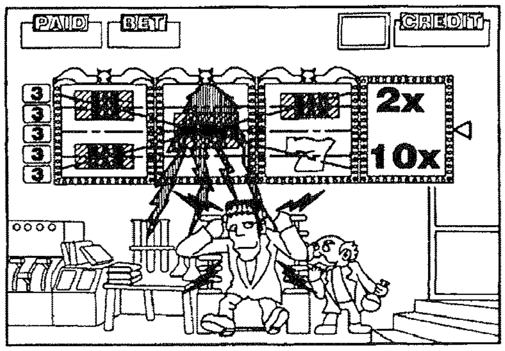
Fig.17D2
7
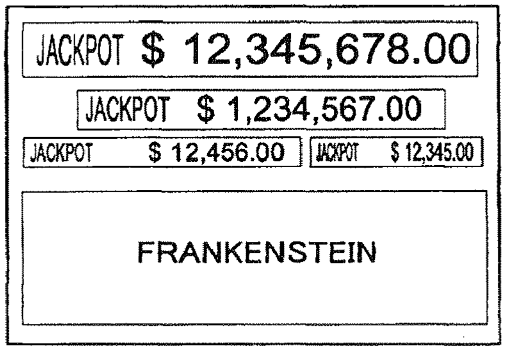

Fig.18A1
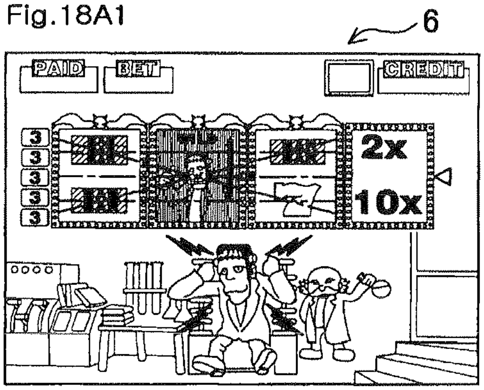
Fig.18A2
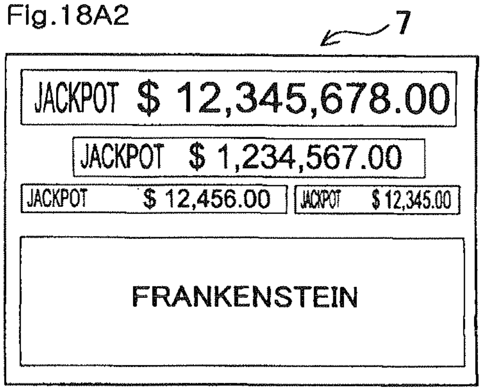
Fig.18B1
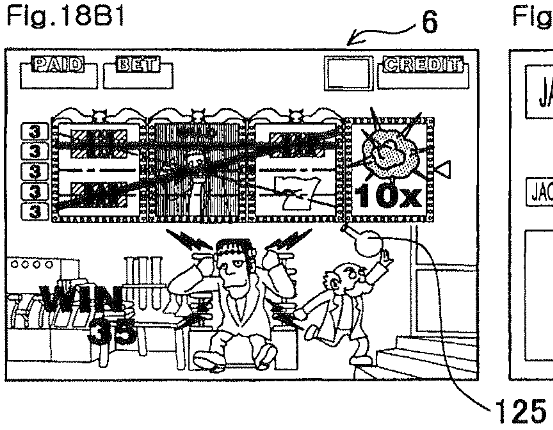
Fig.18B2
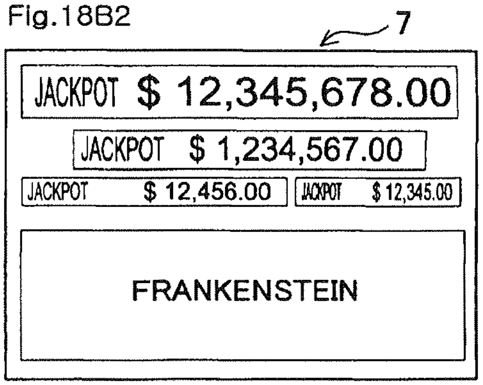
Fig.18C1
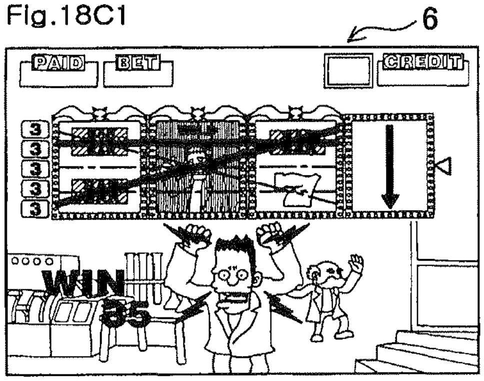
Fig.18C2
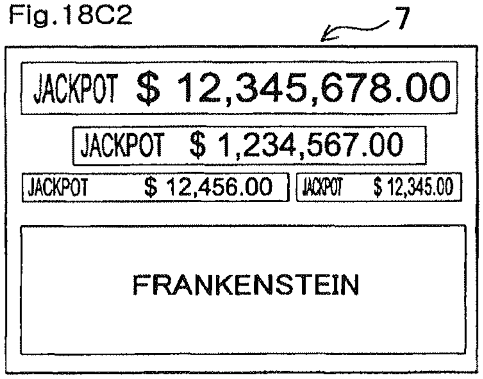
Fig.18D1
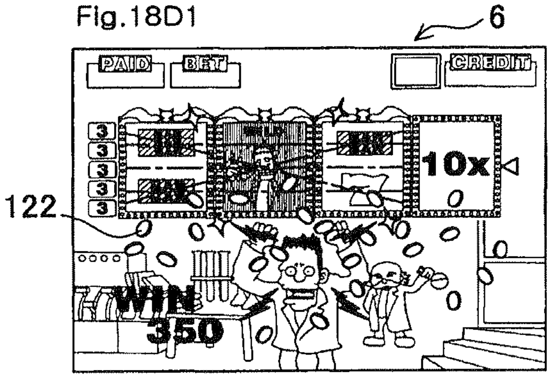
Fig.18D2
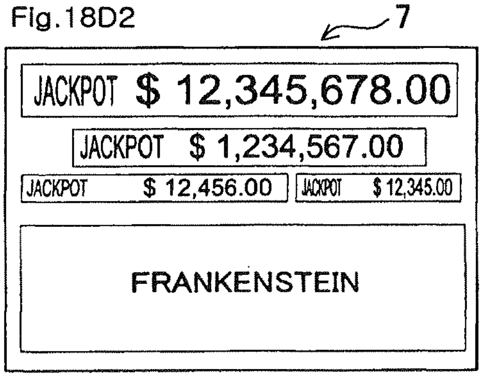

Fig.19A1
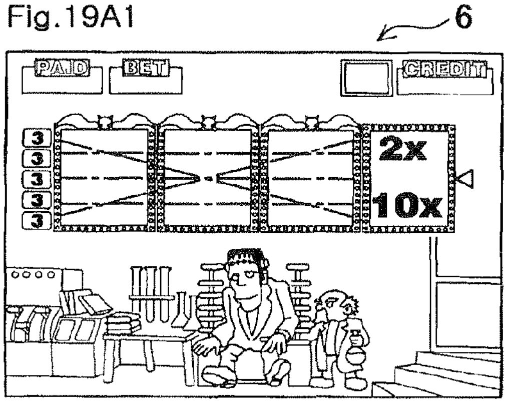
Fig.19A2
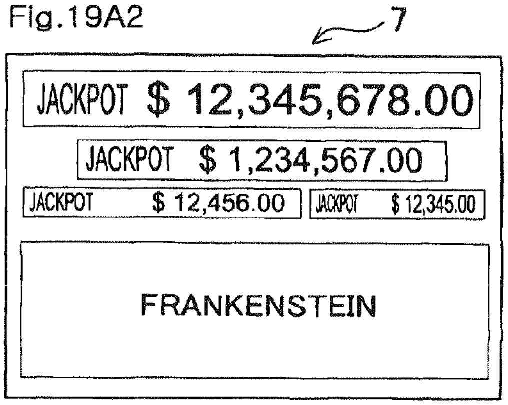
Fig.19B1
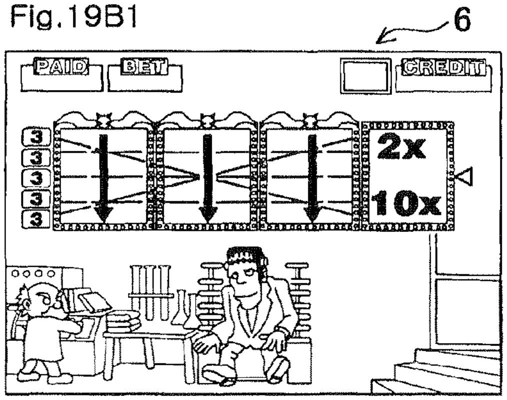
Fig.19B2
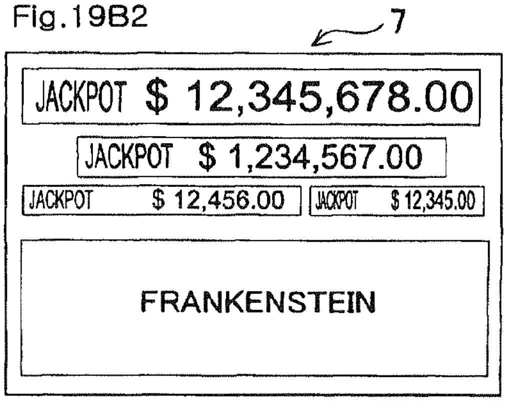
Fig.19C1
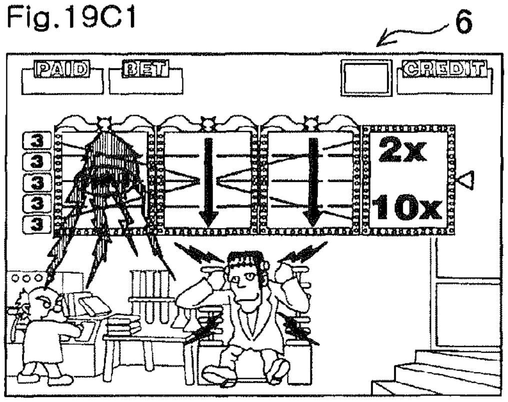
Fig.19C2
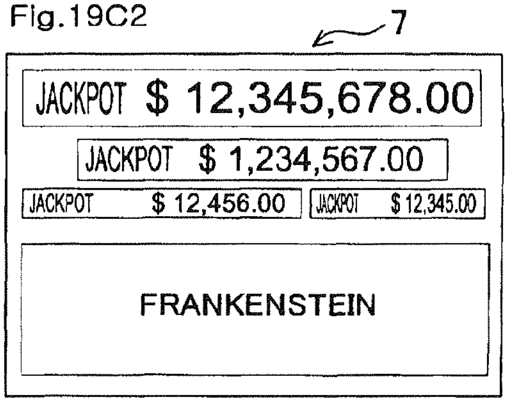

Fig.20A1
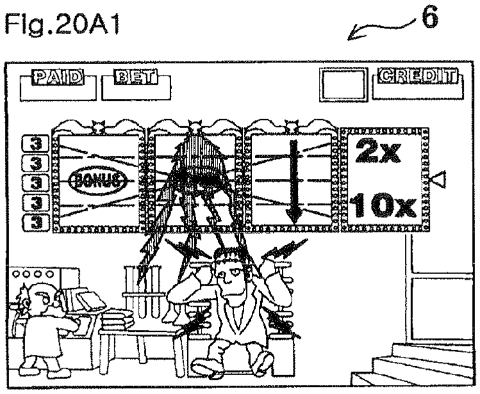
Fig.20A2
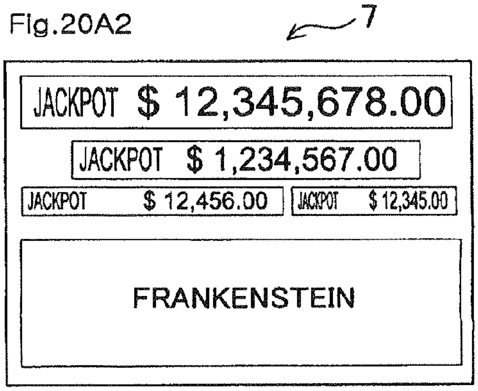
Fig.20B1
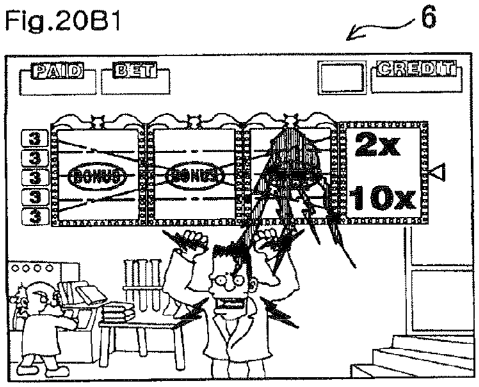
Fig.20B2
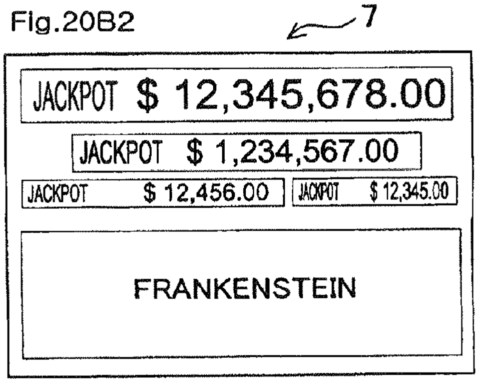

Fig.21A1
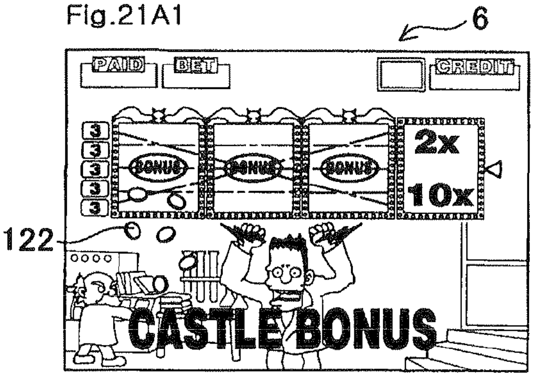
Fig.21A2
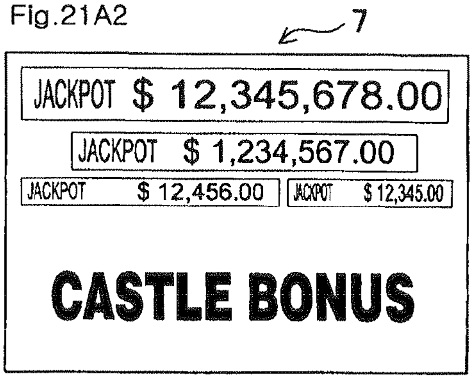
Fig.21B1
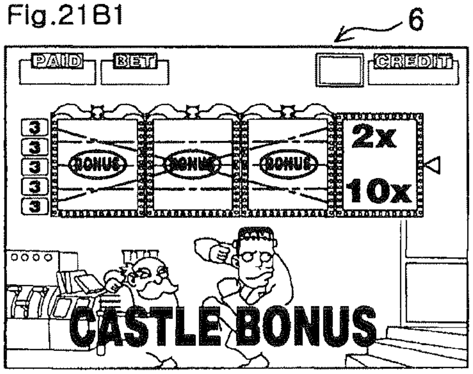
Fig.21B2
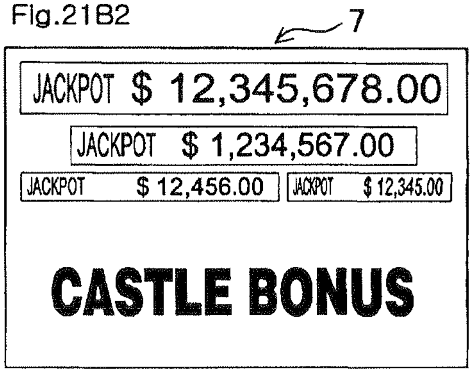
Fig.21C1
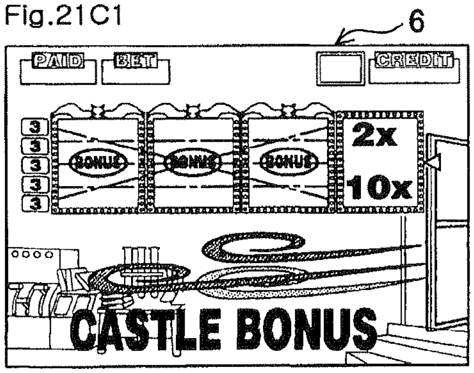
Fig.21C2
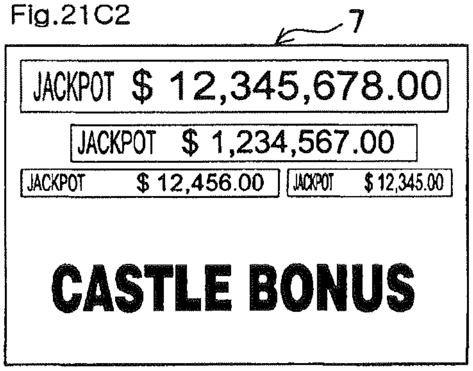
Fig.21D1
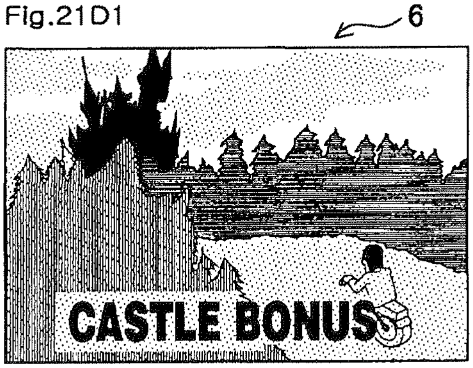
Fig.21D2
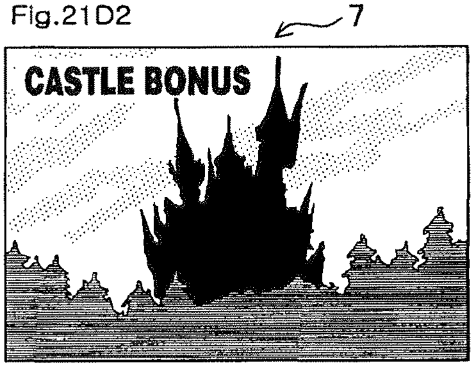

Fig.22A1
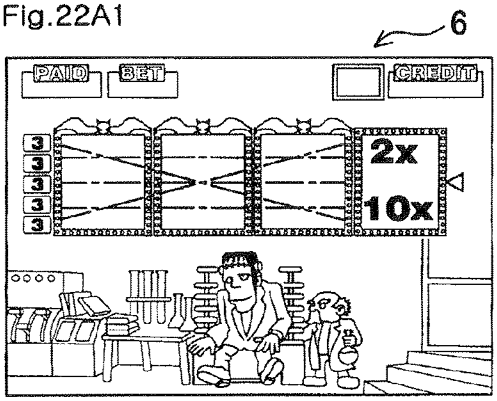
Fig.22A2
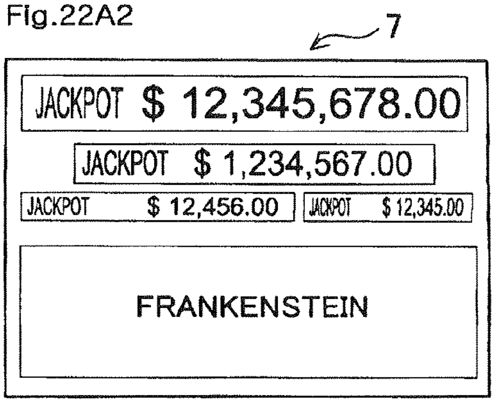
Fig.22B1
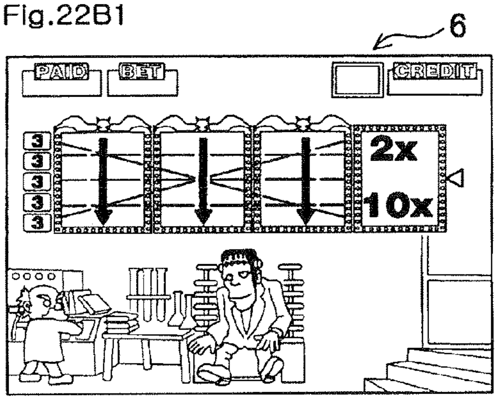
Fig.22B2
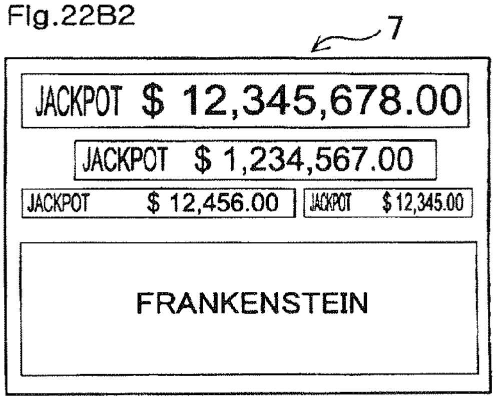
Fig.22C1
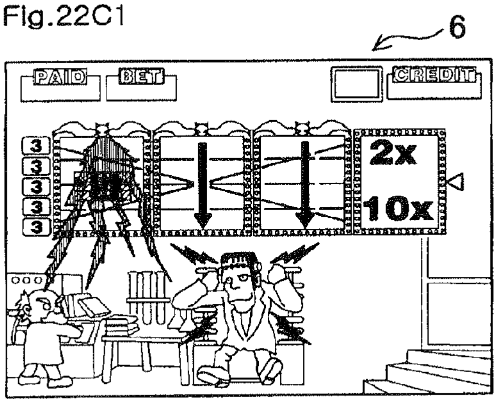
Fig.22C2
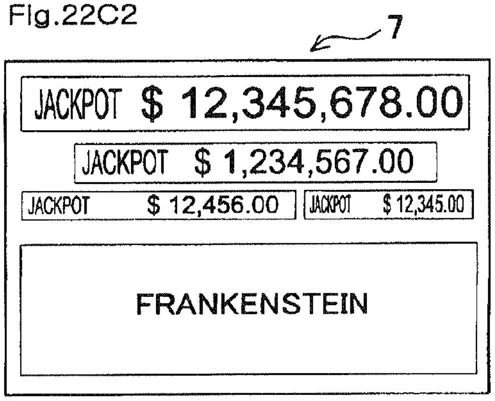

Fig.23A1
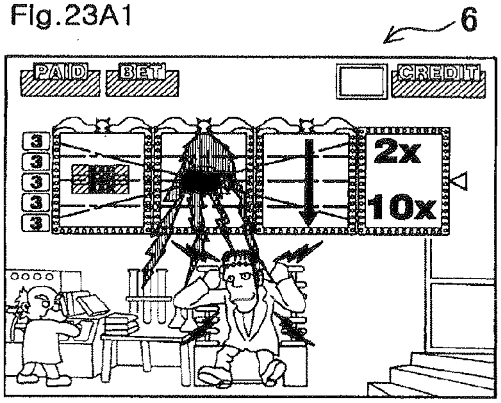
6
Fig.23A2
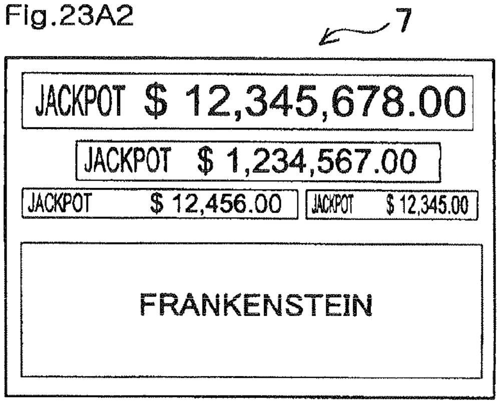
7
Fig.23B1
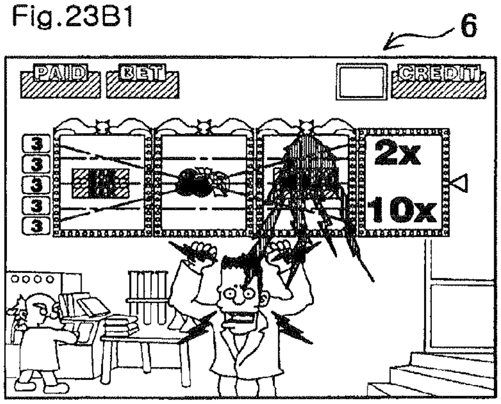
6
Fig.23B2
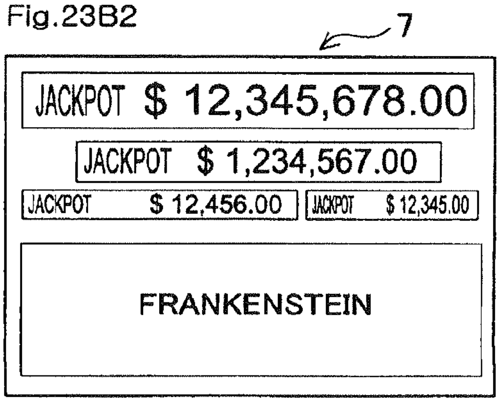
7

Fig.24A1
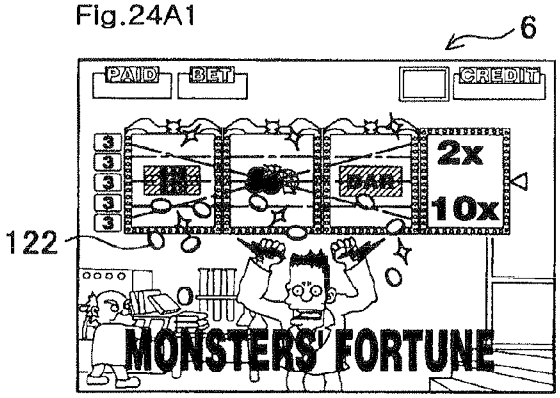
Fig.24A2
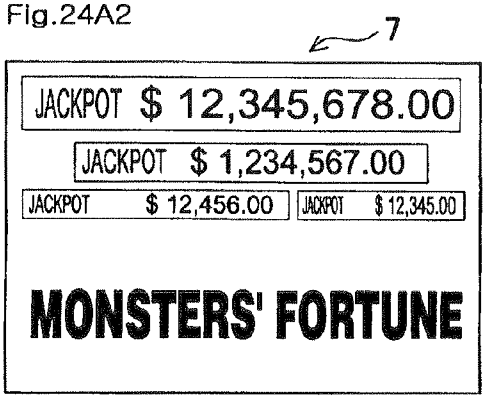
Fig.24B1
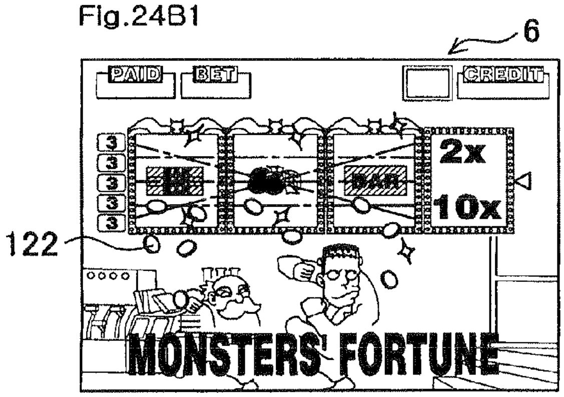
Fig.24B2
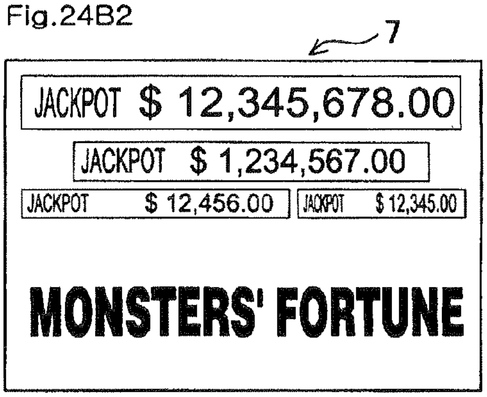
Fig.24C1
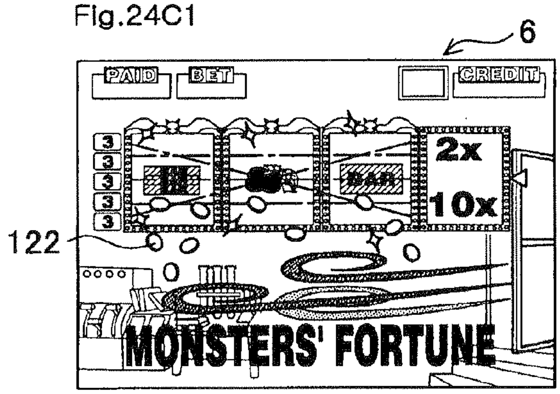
Fig.24C2
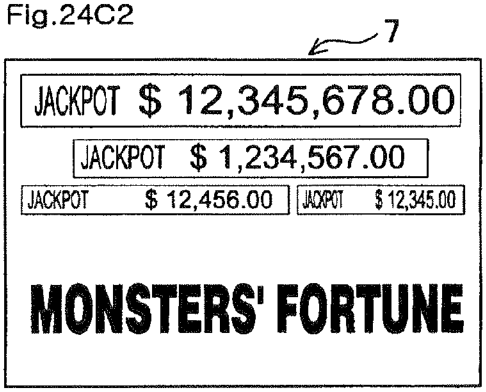

Fig.25A1
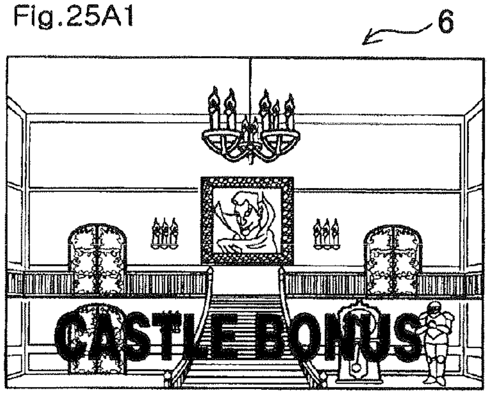
Fig.25A2
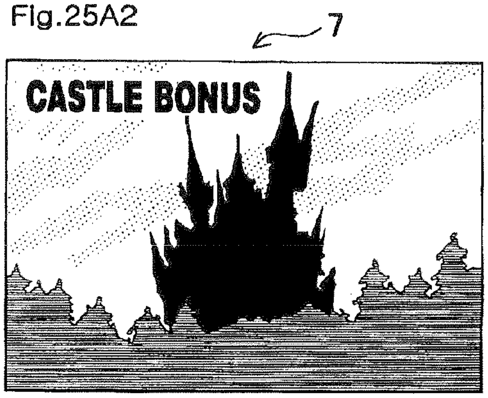
Fig.25B1
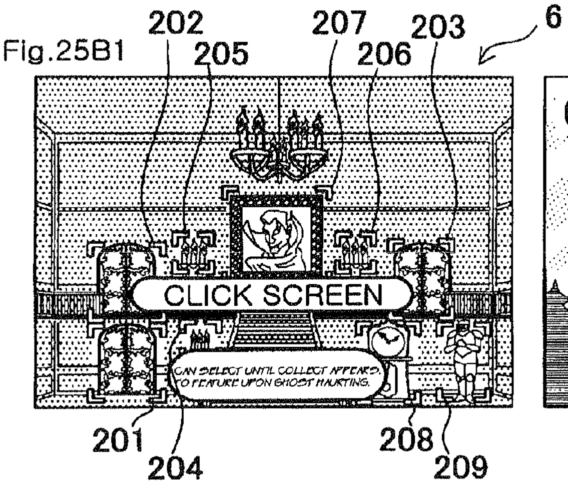
Fig.25B2
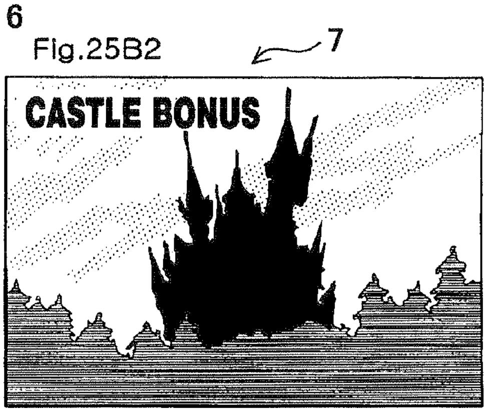

Fig.26A1
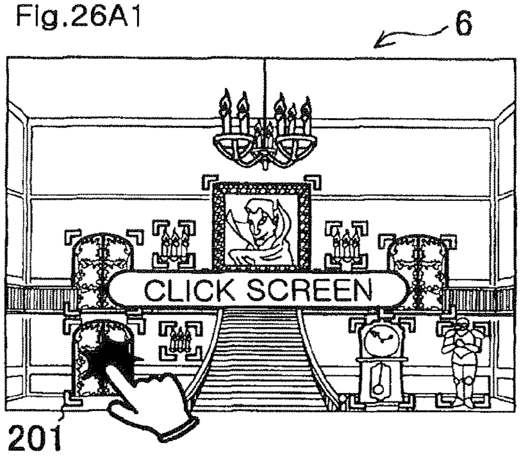
Fig.26A2
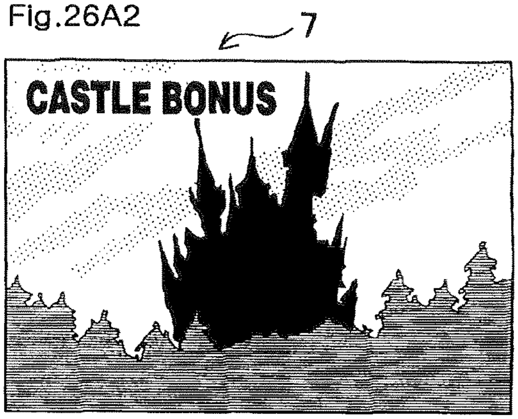
Fig.26B1
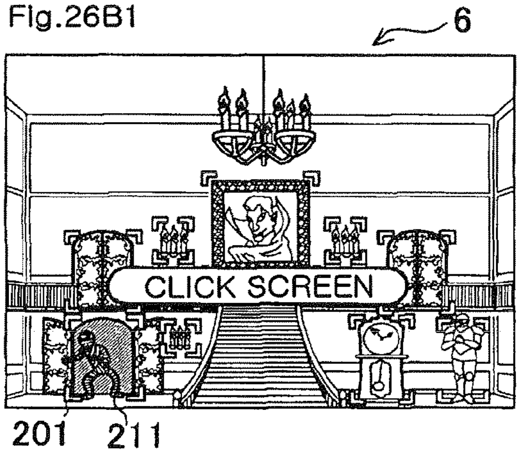
Fig.26B2
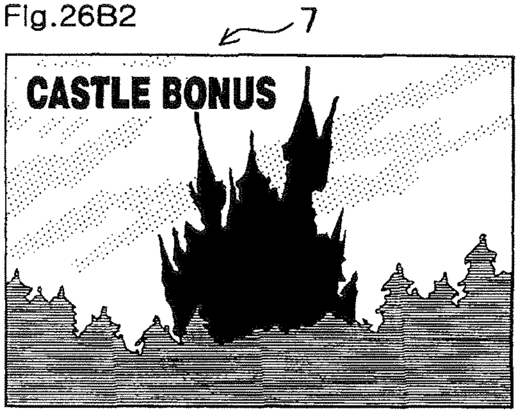
Fig.26C1
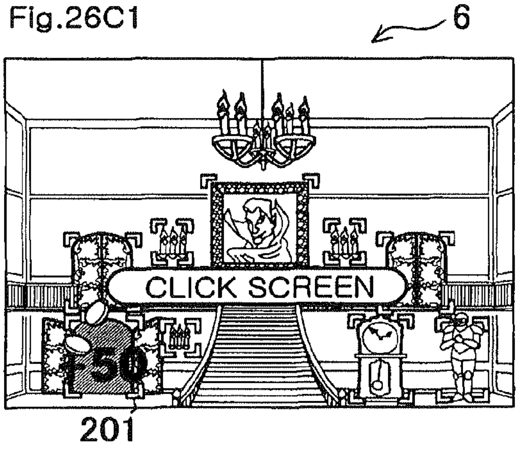
Fig.26C2
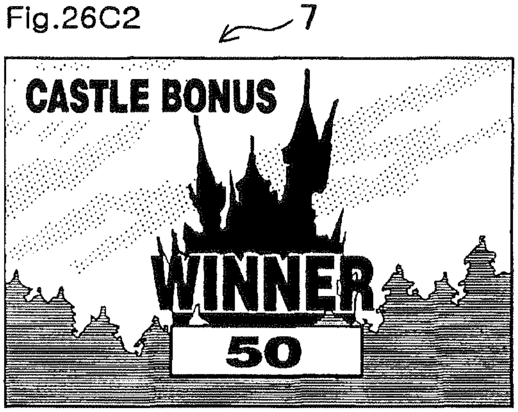

Fig.27A1
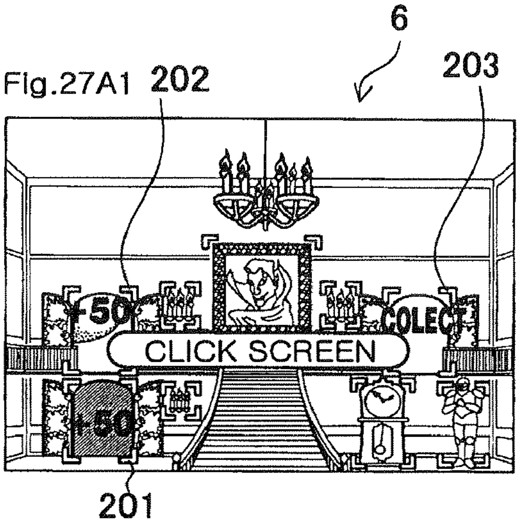
Fig.27A2
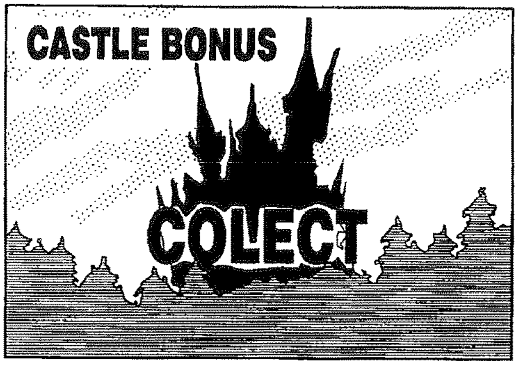
Fig.27B1
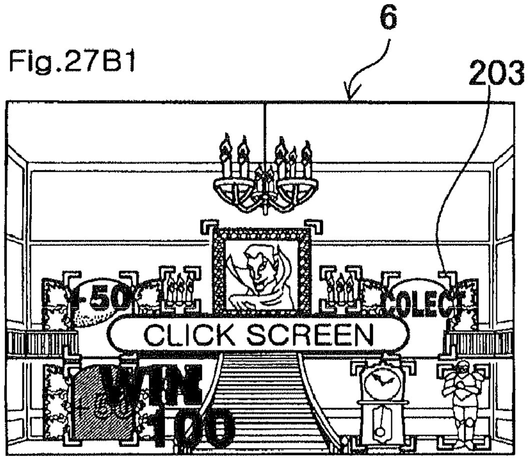
Fig.27B2
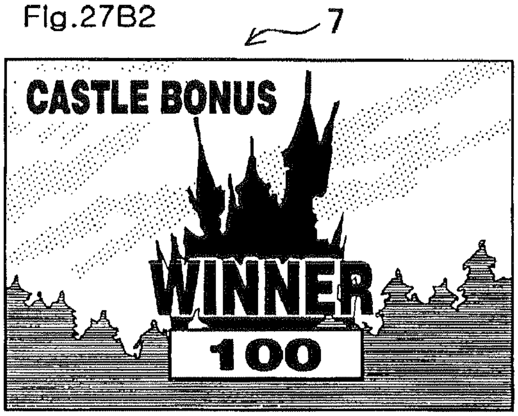

Fig.28A1
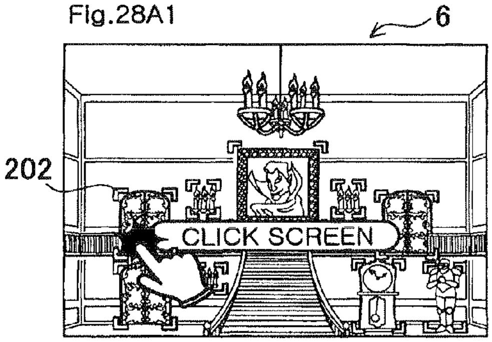
Fig.28A2
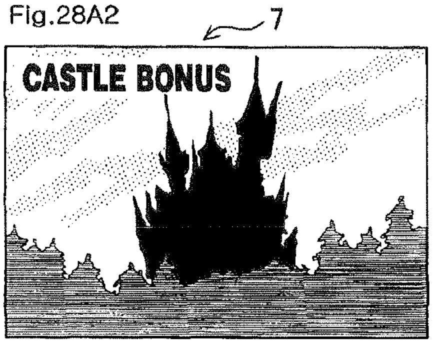
Fig.28B1
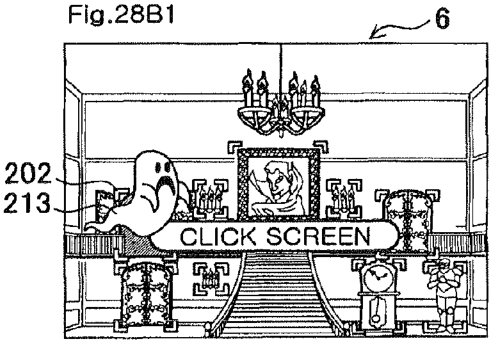
Fig.28B2
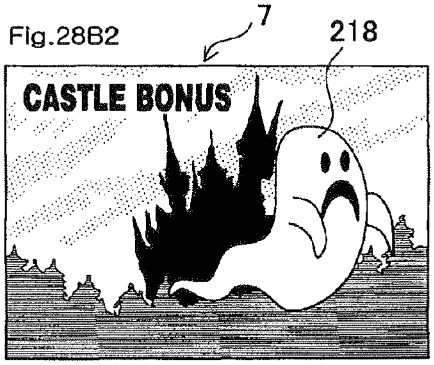
Fig.28C1
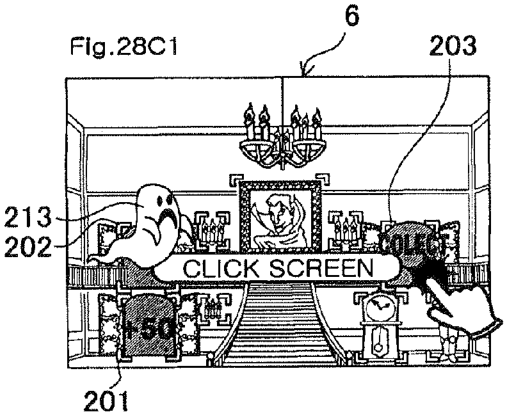
Fig.28C2
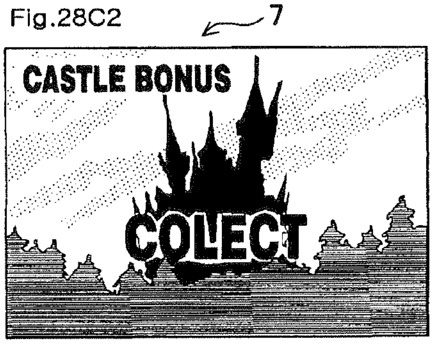

Fig.29A1
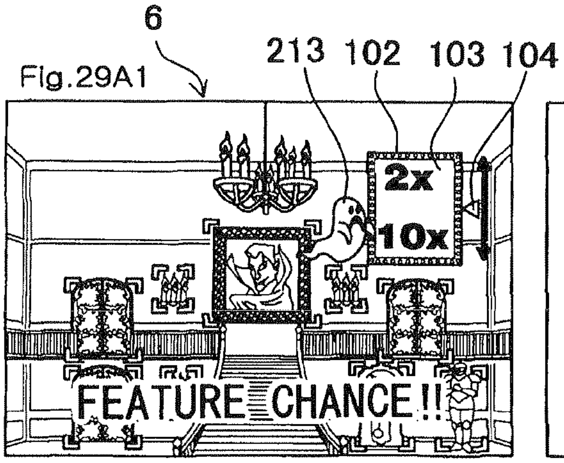
Fig.29A2
Fig.29B1
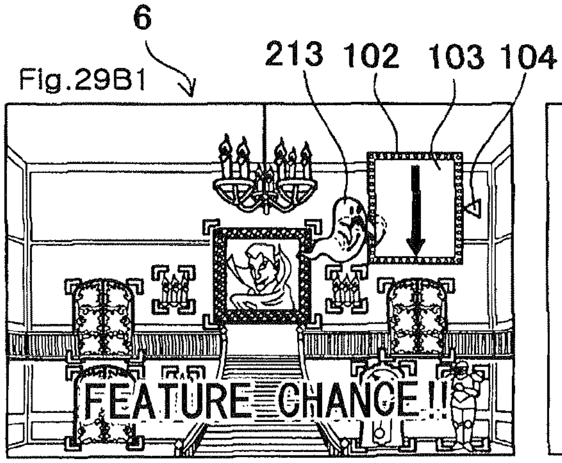
Fig.29B2
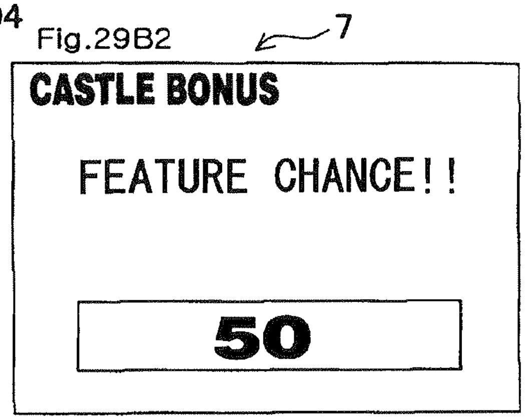
Fig.29C1
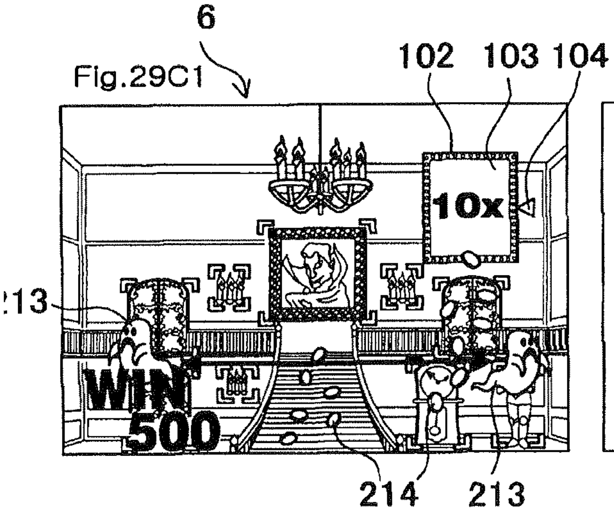
Fig.29C2
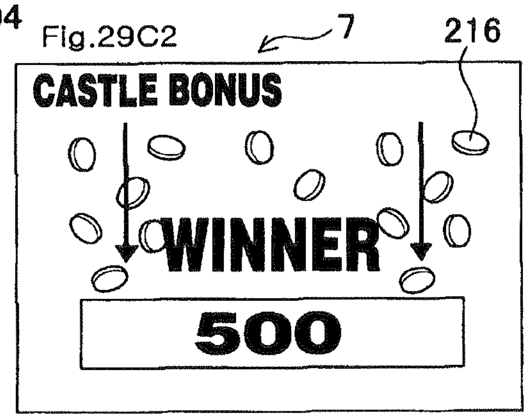

Fig.30A1
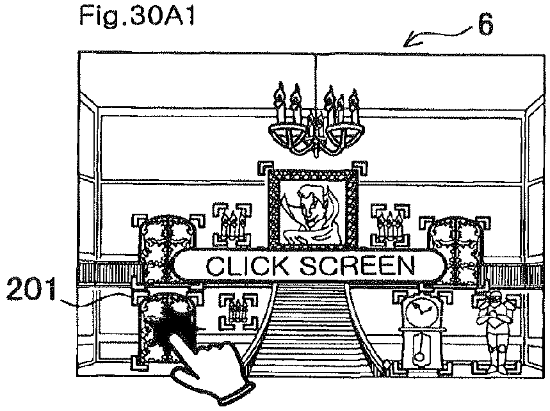
Fig.30A2
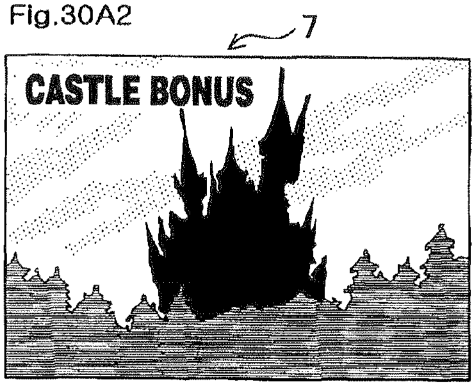
Fig.30B1
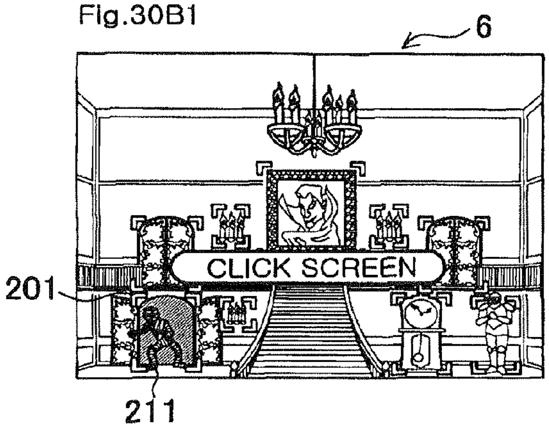
Fig.30B2
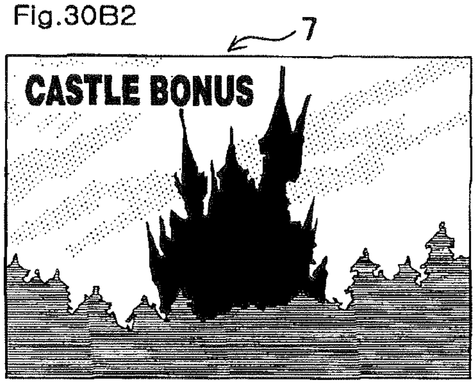
Fig.30C1
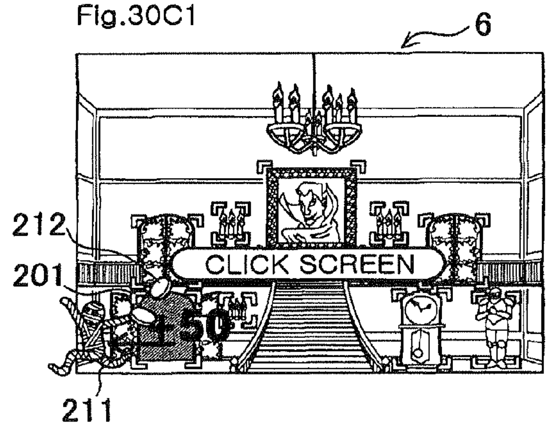
Fig.30C2
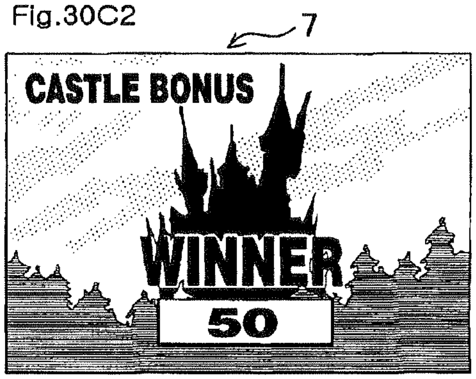

Fig.31A1
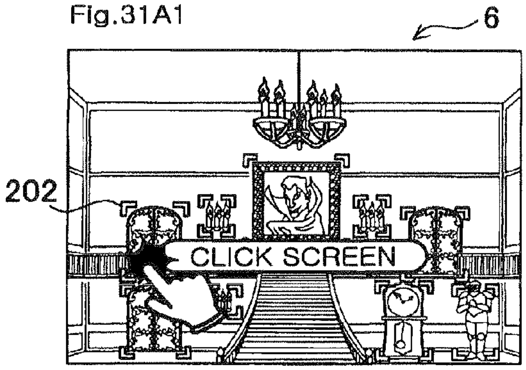
Fig.31A2
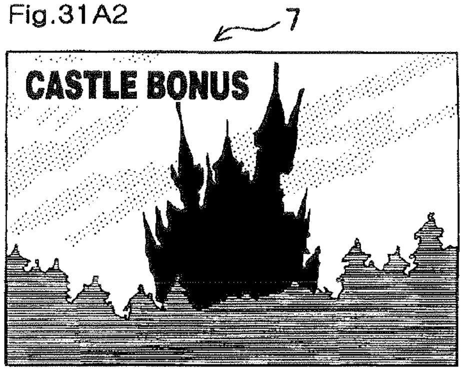
Fig.31B1
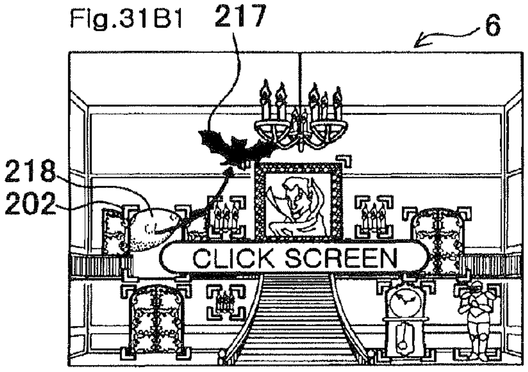
Fig.31B2
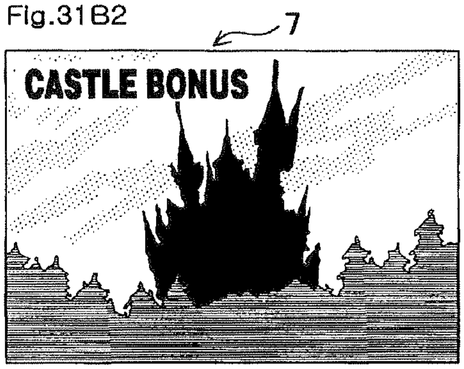
Fig.31C1
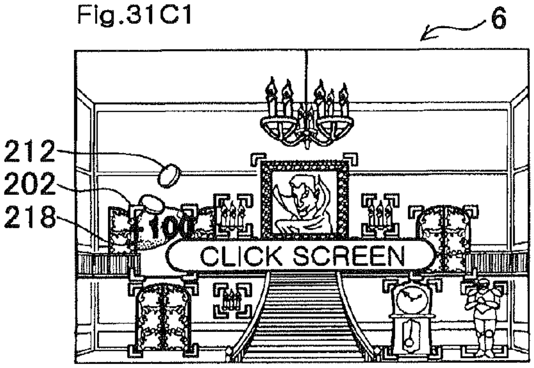
Fig.31C2
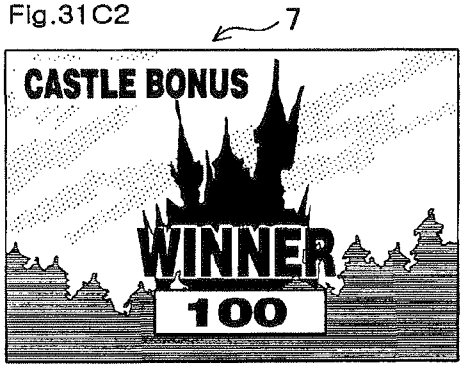

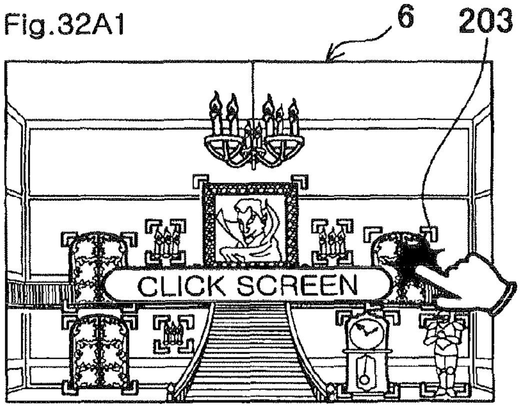
Fig.32A1
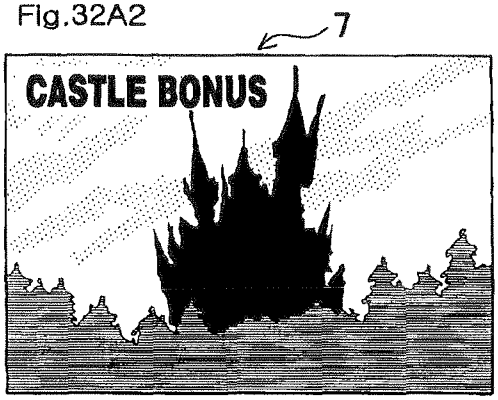
Fig.32A2
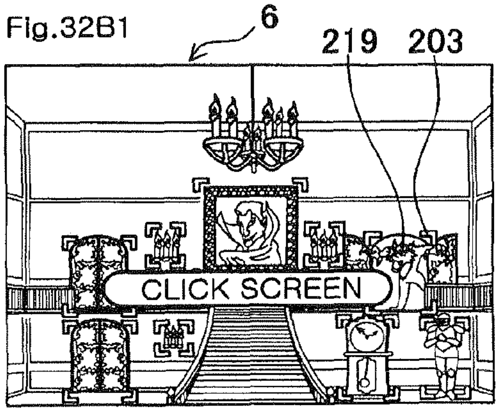
Fig.32B1
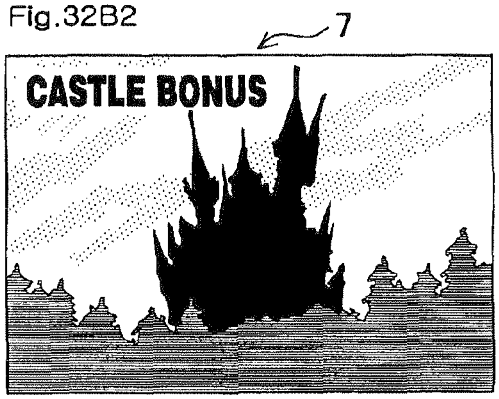
Fig.32B2
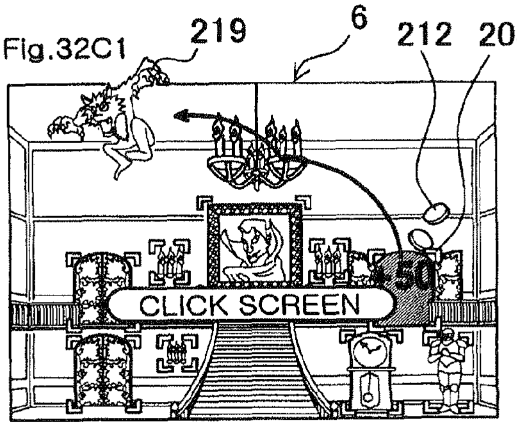
Fig.32C1
Fig.32C2

Fig.33A1
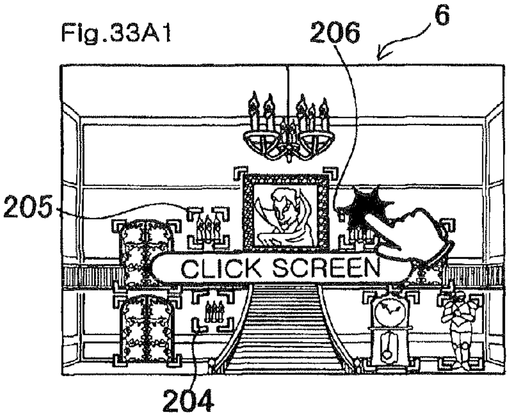
Fig.33A2
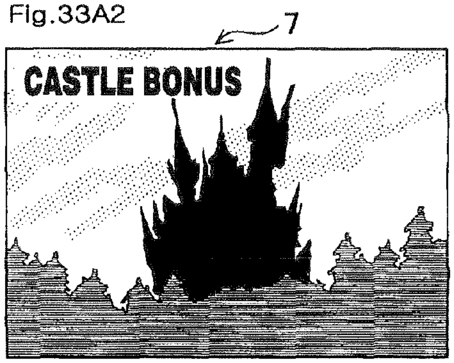
Fig.33B1
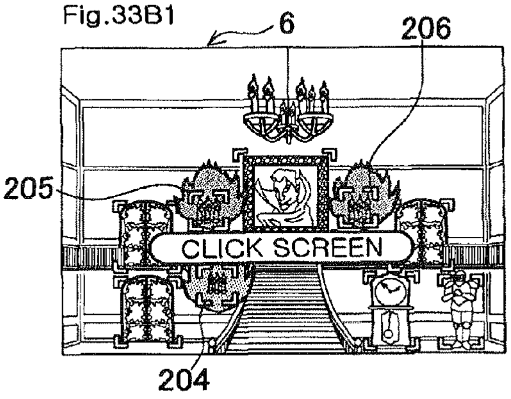
Fig.33B2
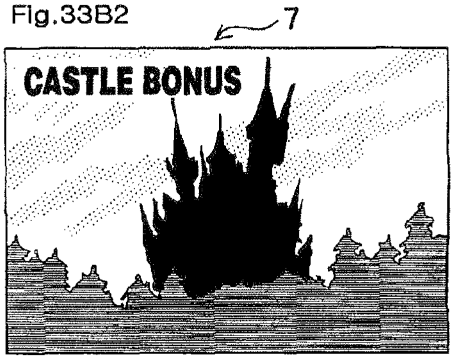
Fig.33C1
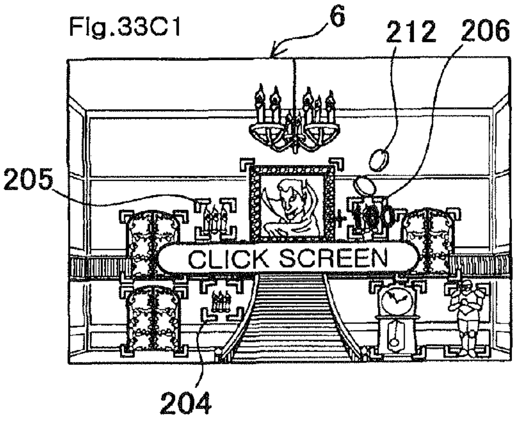
Fig.33C2
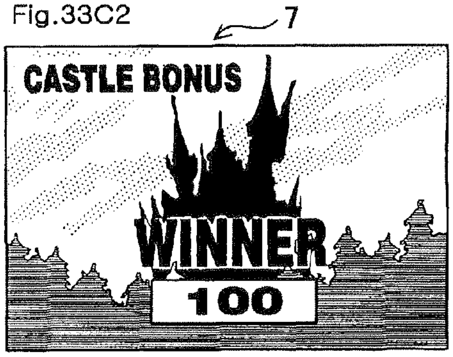

Fig.34A1
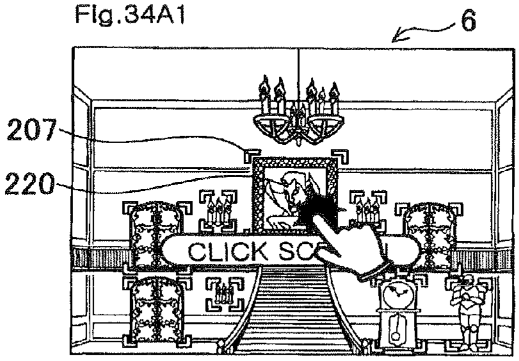
Fig.34A2
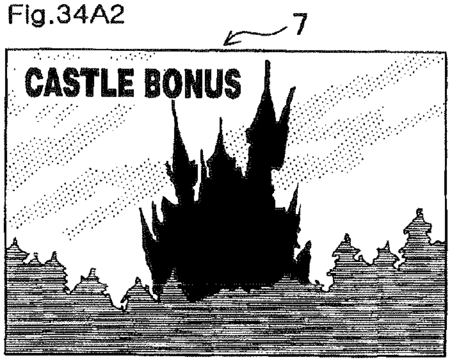
Fig.34B1
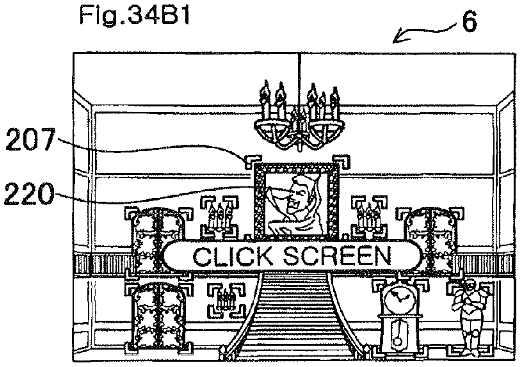
Fig.34B2
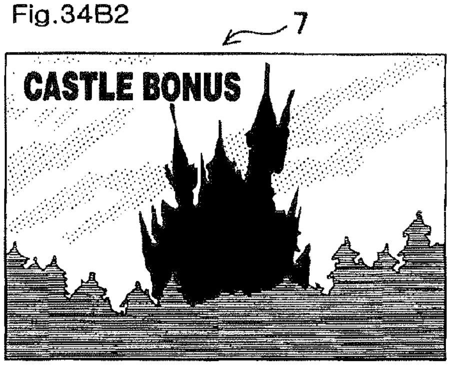
Fig.34C1
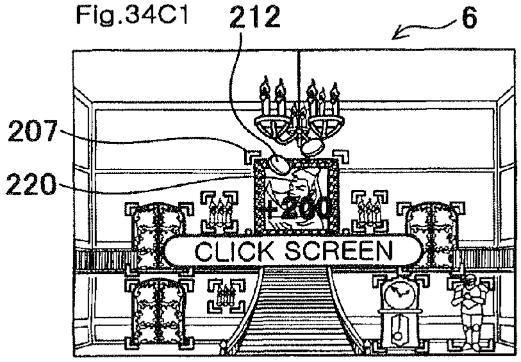
Fig.34C2
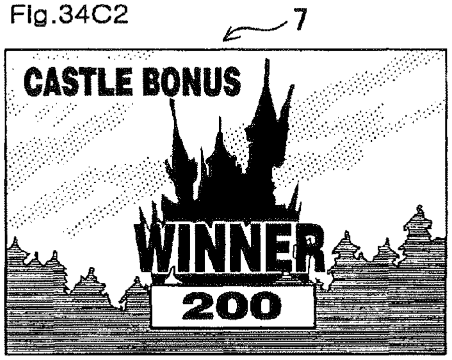

Fig.35A1
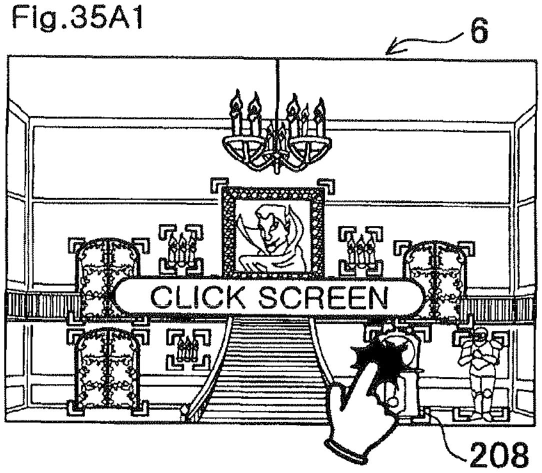
Fig.35A2
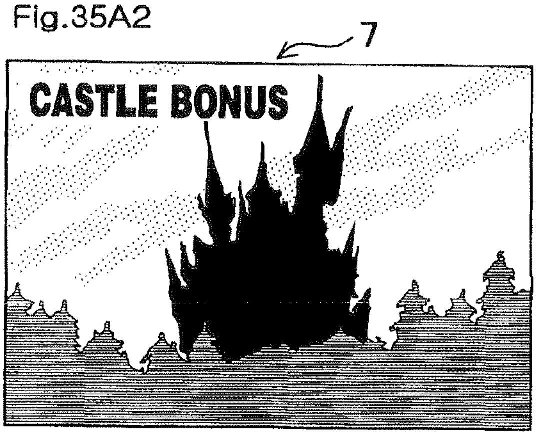
Fig.35B1
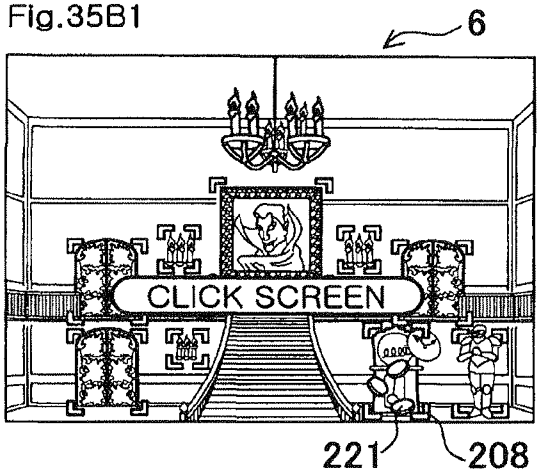
Fig.35B2
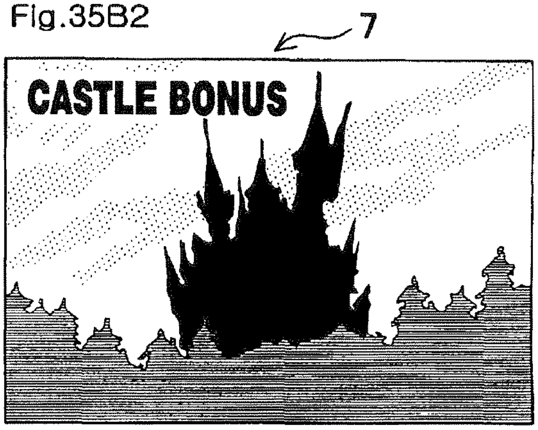
Fig.35C1
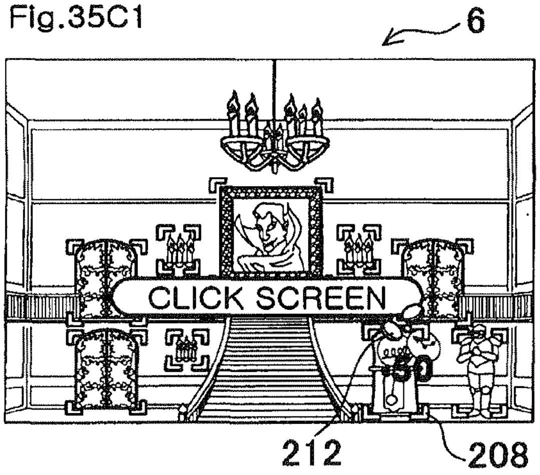
Fig.35C2
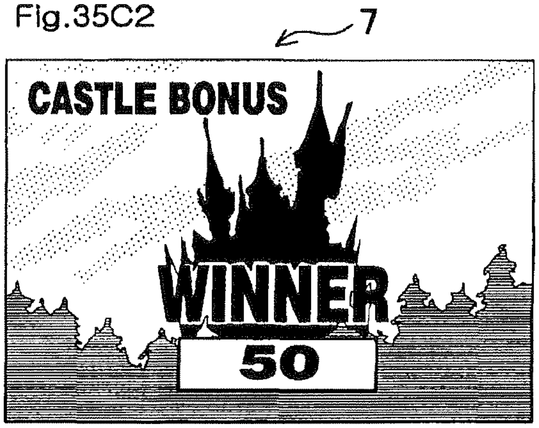

Fig.36A1
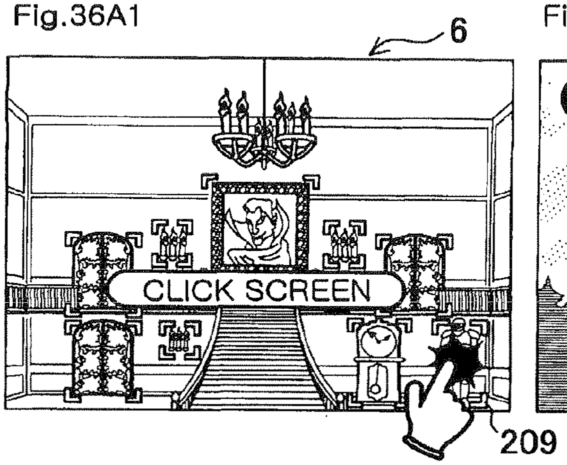
Fig.36A2
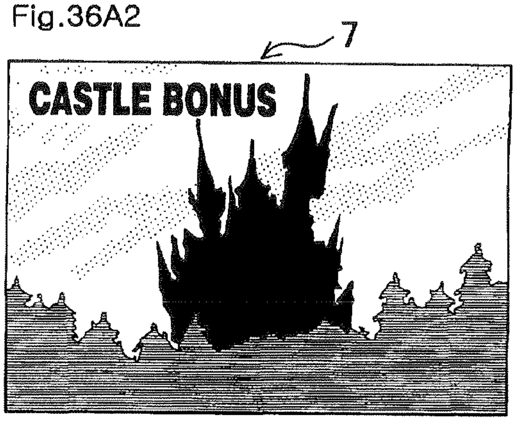
Fig.36B1
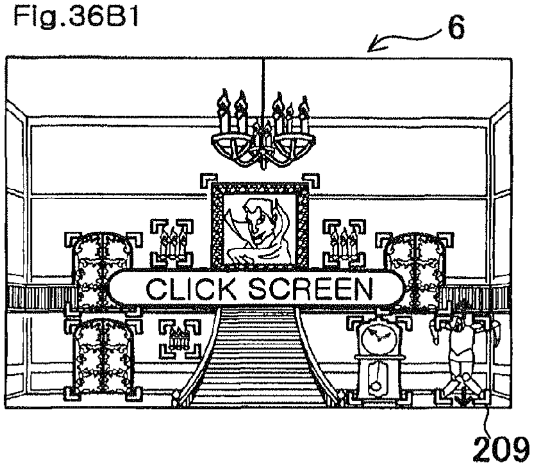
Fig.36B2
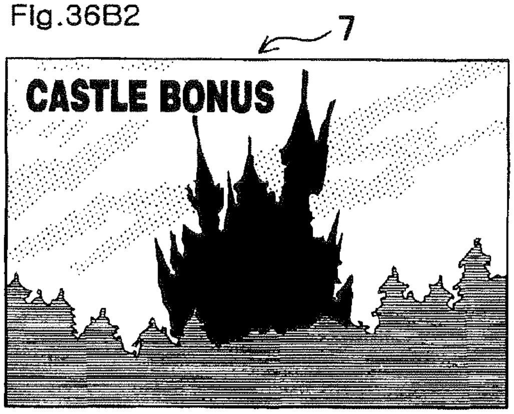
Fig.36C1
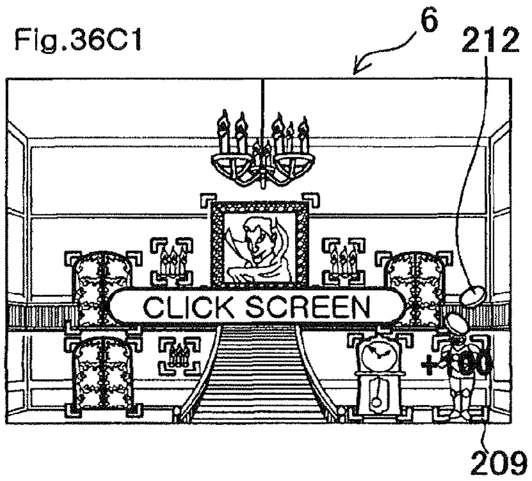
Fig.36C2
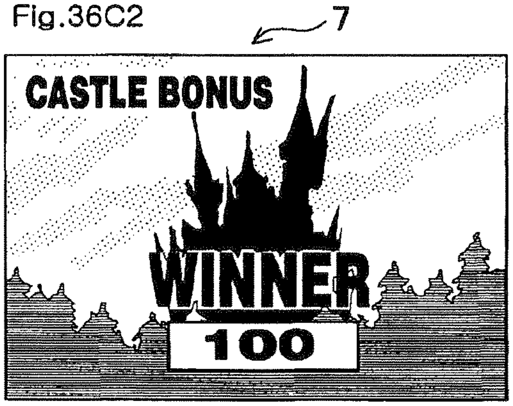

Fig.38A1
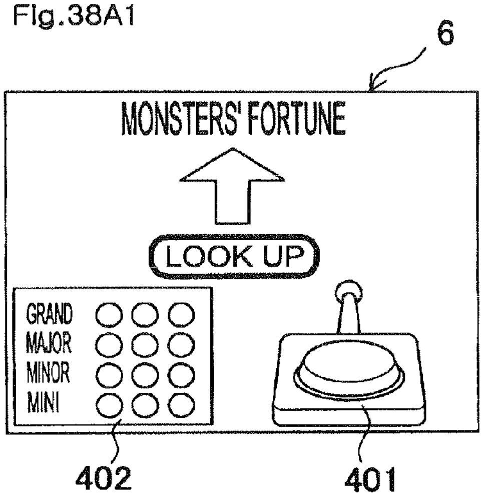
Fig.38A2
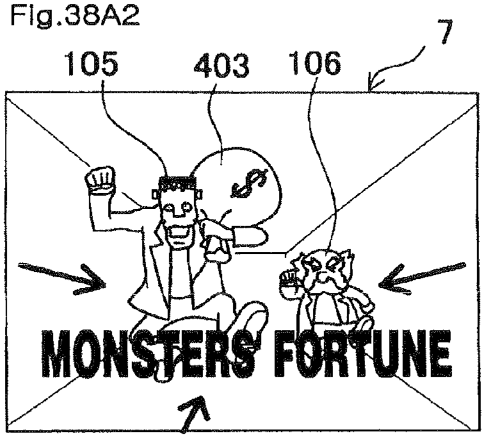
Fig.38B1
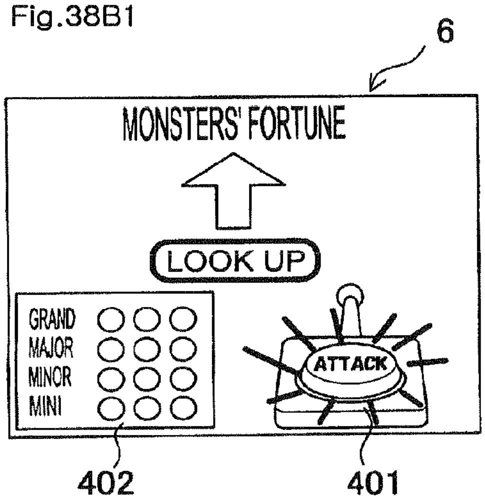
Fig.38B2
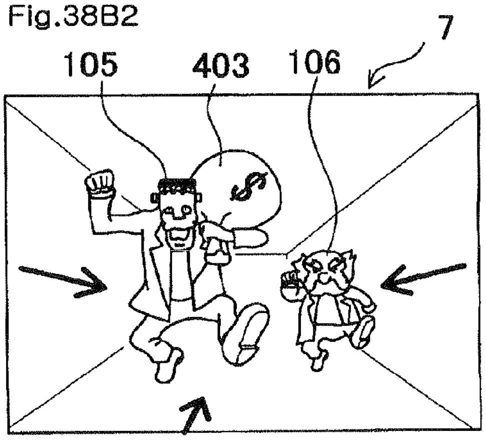

Fig.39A1
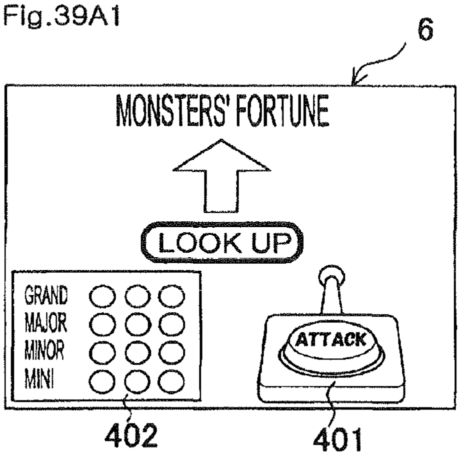
Fig.39A2
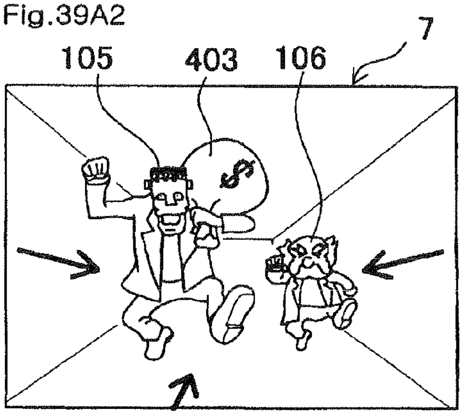
Fig.39B1
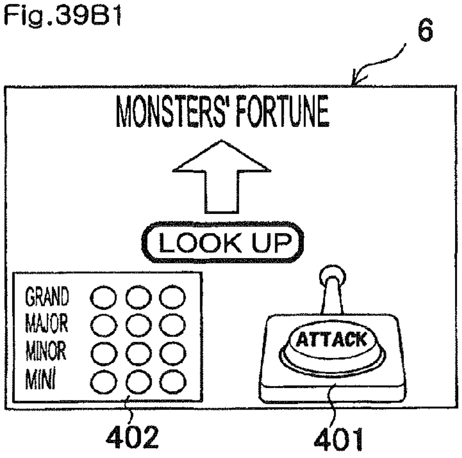
Fig.39B2
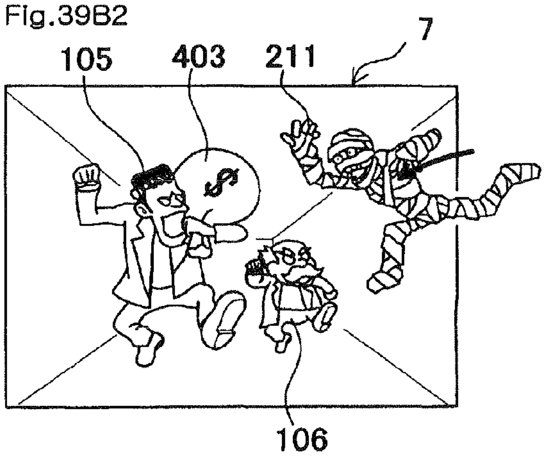
Fig.39C1
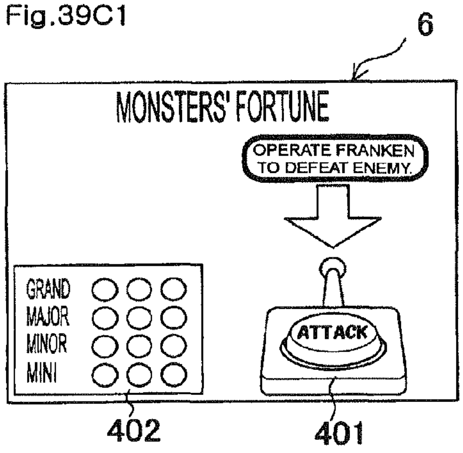
Fig.39C2
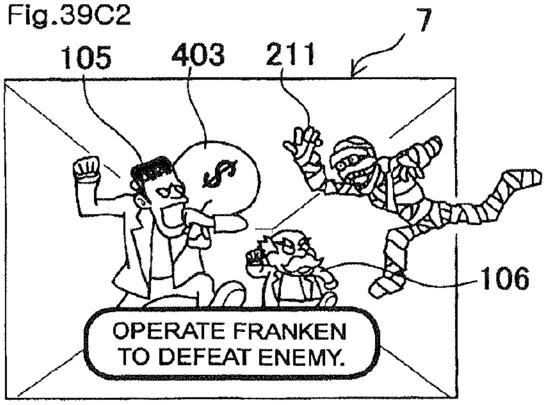

Fig.40A1
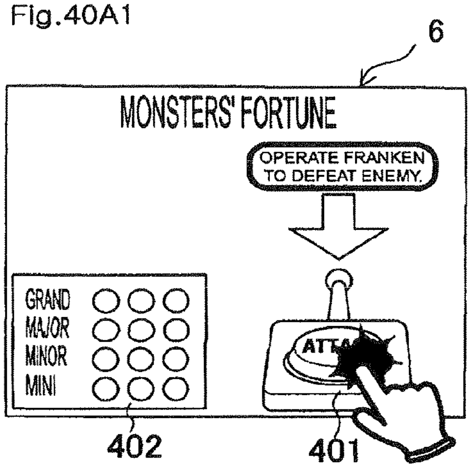
Fig.40A2
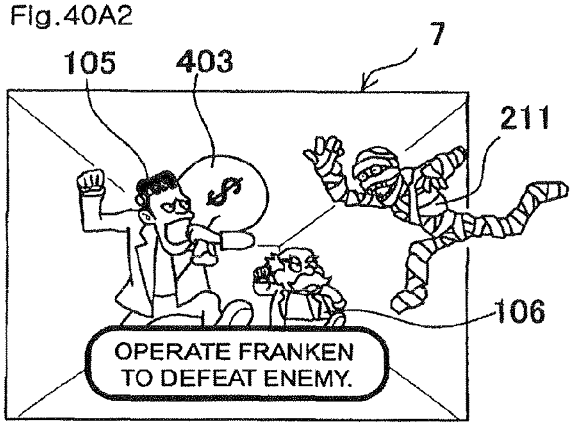
Fig.40B1
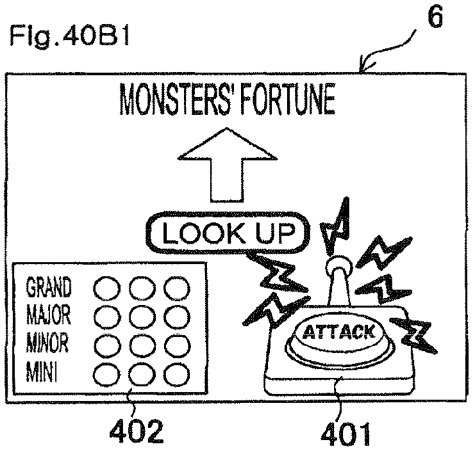
Fig.40B2
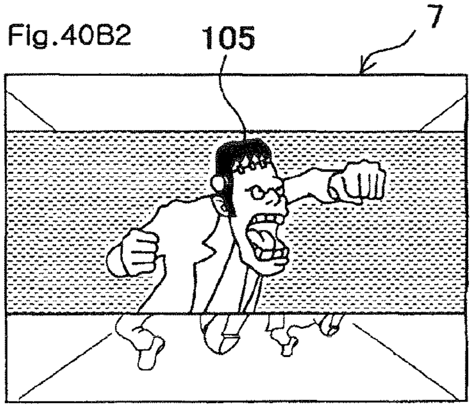
Fig.40C1
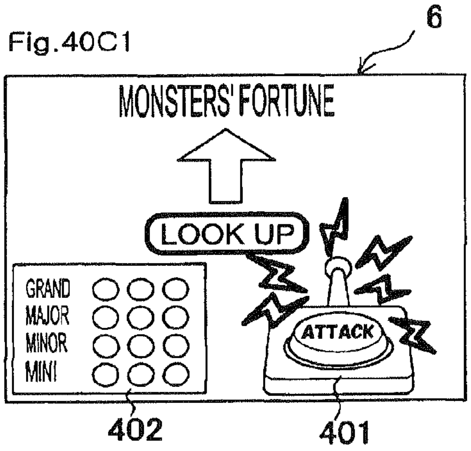
Fig.40C2
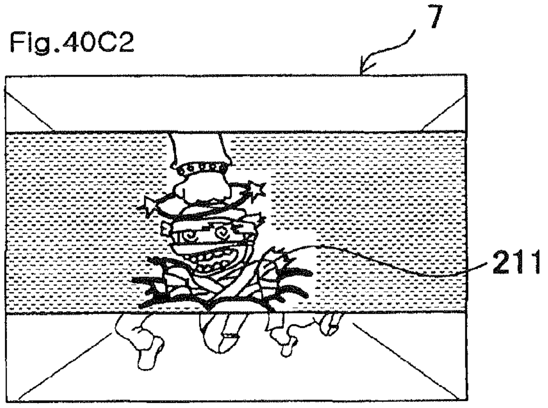

Fig.41A1
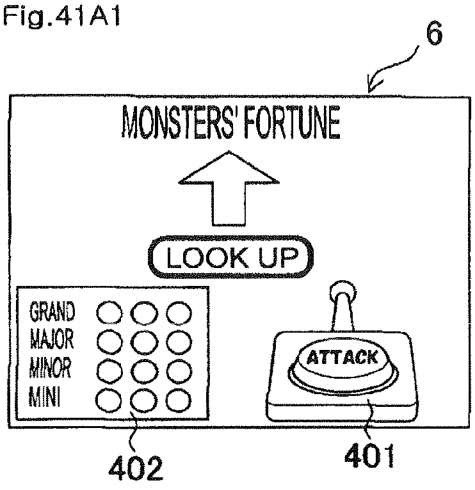
Fig.41A2
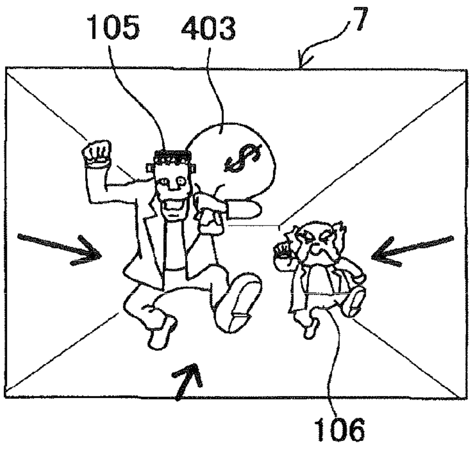
Fig.41B1
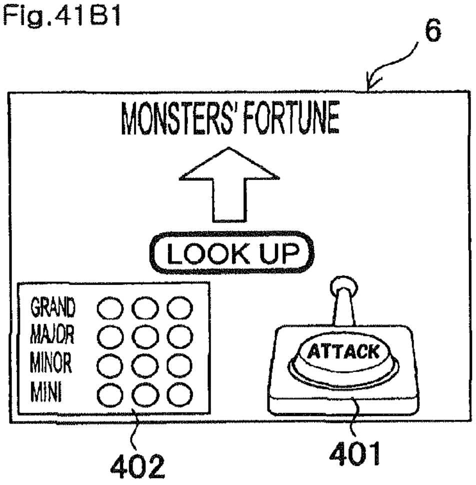
Fig.41B2
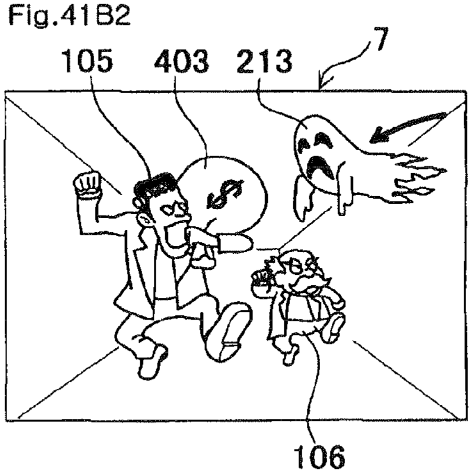
Fig.41C1
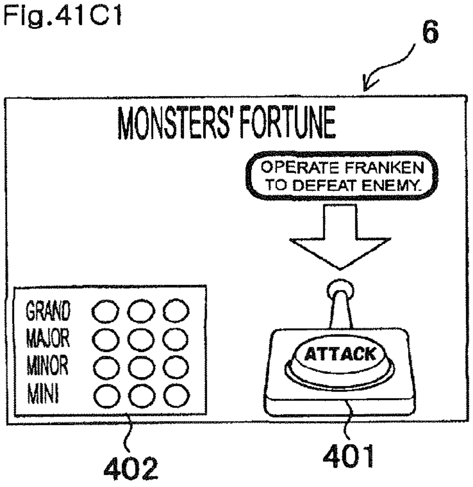
Fig.41C2
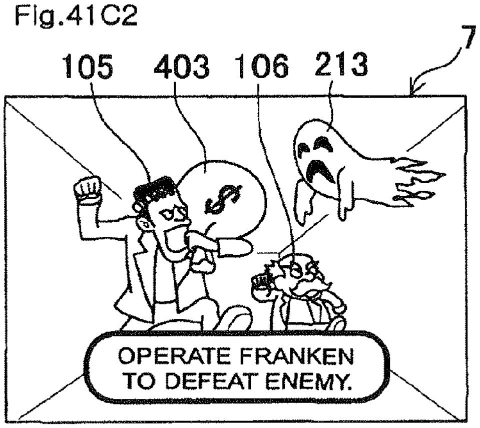

Fig.42A1
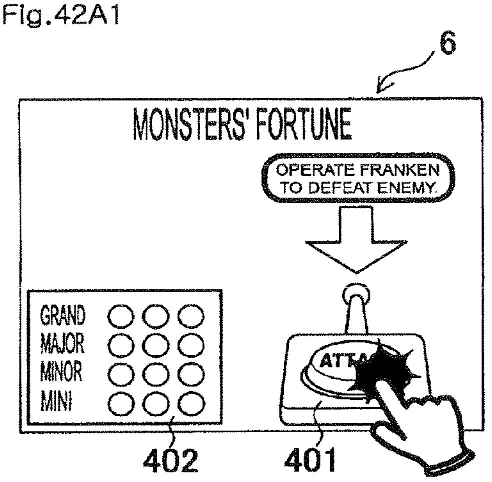
Fig.42A2
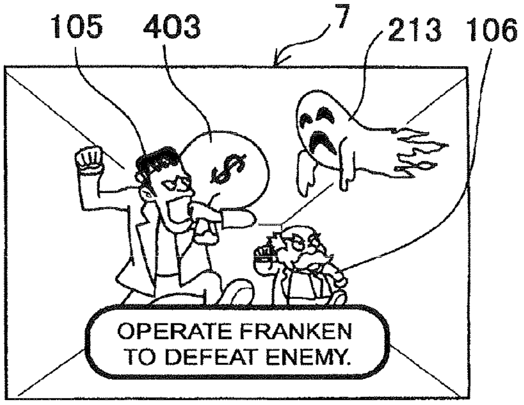
Fig.42B1
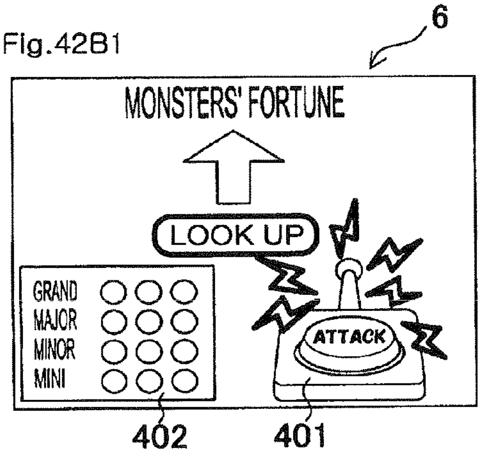
Fig.42B2
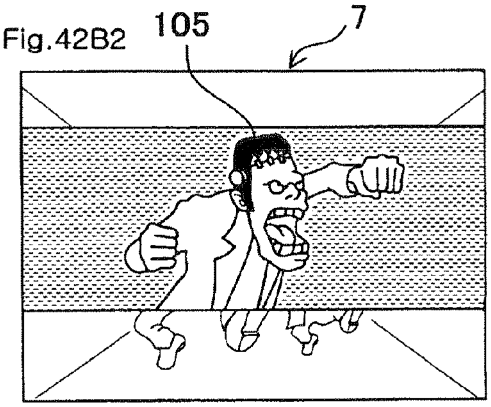
Fig.42C1
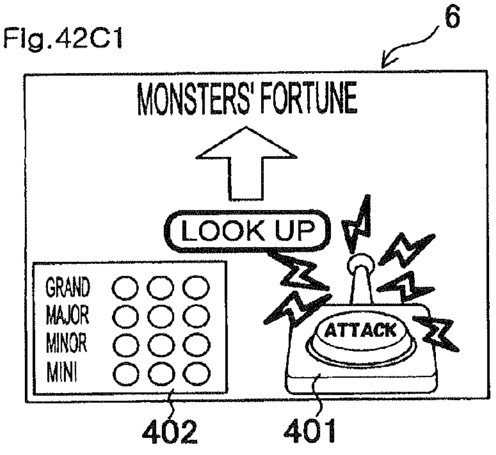
Fig.42C2
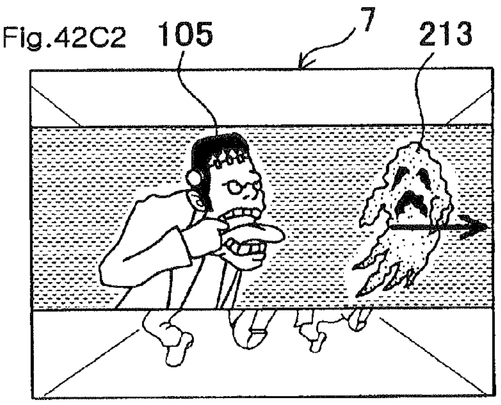

Fig.43A1
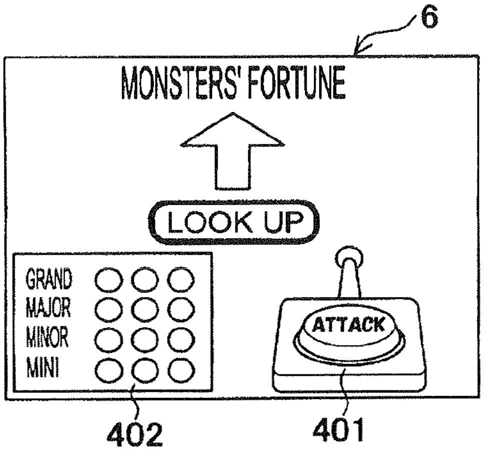
Fig.43A2
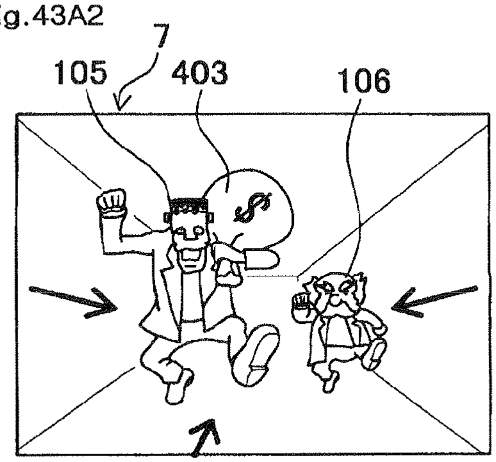
Fig.43B1
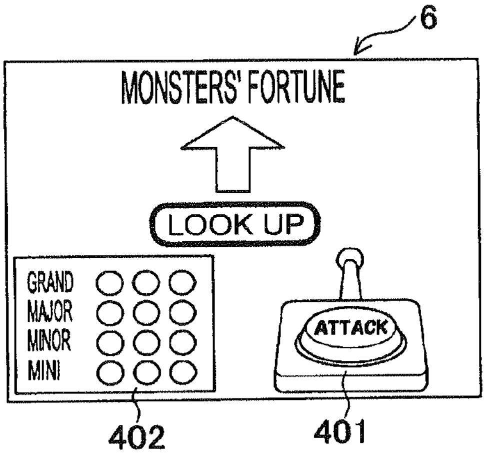
Fig.43B2
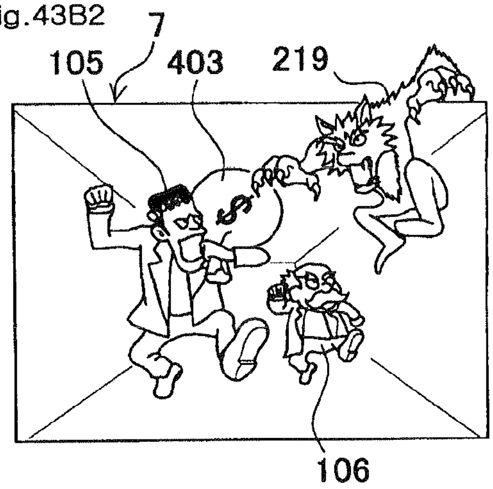
Fig.43C1
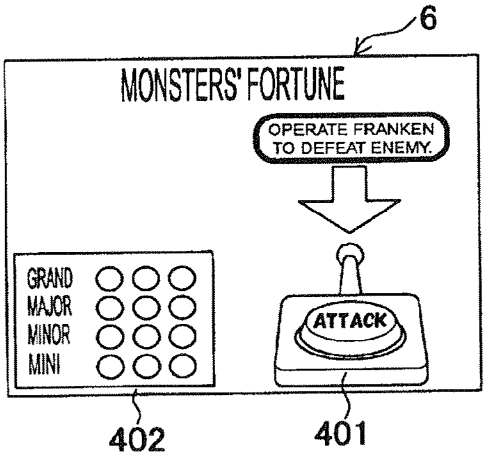
Fig.43C2
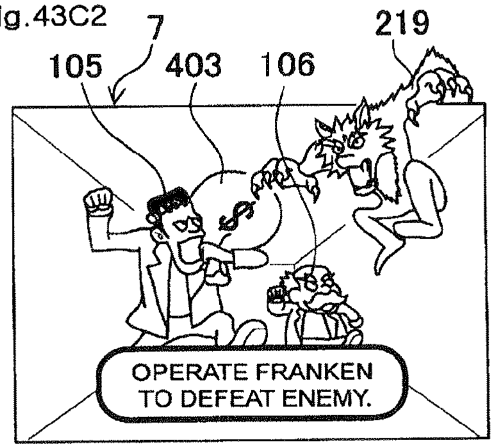

Fig.44A1
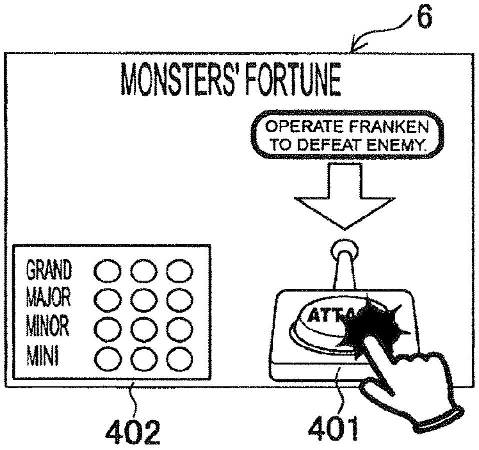
Fig.44A2
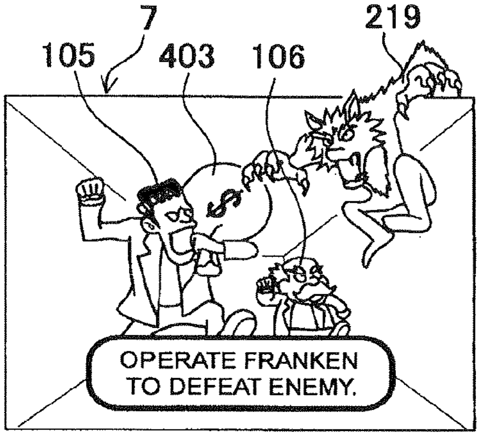
Fig.44B1
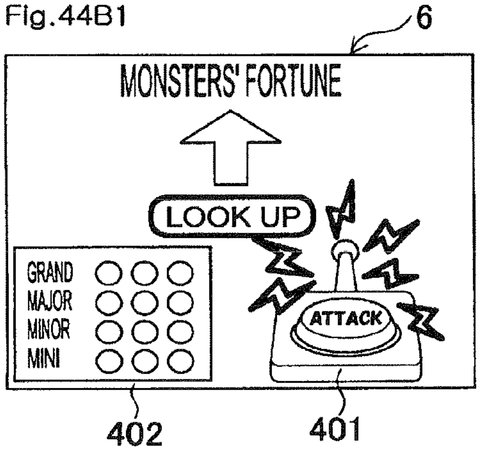
Fig.44B2
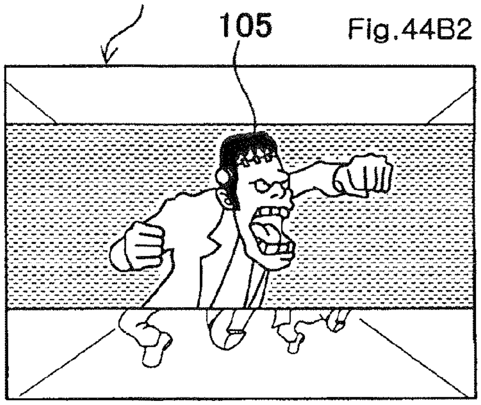
Fig.44C1
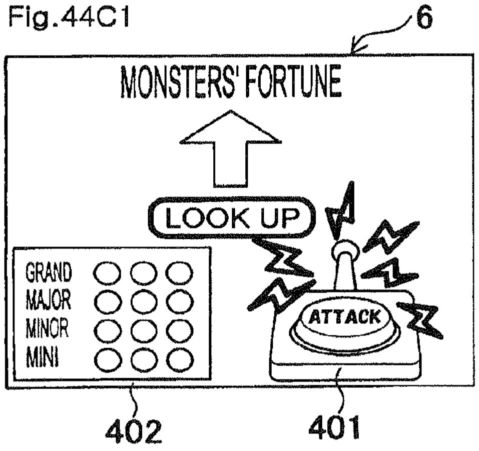
Fig.44C2
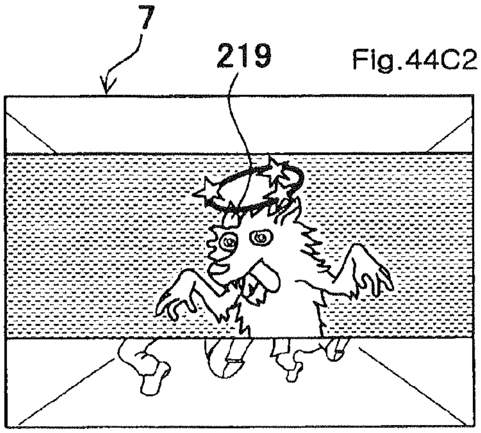

Fig.45A1
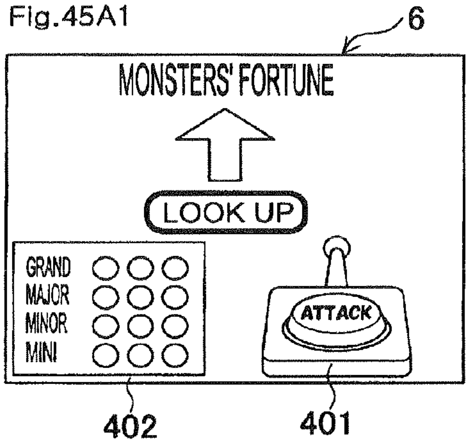
Fig.45A2
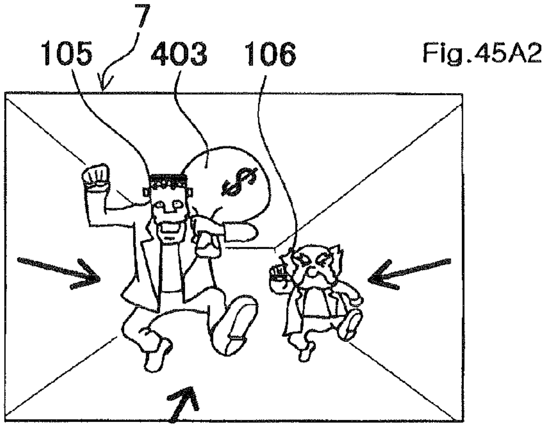
Fig.45B1
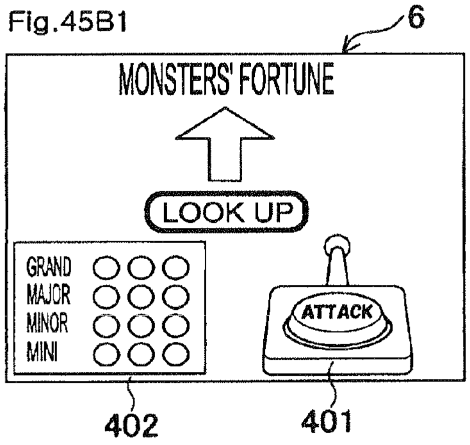
Fig.45B2
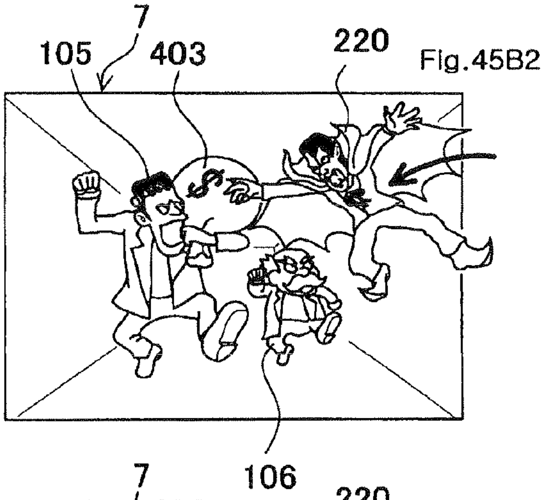
Fig.45C1
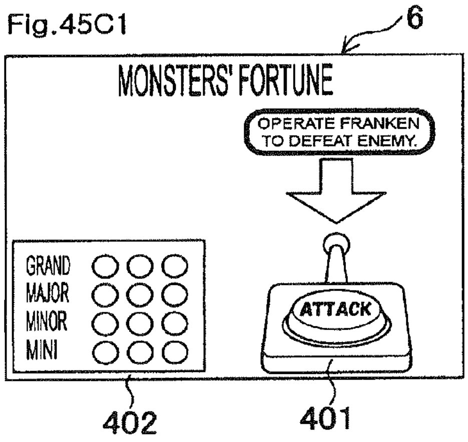
Fig.45C2
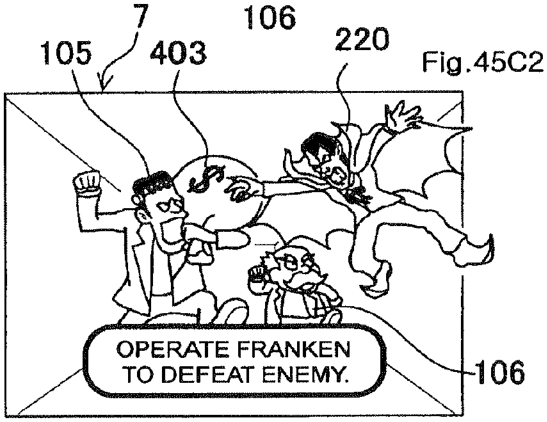

Fig.46A1
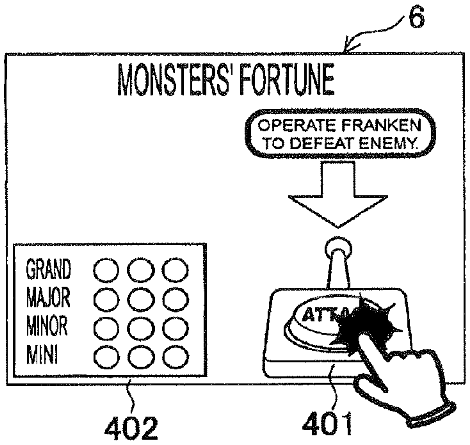
Fig.46A2
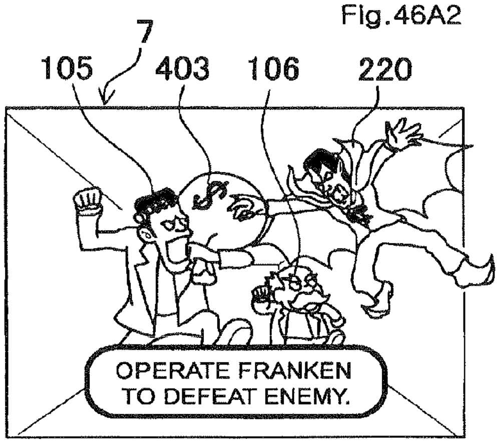
Fig.46B1
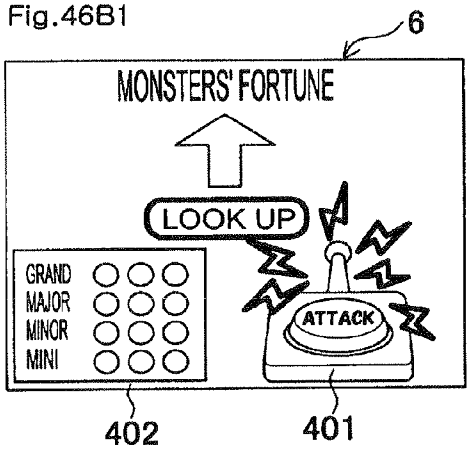
Fig.46B2
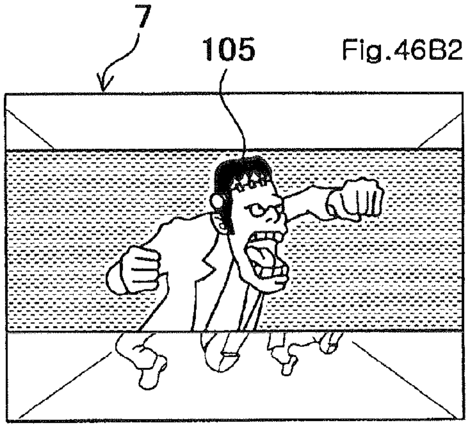
Fig.46C1
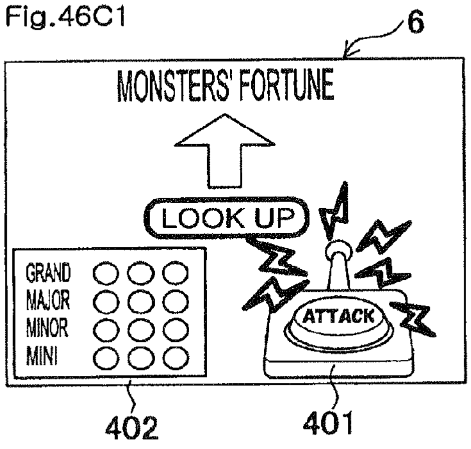
Fig.46C2
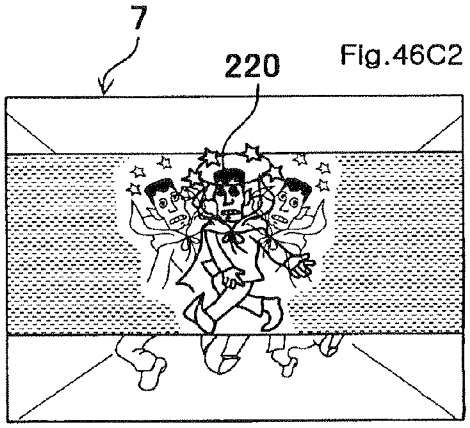

Fig.47A1
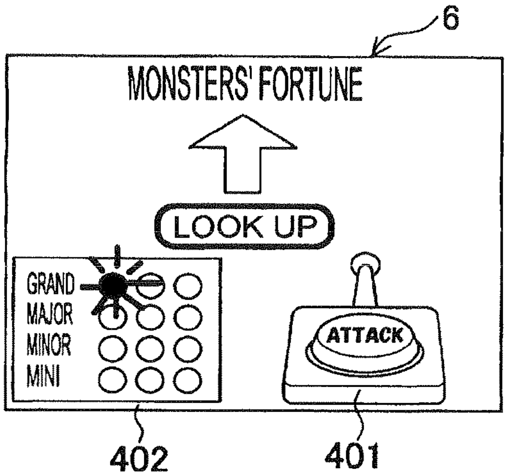
Fig.47A2
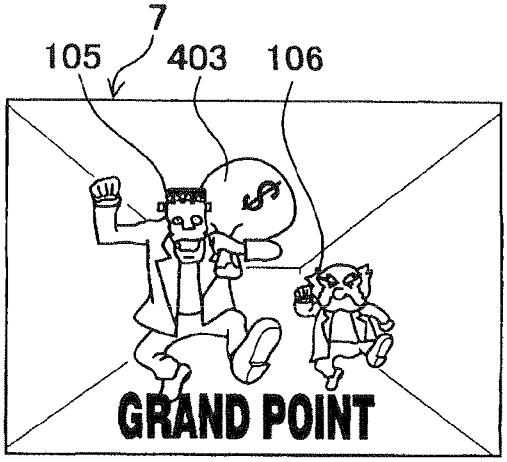
Fig.48A1
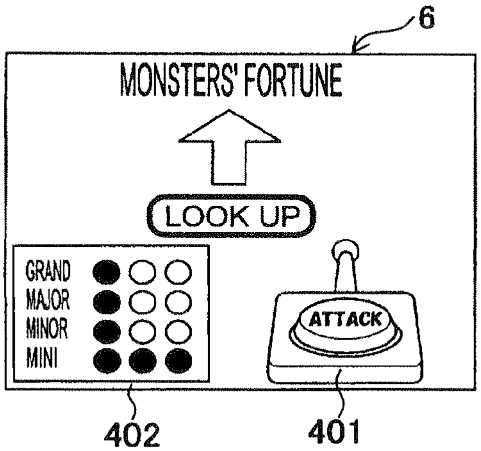
Fig.48A2
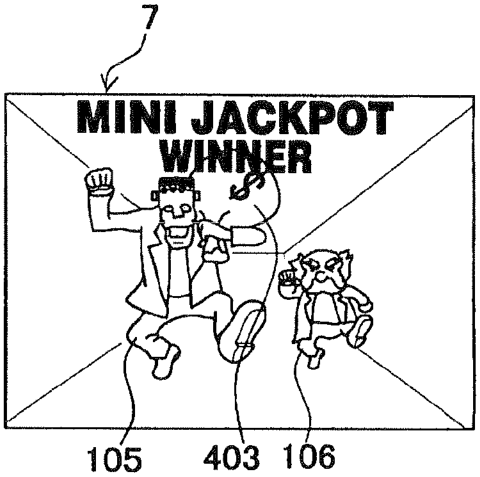
Fig.48B1
Fig.48B2

Fig.49A1
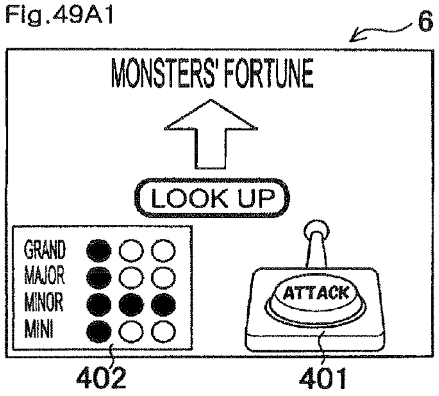
Fig.49A2
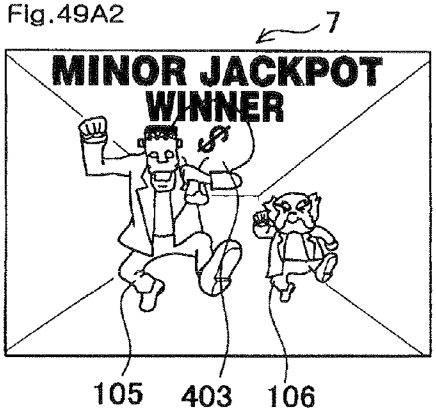
Fig.49B1
Fig.49B2

Fig.50A1
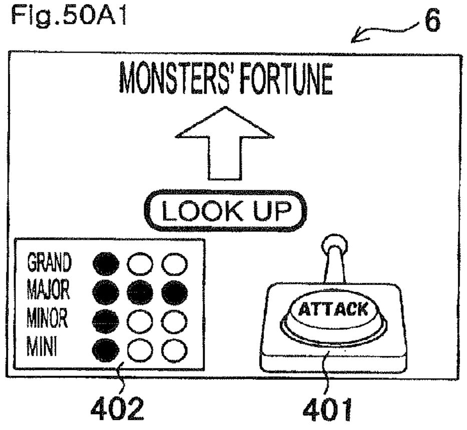
Fig.50A2
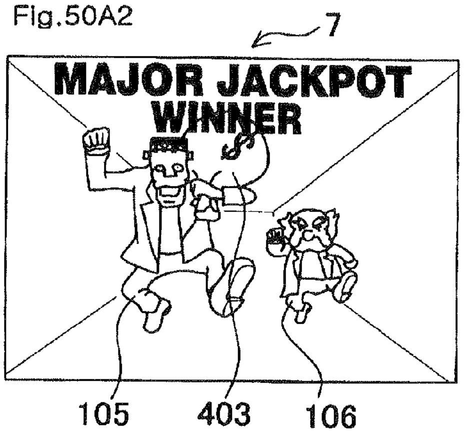
Fig.50B1
Fig.50B2

Fig.51A1
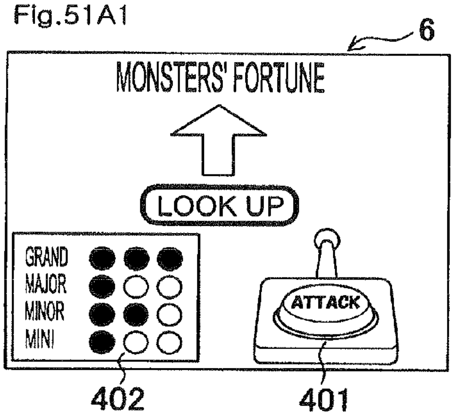
Fig.51A2
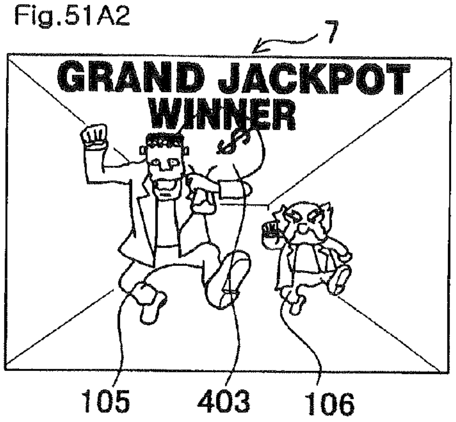
Fig.51B1
Fig.51B2

GAMING MACHINE

CROSS-REFERENCE TO RELATED APPLICATION

This application is a continuation of U.S. patent application Ser. No. 11/808,917 filed on Jun. 13, 2007, which claims International priority to Japanese Patent Application No. 2006-163111 filed Jun. 13, 2006, the disclosure of each of which is hereby incorporated in its entirety by reference.

FIELD OF THE INVENTION

The present invention relates to a gaming machine in which a display for an annunciation or a notice is performed in addition to a symbol display.

RELATED ART

Conventionally, a slot machine in which a lamp is simply turned on to announce to a game player that the big payout is won in an internal lottery is known as such kind of gaming machine, which provides no interesting impact in the game.

Therefore, for example, in the slot machine disclosed in Japanese unexamined patent application publication No. 2001-286601, a liquid crystal display device is used as annunciation means for predictively announcing a flag establishment of each winning combination and the same liquid crystal display device is also used as notifying means for notifying the flag establishment of a specific winning combination. That is, a character appears in the display screen of the liquid crystal display device instead of a predictive effect with a combination of effects of display modes by reel back lamps and the like. Then, a predictive effect is performed with a combination of display variations of the character. Further, the notifying means conducts the notification by causing the same liquid crystal display device to display a specific mode of effect that is different from the predictive effect.

However, since the predictive effect with the combination of display variations of the character appearing is achieved by changing the combination of display variations when each reel is stopped according to the observation push, a sign of winning is not displayed until a stage in which each reel is stopped one by one.

Therefore, it is desired to display the sign of winning or not in earlier stages.

SUMMARY OF THE INVENTION

In the present invention, in consideration of the aforementioned point, a gaming machine is provided in which a sign of payout to be awarded is displayed in an earlier stage.

Thus, a gaming machine comprises: a display device for displaying symbols variably and statically on a display screen; a starting device for an operation to start a variable display of the symbols; a storage device for storing a plurality of predictive effect images corresponding to respective payout levels; and a processor being operable to: conduct an internal lottery to determine a combination of symbols to be displayed statically on the display screen as triggered by the operation of the starting device; select one of the plurality of predictive effect images corresponding to a predetermined winning combination when it is determined that the determined combination to be displayed statically matches the predetermined winning combination; and cause the display device to display the selected one predictive effect image on the display screen as well as the variable display of symbols on the display screen, wherein the plurality of predictive effect images indicate a degree of the payout levels such that a payout level to be awarded can be expected before an operation to stop the variable display.

Further features of the present invention, its nature, and various advantages will be more apparent from the accompanying drawings and the following description of the preferred embodiment.

BRIEF DESCRIPTION OF THE DRAWINGS

FIGS. 8A1, 8A2, 8B1, 8B2, 8C1, and 8C2 are views showing an example of image of a normal-progress-no-payout effect to be displayed during a base game with the slot machine.

FIGS. 9A1, 9A2, 9B1, 9B2, 9C1, and 9C2 are views showing an example of image of a normal-progress-no-payout effect to be displayed during the base game with the slot machine.

FIGS. 10A1, 10A2, 10B1, 10B2, 10C1, and 10C2 are views showing an example of image of a normal-progress-low-payout effect to be displayed during the base game with the slot machine.

FIGS. 11A1, 11A2, 11B1, 11B2, 11C1, and 11C2 are views showing an example of image of a normal-progress-moderate-payout effect to be displayed during the base game with the slot machine.

FIGS. 12A1, 12A2, 12B1, 12B2, 12C1, and 12C2 are views showing an example of image of a normal-progress-high-payout effect to be displayed during the base game with the slot machine.

FIGS. 13A1, 13A2, 13B1, 13B2, 13C1, and 13C2 are view showing an example of image of a moderate payout effect with a door open to be displayed during the base game with the slot machine.

FIGS. 14A1, 14A2, 14B1, 14B2, 14C1, and 14C2 are views showing an example of image of a high payout effect with a door open to be displayed during the base game with the slot machine.

FIGS. 15A1, 15A2, 15B1, 15B2, 15C1, 15C2, 15D1, and 15D2 are views showing an example of image of a moderate payout effect with mischievous expression to be displayed during the base game with the slot machine.

FIGS. 16A1, 16A2, 16B1, 16B2, 16C1, 16C2, 16D1, and 16D2 are views showing an example of image of a high payout effect with mischievous expression to be displayed during the base game with the slot machine.

FIGS. 17A1, 17A2, 17B1, 17B2, 17C1, 17C2, 17D1, and 17D2 are views showing an example of image of a Wild expansion effect to be displayed during the base game with the slot machine.

FIGS. 18A1, 18A2, 18B1, 18B2, 18C1, 18C2, 18D1, and 18D2 are views showing an example of image of the Wild expansion effect to be displayed during the base game with the slot machine.

FIGS. 19A1, 19A2, 19B1, 19B2, 19C1, and 19C2 are views showing an example of image of a bonus game acquisition effect to be displayed during the base game with the slot machine.

FIGS. 20A1, 20A2, 20B1, and 20B2 are views showing an example of image of the bonus game acquisition effect to be displayed during the base game with the slot machine.

FIGS. 21A1, 21A2, 21B1, 21B2, 21C1, 21C2, 21D1, and 21D2 are views showing an example of image of a bonus game acquisition effect to be displayed during the base game with the slot machine.

FIGS. 22A1, 22A2, 22B1, 22B2, 22C1, and 22C2 are views showing an example of image of a feature game acquisition effect to be displayed during the base game with the slot machine.

FIGS. 23A1, 23A2, 23B1, and 23B2 are views showing an example of image of the feature game acquisition effect to be displayed during the base game with the slot machine.

FIGS. 24A1, 24A2, 24B1, 24B2, 24C1, and 24C2 are views showing an example of image of a feature game acquisition effect to be displayed during the base game with the slot machine.

FIGS. 25A1, 25A2, 25B1, and 25B2 are views showing an example of image of an introductory effect to be displayed during a bonus game with the slot machine.

FIGS. 26A1, 26A2, 26B1, 26B2, 26C1, and 26C2 are views showing an example of image of a basic effect to be displayed during the bonus game with the slot machine.

FIGS. 27A1, 27A2, 27B1, and 27B2 are views showing an example of image of the basic effect to be displayed during the bonus game with the slot machine.

FIGS. 28A1, 28A2, 28B1, 28B2, 28C1, and 28C2 are views showing an example of image of a feature effect to be displayed during the bonus game with the slot machine.

FIGS. 29A1, 29A2, 29B1, 29B2, 29C1, and 29C2 are views showing an example of image of a feature effect to be displayed during the bonus game with the slot machine.

FIGS. 30A1, 30A2, 30B1, 30B2, 30C1, and 30C2 are views showing an example of image of a reaction effect to be displayed during the bonus game with the slot machine.

FIGS. 31A1, 31A2, 31B1, 31B2, 31C1, and 31C2 are views showing an example of image of a reaction effect to be displayed during the bonus game with the slot machine.

FIGS. 32A1, 32A2, 32B1, 32B2, 32C1, and 32C2 are views showing an example of image of a reaction effect to be displayed during the bonus game with the slot machine.

FIGS. 33A1, 33A2, 33B1, 33B2, 33C1, and 33C2 are views showing an example of image of a reaction effect to be displayed during the bonus game with the slot machine.

FIGS. 34A1, 34A2, 34B1, 34B2, 34C1, and 34C2 are views showing an example of image of a reaction effect to be displayed during the bonus game with the slot machine.

FIGS. 35A1, 35A2, 35B1, 35B2, 35C1, and 35C2 are views showing an example of image of a reaction effect to be displayed during the bonus game with the slot machine.

FIGS. 36A1, 36A2, 36B1, 36B2, 36C1, and 36C2 are views showing an example of image of a reaction effect to be displayed during the bonus game with the slot machine.

FIGS. 38A1, 38A2, 38B1, and 38B2 are views showing an example of image of a basic effect to be displayed during the feature game with the slot machine.

FIGS. 39A1, 39A2, 39B1, 39B2, 39C1, and 39C2 are views showing an example of image of an action effect to be displayed during the feature game with the slot machine.

FIGS. 40A1, 40A2, 40B1, 40B2, 40C1, and 40C2 are views showing an example of image of the action effect to be displayed during the feature game with the slot machine.

FIGS. 41A1, 41A2, 41B1, 41B2, 41C1, and 41C2 are views showing an example of image of an action effect to be displayed during the feature game with the slot machine.

FIGS. 42A1, 42A2, 42B1, 42B2, 42C1, and 42C2 are views showing an example of image of the action effect to be displayed during the feature game with the slot machine.

FIGS. 43A1, 43A2, 43B1, 43B2, 43C1, and 43C2 are views showing an example of image of an action effect to be displayed during the feature game with the slot machine.

FIGS. 44A1, 44A2, 44B1, 44B2, 44C1, and 44C2 are views showing an example of image of the action effect to be displayed during the feature game with the slot machine.

FIGS. 45A1, 45A2, 45B1, 45B2, 45C1, and 45C2 are views showing an example of image of an action effect to be displayed during the feature game with the slot machine.

FIGS. 46A1, 46A2, 46B1, 46B2, 46C1, and 46C2 are views showing an example of image of the action effect to be displayed during the feature game with the slot machine.

FIGS. 47A1 and 47A2 are views showing an example of image of a point acquisition effect to be displayed during the feature game with the slot machine.

FIGS. 48A1, 48A2, 48B1, and 48B2 are views showing an example of image of a mini-progressive jackpot acquisition effect to be displayed during the feature game with the slot machine.

FIGS. 49A1, 49A2, 49B1, and 49B2 are views showing an example of image of a minor-progressive jackpot acquisition effect to be displayed during the feature game with the slot machine.

FIGS. 50A1, 50A2, 50B1, and 50B2 are views showing an example of image of a major-progressive jackpot acquisition effect to be displayed during the feature game with the slot machine.

FIGS. 51A1, 51A2, 51B1, and 51B2 are views showing an example of image of a grand-progressive jackpot acquisition effect to be displayed during the feature game with the slot machine.

DESCRIPTION OF THE PREFERRED EMBODIMENT

In the following, a gaming machine relating to the present invention is described in detail based on one embodiment in which the gaming machine is materialized as a slot machine with reference to the attached drawings.

Figure 1:
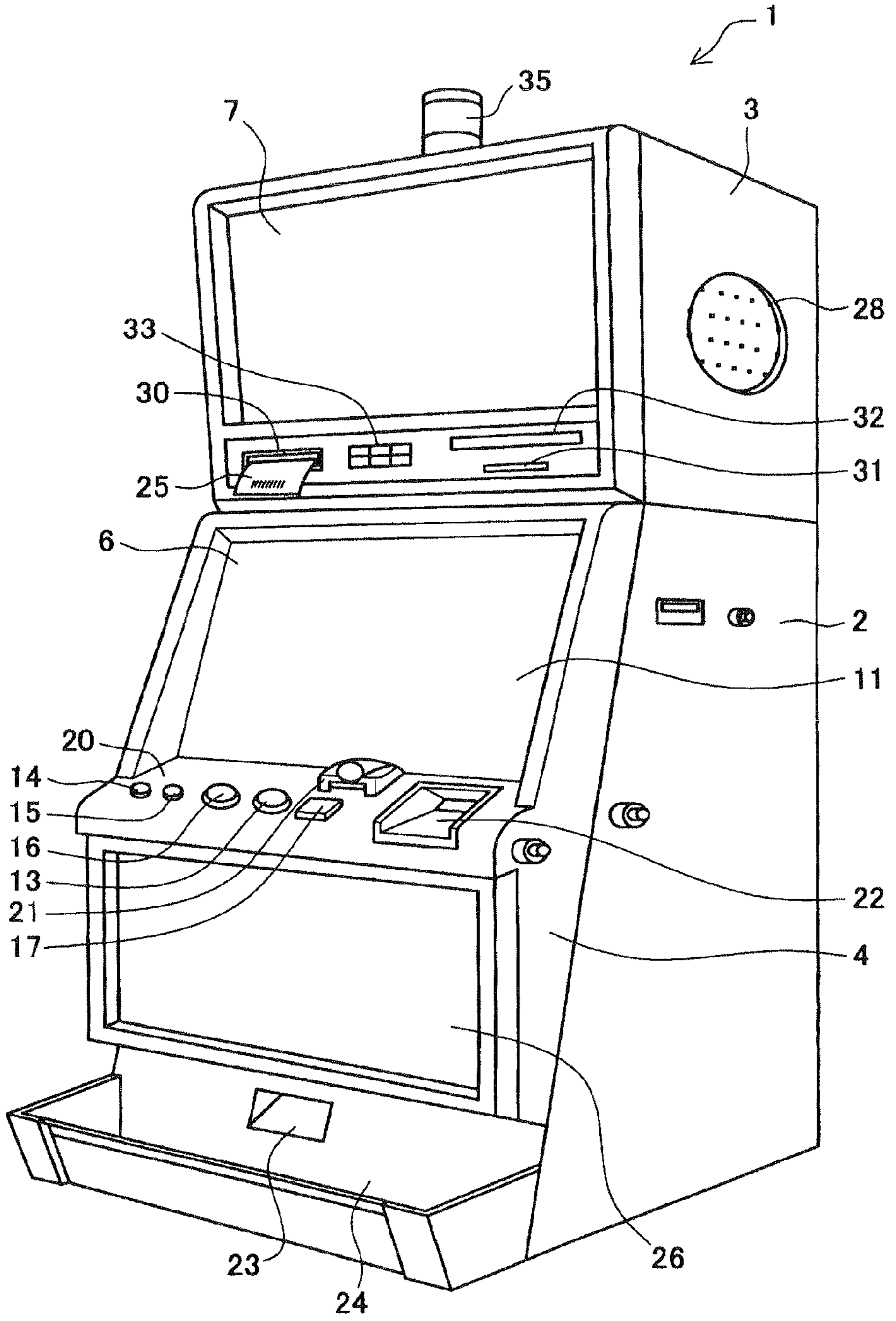
FIG. 1 is a perspective view of an outer appearance of a slot machine according to the present embodiment.

First, a schematic configuration of a slot machine 1 related to the present embodiment is described based on FIG. 1. FIG. 1 is a perspective view showing an outer appearance of the slot machine relating to the present embodiment.

The slot machine 1 relating to the present embodiment comprises: a cabinet 2, a top box 3 disposed on the cabinet 2, and a main door 4 provided on the front face of the cabinet 2.

Figure 2:
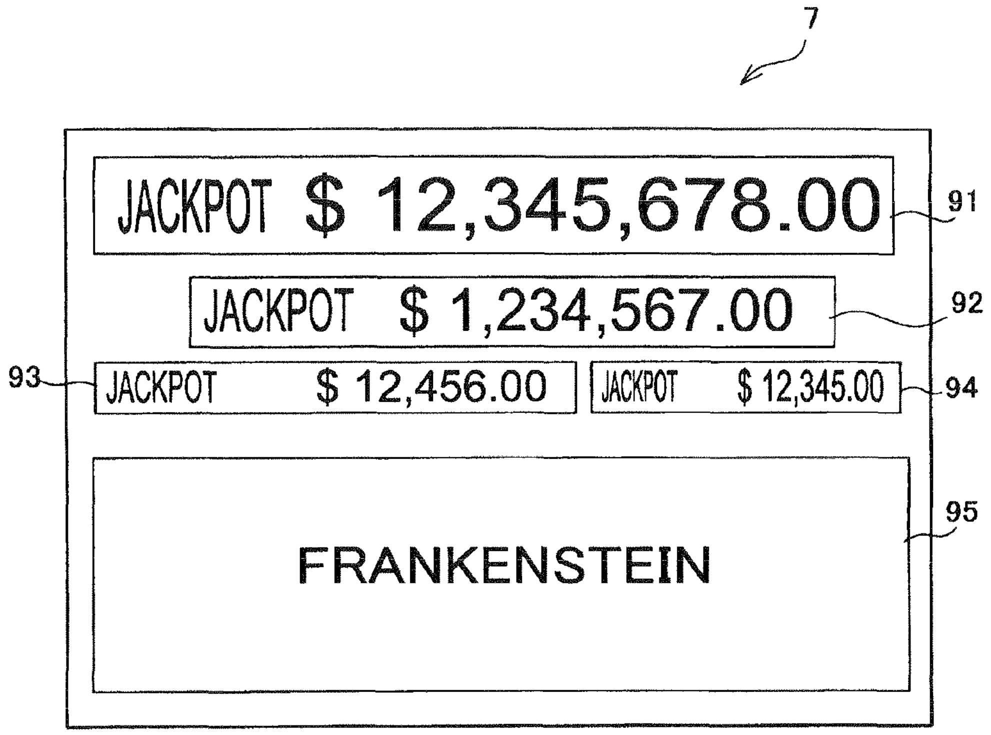
FIG. 2 is a view showing an example of an image displayed on an upper image display panel of the slot machine.

An upper image display panel 7 is provided on the front face of the top box 3. Here, the upper image display panel 7 comprises a publicly-known transparent liquid crystal panel, and usually displays information related to the game of the slot machine 1, such as a demonstration image, a game rule, and a payout table. For example, FIG. 2 shows contents displayed on the upper image display panel 7 in a base game. As shown in FIG. 2, during the base game, the payout display parts 91, 92, 93, and 94 of respective progressive jackpots and an information annunciator part 95 are displayed on the upper image display panel 7. In this regard, the respective payout display parts 91, 92, 93, and 94 display the payouts of respective progressive jackpots of grand, major, minor, and mini used in a feature game to be described later.

Here, reference numerals shown in FIG. 2 are not shown in FIGS. 8 to 24 to be described later for convenience of description.

On the other hand, a lower image display panel 6 is provided on the front face of the main door 4. Here, images related to the game of the slot machine 1 displayed on the lower image display panel 6 are described.

Figure 3:
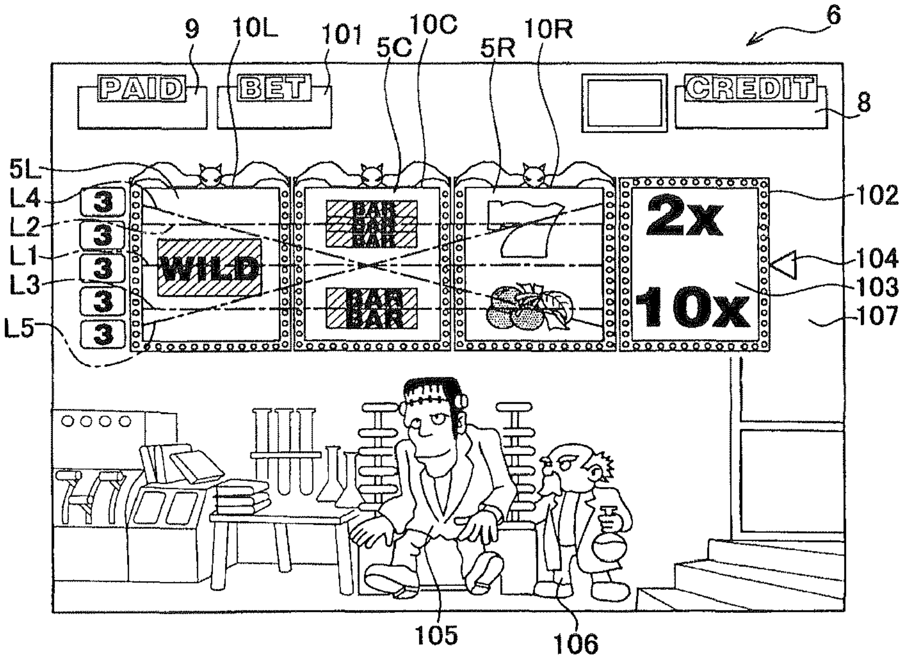
FIG. 3 is a view showing an example of an image displayed on a lower image display panel of the slot machine.
Figure 4:
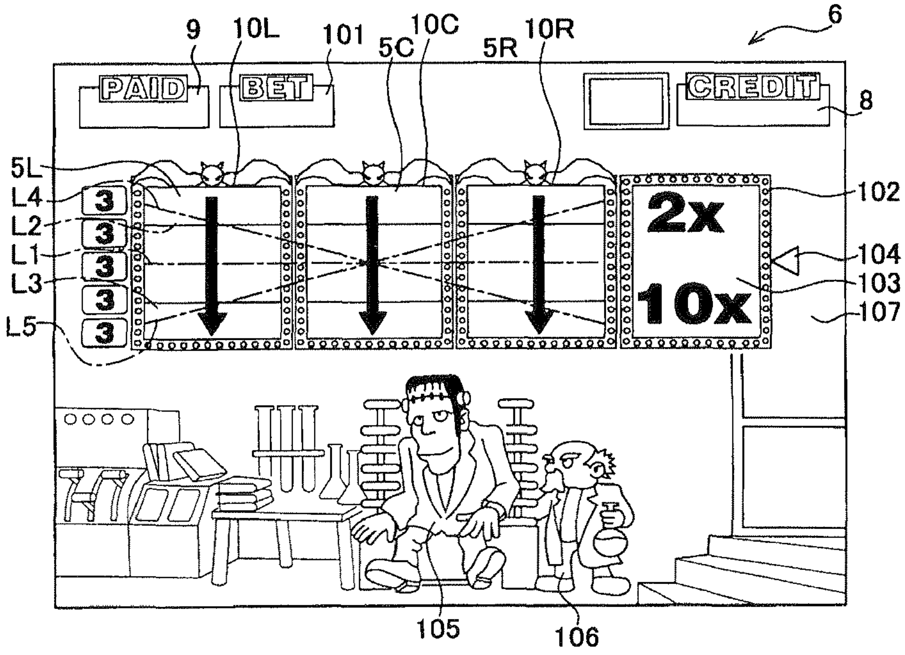
FIG. 4 is a view showing an example of an image displayed on a lower image display panel of the slot machine.

FIGS. 3 and 4 show sample contents displayed on the lower image display panel 6 by way of example. As shown in FIGS. 3 and 4, on the lower image display panel 6, symbols drawn on the virtual outer circumferential surfaces of the respective video reels 5L, 5C, and 5R can be recognized visually from display windows 10L, 10C, and 10R during the base game. FIG. 3 shows a stopped state (or static state) of the symbols drawn on the virtual outer circumferential surfaces of the respective video reels 5L, 5C, and 5R, and FIG. 4 shows a rotation state (or variable state) of the symbols drawn on the virtual outer circumferential surfaces of the respective video reels 5L, 5C, and 5R.

Figure 5:
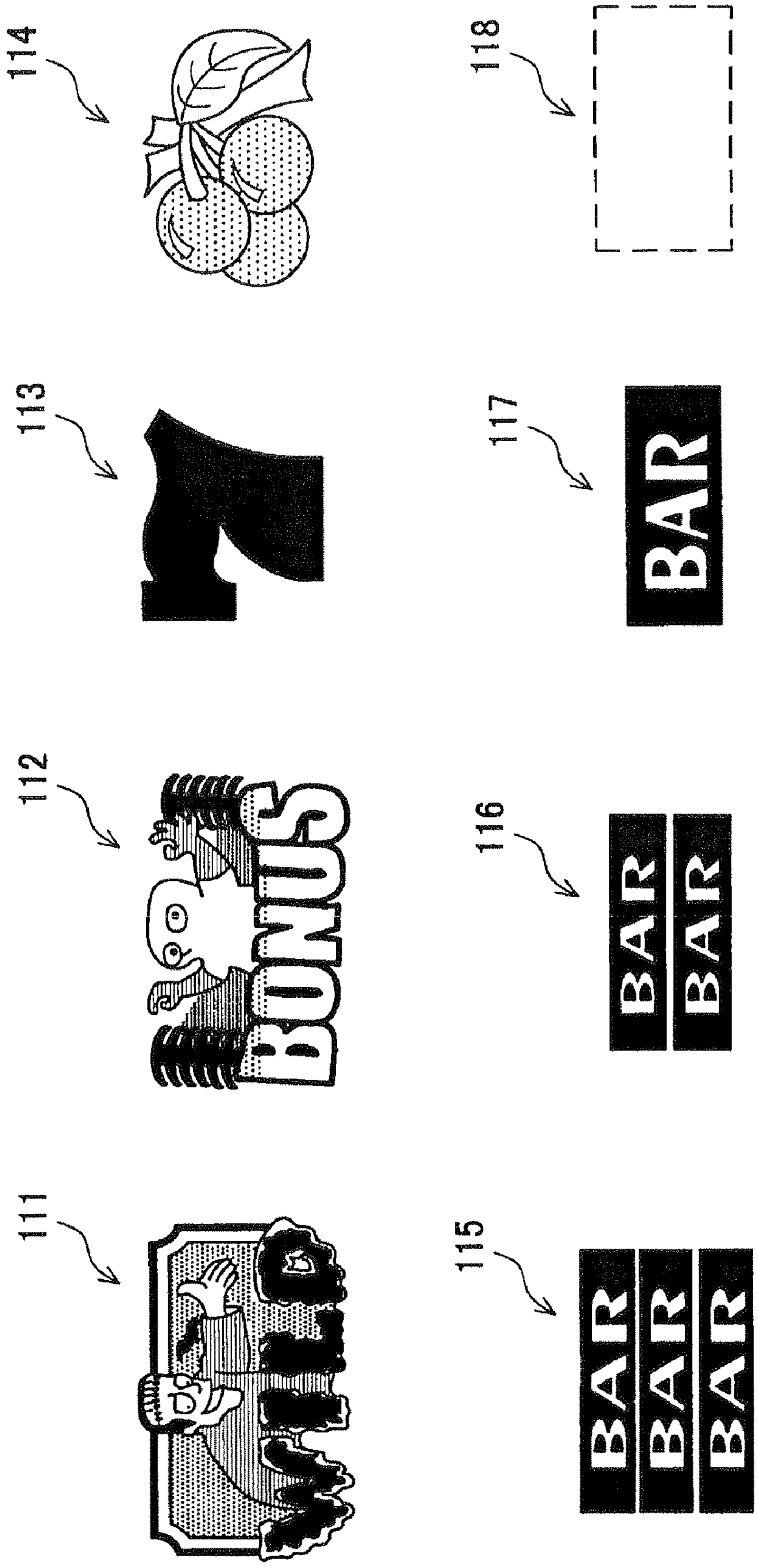
FIG. 5 is a view showing respective symbols constituting a symbol array drawn on a virtual outer circumferential face of each video reel of the slot machine.

An array of symbols comprising a prescribed number of designs (Here, the respective symbols may also be referred to as designs. Refer to FIG. 5.) is drawn on the virtual outer circumferential surface of each of the three video reels 5L, 5C, and 5R.

A touch panel 11 (refer to FIG. 1) is provided on the front face of the lower image display panel 6, and a game player can operate the touch panel 11 (refer to FIG. 1) to input various kinds of instructions.

A credit number display part 8, a payout number display part 9, and a bet number display part 101 are provided in the lower image display panel 6. The credit number display part 8 displays a credit number currently owned by the game player. The payout number display part 9 displays the amount of payout given when a combination of symbols stopped and displayed on any one of five pay lines L1 to L5 matches a predetermined combination as a payout number. The bet number display part 101 displays a bet number currently bet by the game player for one game.

Specifically, the three visually recognizable display windows 10L, 10C, and 10R are displayed on the lower image display panel 6, and three symbols drawn on each of the virtual outer circumferential surfaces of the respective video reels 5L, 5C, and 5R are displayed via each of the display windows 10L, 10C, and 10R. The five pay lines L1 to L5 which cross horizontally or obliquely the three display windows 10L, 10C, and 10R are formed on the lower image display panel 6. Each of the pay lines L1 to L5 specifies a combination of symbols. When a combination of symbols stopped and displayed on any one of the five pay lines L1 to L5 matches a predetermined combination, the amount of payout corresponding to the combination and a bet credit number (bet number) is provided. At this time, when combinations of symbols stopped and displayed on two or more pay lines among the five pay lines L1 to L5 match predetermined combinations, respectively, the amount of payout for each of the predetermined combinations is summed up and provided.

In a bonus game or the feature game to be described later, a predetermined screen is displayed in a state where the display windows 10L, 10C, and 10R (including the respective video reels 5L, 5C, and 5R) and the respective pay lines L1 to L5 are erased.

In the lower image display panel 6, multiplication factors drawn on the virtual outer circumferential surface of a video reel 103 can be visually recognized in a display window 102 during the base game as shown in FIGS. 3 and 4.

In addition, an array of mathematical expressions comprising six kinds of multiplication factors (2×, 3×, 5×, 10×, 20×, and 100×) and a blank (an area where the multiplication factor is not shown) are drawn on the virtual outer circumferential surface of the video reel 103.

In the lower image display panel 6, an arrow 104 is formed near the middle position on the right side of the display window 102. The arrow 104 specifies the multiplication factor.

When the video reel 103 rotates and stops in the display window 102 after symbols are stopped and displayed, respectively, on the display windows 10L, 10C, and 10R, the amount of payout is increased by being multiplied by a multiplication factor stopped and displayed at the just left position next to the arrow 104. However, when the blank is stopped and displayed at the just left position next to the arrow 104, the amount of payout is maintained and not increased.

A state of a laboratory including respective characters of Frankenstein 105 and a doctor 106, a door 107, and the like is displayed on the lower image display panel 6 as shown in FIGS. 3 and 4, which will be described later. Reference numerals shown in FIGS. 3 and 4 are not shown in FIGS. 8 to 24 to be described later for convenience of explanation.

Returning back to FIG. 1, a control panel 20 with a plurality of buttons through which instructions related to a game progress are input by the game player, a coin receiving opening 21 for receiving coins as game media inside the cabinet 2, and a bill discrimination unit 22 are provided below the lower image display panel 6.

A spin button 13, a change button 14, a CASHOUT button 15, a 1-BET button 16, and a maximum BET button 17 are provided on the control panel 20. The spin button 13 is operating means for inputting an instruction to start the rotation of the video reels 5L, 5C, and 5R. The change button 14 is operating means used for the game player to ask the game arcade staff for changes. The CASHOUT button is operating means for inputting an instruction to pay out coins corresponding to the credit number owned by the game player (one credit corresponds to one coin) from a coin payout opening 23 to a coin tray 24, or an instruction to pay out a ticket 25 with a bar code to be described later.

The 1-BET button 16 is operating means for receiving an instruction to bet one credit for one game from among the credits owned by the game player. The maximum BET button 17 is operating means for receiving an instruction to bet for one game the maximum number of credits (five credits in the present embodiment) which can be bet for one game from among the credits owned by the game player.

A reverter 21S (refer to FIG. 6) and a coin counter 21C (refer to FIG. 6) are provided inside the coin receiving opening 21. The reverter 21S (refer to FIG. 6) checks the suitability of coins inserted into the coin receiving opening 21, and discharges objects other than regular coins from the coin payout opening 23. The coin counter 21C (refer to FIG. 6) detects received regular coins, and counts the number of the received regular coins.

The bill discrimination unit 22 checks the suitability of bills and accepts regular bills into the cabinet 2. Then, the bills inserted into the cabinet 2 are converted into the number of coins, and the equivalent number of credits to the converted number of coins are added as credits owned by the game player. The bill discrimination unit 22 is configured to be capable of reading the ticket 25 with the bar code to be described later. Then, a belly glass 26 on which the characters of the slot machine 1 and the like are drawn is provided on the front lower part of the main door 4, that is, below the control panel 20.

The coins, the bills, or electronic valuable information equivalent thereto (credit) are used as game media of the slot machine 1 related to the present embodiment. However, game media applicable to the present invention are not limited thereto, and can include medals, tokens, electronic money, and tickets, for example.

A ticket printer 30, a card reader 31, a data indicator 32, and a keypad 33 are provided on the lower side of the upper image display panel 7.

Here, the ticket printer 30 is a printer for printing, on a ticket, a bar code in which data on the number of credits, date and time, the identification number of the slot machine 1, and the like are coded, and outputting the ticket as a ticket 25 with the bar code. Then, the game player can use the output ticket

25 with the bar code to play the game with another gaming machine by having the gaming machine read the output ticket 25 with the bar code, or use the ticket 25 for a procedure such as exchange with the equivalent number of coins or the like at a prescribed place in the amusement center.

The card reader 31 reads data from a smart card, and writes data onto the smart card. The smart card is a card held by the game player, and stores data of the history of games played by the game player, for example.

The data indicator 32 comprises a fluorescent display and the like, and displays, by way of example, data read by the card reader 31 and data input by the game player via the keypad 33. The keypad 33 is used for inputting an instruction and data about issuing the ticket and the like. A lamp 35 is provided on the top surface of the top box 3. The lamp 35 is turned on in a predetermined lighting mode for calling an arcade staff in the amusement center in the case where an error or the like occurs on the slot machine 1.

Next, the symbols drawn on each of the virtual outer circumferential surfaces of the video reels 5L, 5C, and 5R, and variably displayed via each of the display windows 10L, 10C, and 10R of the lower image display panel 6 as they are scrolled during the base game are explained with reference to FIG. 5. FIG. 5 shows individual symbols forming the array of symbols drawn on each of the virtual outer circumferential surfaces of the respective video reels 5L, 5C, and 5R.

A plurality of symbols of WILD 111, BONUS 112 and SEVEN 113, CHERRY 114, triple BAR 115, double BAR 116, single BAR 117, and blank (an area where no symbol is drawn) 118 are suitably combined and arranged in a predetermined order on each of the virtual outer circumferential surfaces of the left video reel 5L, the center video reel 5C, and the right video reel 5R. Thus, the arrays of symbols are provided on the virtual outer circumferential surfaces of the respective video reels 5L, 5C, and 5R. Although not illustrated, a code number used in a lottery for determining a symbol to be stopped and displayed in each of the display windows 10L, 10C, and 10R is given to each of the symbols 111 to 117 and the blank 118 forming the array of symbols of each of the video reels 5L, 5C and 5R.

Figure 7:
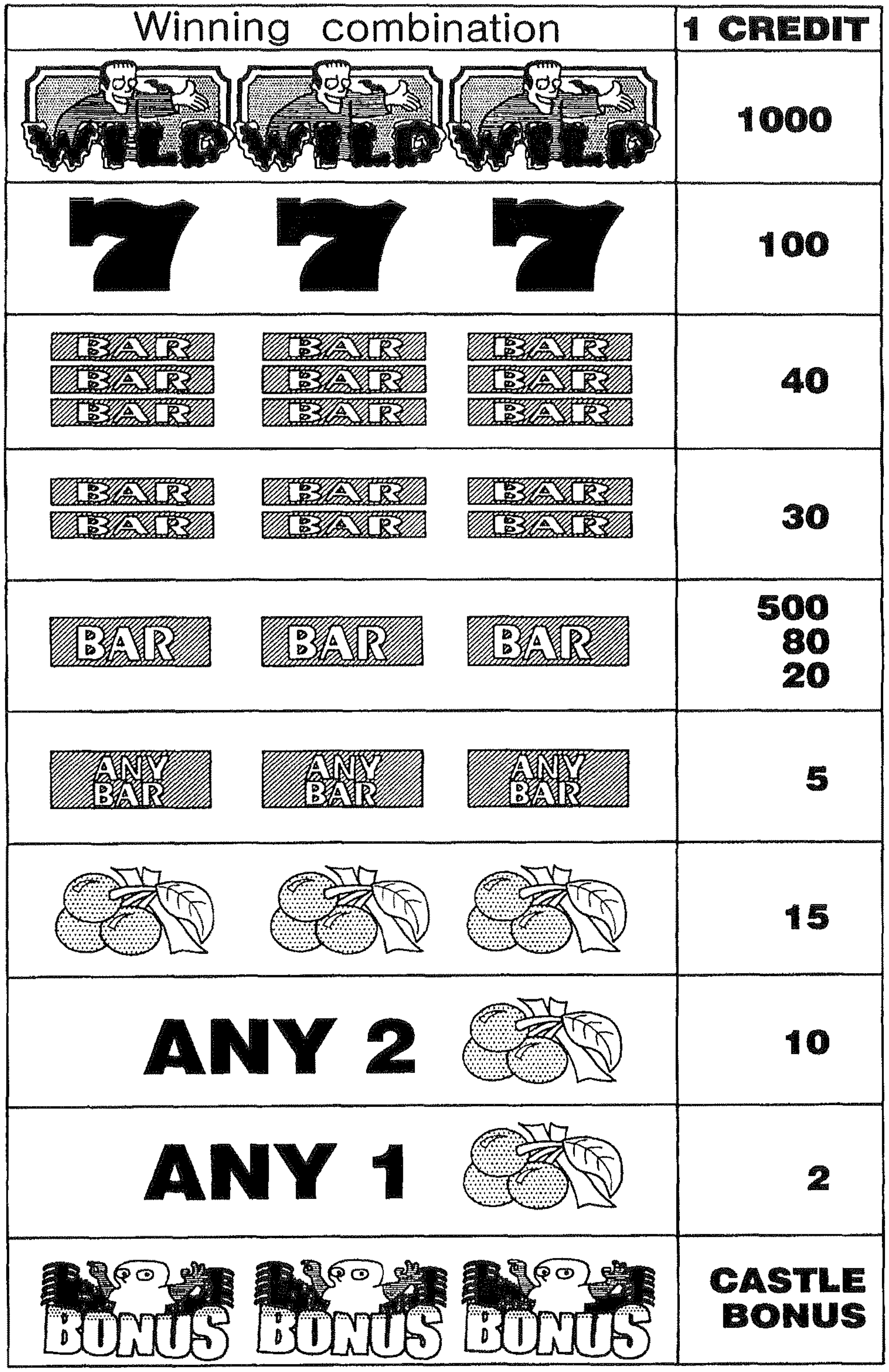
FIG. 7 is a view showing a payout table tabulating a payout and a winning probability of each winning combination of the slot machine.

Regarding each of the symbols of WILD 111, SEVEN 113, CHERRY 114, triple BAR 115, double BAR 116, and single BAR 117, a predetermined amount of payout is awarded to the game player when three symbols are stopped and displayed on any one of the five pay lines L1 to L5 (refer to FIG. 7). Regarding the symbol of CHERRY 114, a predetermined payout amount is awarded to the game player according to the number even when one or two symbols are stopped and displayed on any one of the five pay lines L1 to L5 (refer to FIG. 7).

Regarding each symbol of triple BAR 115, double BAR 116, and single BAR 117, a predetermined amount of payout is awarded to the game player when three symbols of the same kind among the above are stopped and displayed even though the three symbols are not aligned along any one of the five pay lines L1 to L5 (refer to FIG. 7).

The symbol WILD 111 is a symbol which can be substituted for any kind of symbol among SEVEN 113, CHERRY 114, triple BAR 115, double BAR 116, and single BAR 117. Therefore, for example, a case where two symbols of SEVEN 113 and one symbol of WILD 111 are stopped and displayed or a case where one symbol of SEVEN 113 and two symbols of WILD 111 are stopped and displayed along any one of the five pay lines L1 to L5, is treated as a case where three symbols of SEVEN 113 are stopped and displayed along such one of the five pay lines L1 to L5. The same analogy also applies to each symbol of CHERRY 114, triple BAR 115, double BAR 116, and single BAR 117. Further, a case where one symbol of CHERRY 114 and one symbol of WILD 111 are stopped and displayed along any one of the five pay lines L1 to L5 is treated as a case where two symbols of CHERRY 114 are stopped and displayed along any one of the five pay lines L1 to L5.

When the symbol of WILD 111 on the center video reel 5C is stopped and displayed along any one of the five pay lines L1 to L5 (in the display window 10C), the symbol is fully expanded in the display window 10C (refer to FIG. 17), whereby the symbol is treated as being stopped and displayed on all the five pay lines L1 to L5.

When three symbols of BONUS 112 are stopped and displayed along any one of the five pay lines L1 to L5, the game shifts to the bonus game. Here, the game performed on the slot machine 1 related to the present embodiment comprises three game modes, that is, the base game, the bonus game, and the feature game. In the base game, a game for stopping a combination of specific symbols along any one of the pay lines L1 to L5 is performed with the video reels 5L, 5C and 5R. On the other hand, in the bonus game, a plurality of objects as selectable choices are displayed on the lower image display panel 6, and a game for selecting some of the objects is performed such that the game player is awarded with a payout amount associated with each of the objects the player has selected. And in the feature game, a game for getting a progressive jackpot, which may correspond to any one of grand, major, minor, and mini, is performed as the progressive jackpot has accumulated three kinds of points awarded to the game player upon the game player's operation of an attack button as shown on the lower image display panel 6. The game shifts to the feature game from the base game as a result of the internal lottery (so-called mystery) performed during the base game. The details of the bonus game and the feature game will be described later.

When the spin button 13 is pressed after a bet number is fixed by the operation of the 1-BET button 16 or the max BET button 17, the array of symbols comprising the symbols shown in FIG. 5 and being drawn on each of the virtual outer circumferential surfaces of the video reels 5L, 5C, and 5R is scrolled and displayed downward in each of the display windows 10L, 10C, and 10R as the video reels 5L, 5C, and 5R (refer to FIG. 4) are rotated. After a predetermined period of time elapses, the array of symbols is stopped and displayed in each of the display windows 10L, 10C, and 10R as each of the video reels 5L, 5C, and 5R (refer to FIG. 3) stops. Various kinds of winning combinations (refer to FIG. 7) are determined in advance based on each combination of symbols, and when a combination of symbols corresponding to anyone of the winning combinations stops along any one of the pay lines L1 to L5, an amount of payout corresponding to the stopped winning combination is awarded to the game player.

Figure 6:
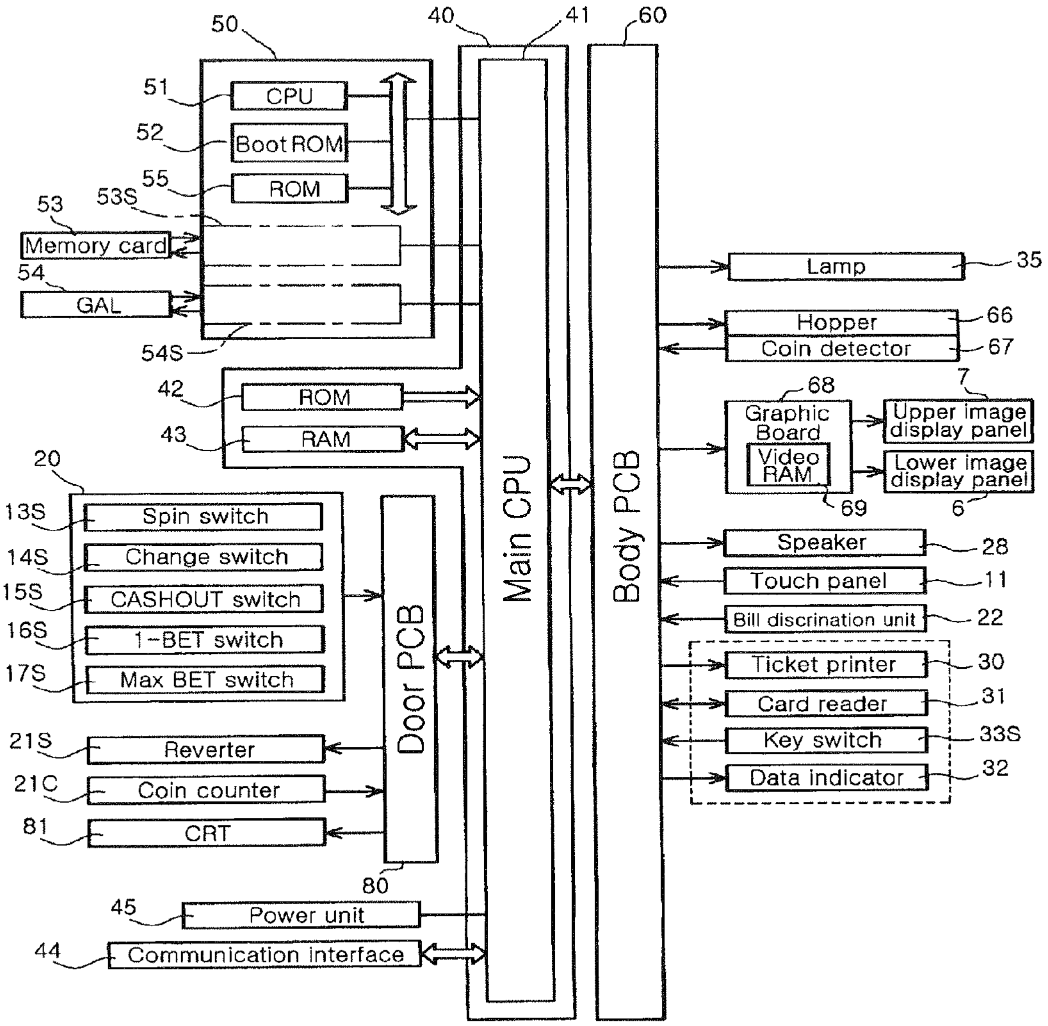
FIG. 6 is a block diagram showing schematically a control system of the slot machine.

Next, a configuration related to the control system of the slot machine 1 according to the present embodiment is described with reference to FIG. 6. FIG. 6 is a block diagram showing schematically the control system of the slot machine 1 according to the present embodiment.

As shown in FIG. 6, the control system of the slot machine 1 basically comprises a mother board 40 and a gaming board 50.

First, the gaming board 50 is explained. The gaming board 50 is provided with an IC socket 54S corresponding to a GAL (Generic Array Logic) 54, a card slot 53S corresponding to a memory card 53, and a CPU 51, a ROM 55 and a boot ROM 52 which are connected to each other by an internal bus.

The memory card 53 comprises a non-volatile memory, and works as a recording medium in which a game program and a game system program (hereinafter referred to as game program and the like) are recorded. The game program recorded in the memory card 53 includes a lottery program. The lottery program is a program for determining the symbols (respective code numbers corresponding to the symbols) of the respective video reels 5L, 5C, and 5R which are stopped and displayed along the pay line L1. The lottery program includes symbol weighting data corresponding to a plurality of payout rates (for example, 80%, 84%, 88%), respectively. The symbol weighting data is data indicating a correspondence relationship between the code number of each symbol and one or a plurality of random number values belonging to a predetermined numeric value range (0 to 255) relating to each of the three video reels 5L, 5C, and 5R. That is, one or a plurality of random number values are associated with the code number of one symbol, and when a random number is extracted by lottery, a symbol specified by the random number value is stopped and displayed.

The payout rate is determined based on payout rate setting data output from the GAL 54, and a lottery is conducted based on symbol weighting data corresponding to the payout rate.

Also, the card slot 53S is adaptedly configured such that the memory card 53 can be inserted into and extracted from it, and connected to the mother board 40 via an IDE bus. Therefore, the kind and contents of the game played on the slot machine 1 can be changed by rewriting the game program and the like stored in the memory card 53. It is also possible to change the kind and contents of the game played on the slot machine 1 by exchanging the memory card 53 in hand with another memory card 53 storing another game program and the like.

The game program includes image data such as symbols (refer to FIG. 7) drawn on the virtual outer circumferential surfaces of the respective video reels 5L, 5C, 5R, and 103; image data such as game rules and payout tables; and image data such as demonstration images, in addition to data of the program for the game progress; and image effects, sounds, and the like that are output during the game (for example, refer to FIGS. 8 to 51 to be described later).

The GAL 54 is a kind of PLD having an OR fixed mount type array structure. The GAL 54 is provided with a plurality of input ports and output ports, and when predetermined data is input into an input port, data corresponding to the predetermined data is output from an output port. The data output from this output port is the payout rate setting data as described above.

The IC socket 54S is so adaptedly configured as to allow removal of the GAL 54, and connected to the mother board 40 via a PCI bus. Therefore, the payout rate setting data output from the GAL 54 can be changed by rewriting the GAL 54 or replacing the GAL 54 itself.

The CPU 51, the ROM 55, and the boot ROM 52 mutually connected via the internal bus are connected to the mother board 40 via the PCI bus. The PCI bus transfers signals between the mother board 40 and the gaming board 50, and supplies electric power from the mother board 40 to the gaming board 50. The ROM 55 stores country identification information and an authentication program. The boot ROM 52 stores a program for a preliminary authentication program, a program for causing the CPU 51 to activate the preliminary authentication program (boot code), and the like.

The authentication program is a program for authenticating the game program and the like (alteration check program). The authentication program is described according to the procedure of the alteration check of the game program subjected to authentication loading processing. The preliminary authentication program is a program for authenticating the authentication program described above, and described according to the procedure for the alteration check of the authentication program subjected to the authentication processing.

Subsequently, the mother board 40 is described. The mother board 40 is formed by using a commercially available general-purpose mother board (printed wiring board mounted with the basic components of a personal computer), and provided with a main CPU 41, a ROM 42, a RAM 43, and a communication interface 44.

The ROM 42 is composed of a memory device such as a flash memory and stores permanent data such as lottery tables and payout tables (refer to FIG. 7) used in the base game and the bonus game; and programs, e.g., BIOS executed by the main CPU 41. When the BIOS is executed by the main CPU 41, the initialization process of prescribed peripheral devices is performed and the loading process of the game program stored in the memory card 53 and the like is started via the gaming board 50.

The RAM 43 stores data and programs utilized when the main CPU 41 operates. Further, the RAM 43 can store various kinds of information such as various programs read via the gaming board 50 including the authentication program and the game program, and the credit number and the bet number currently owned by the game player.

The communication interface 44 is a communication device for communicating with a server installed in the amusement center via a communication line. The slot machine 1 transfers bet information, a lottery result of the base game lottery process, and the like in the main game process to be described later (refer to S2 of FIG. 52) to the server and the like via the communication interface 44.

A body PCB 60 and a door PCB 80 to be described later are connected to the mother board 40 by USBs, respectively. A power supply unit 45 is connected to the mother board 40. When the power is supplied from the power supply unit 45 to the mother board 40, the main CPU 41 of the mother board 40 is activated. Further, power is supplied to the gaming board 50 via the PCI bus, and the CPU 51 is activated.

Instruments and devices for generating input signals for the main CPU 41, and instruments and devices to be controlled in the operation by control signals output from the main CPU 41 are connected to the body PCB 60 and the door PCB 80. The main CPU 41 executes the game program and the like stored in the RAM 43 based on the input signals input into the main CPU 41. Further, the main CPU 41 performs control management of respective instruments and devices including a storage process to store a result of an arithmetic process into the RAM 43 as the arithmetic process is conducted.

The lamp 35, a hopper 66, a coin detector 67, a graphic board 68, a speaker 28 (refer to FIG. 1), the touch panel 11 (refer to FIG. 1), the bill discrimination unit 22, the ticket printer 30, the card reader 31, a key switch 33S, and the data indicator 32 are connected to the body PCB 60.

Here, the touch panel 11 is arranged on the front face of the lower image display panel 6, and can specify the coordinate position of a portion touched by the game player. Then, it is possible to locate the portion where the game player touches and identify the direction in which the touched portion moves based on the specified coordinate position information.

The hopper 66 is placed in the cabinet 2 and pays out a predetermined number of coins from the coin payout opening 23 to the coin tray 24 based on a control signal from the main CPU 41. The coin detector 67 is arranged in the coin payout opening 23, and outputs an input signal to the main CPU 41 when the payout of the prescribed number of coins from the coin payout opening 23 is detected.

The graphic board 68 controls image display in the upper image display panel 7 and the lower image display panel 6 based on the control signal from the main CPU 41. For example, the credit number stored in the RAM 43 and owned by the game player is displayed on the credit number display part 8 of the lower image display panel 6. Then, the payout number of credits for the payout is displayed on the payout number display part 9 of the lower image display panel 6. The bet number stored in the RAM 43 and currently bet on one game by the game player is displayed on the bet number display part 101 of the lower image display panel 6. The payout of the grand progressive jackpot stored in the RAM 43 is displayed on the payout display part 91 of the upper image display panel 7. The payout of the major progressive jackpot stored in the RAM 43 is displayed on the payout display part 92 of the upper image display panel 7. The payout of the minor progressive jackpot stored in the RAM 43 is displayed on the payout display part 93 of the upper image display panel 7. The payout of the mini progressive jackpot stored in the RAM 43 is displayed on the payout display part 94 of the upper image display panel 7.

Here, the graphic board 68 is provided with a VDP (Video Display Processor) for generating image data based on the control signal from the main CPU 41, a video RAM 69 for temporarily storing the image data generated by the VDP, and the like. Image data used when the VDP generates the image data is included in the game program.

The graphic board 68 also performs, based on the control signal from the main CPU 41, the display control of the rotationally variable display and the static display of the video reels 5L, 5C and 5R, and the video reel 103 in the lower image display panel 6.

The bill discrimination unit 22 checks the suitability of a bill or a ticket 25 with a bar code and receives the regular bill and the ticket 25 with the bar code inside the cabinet 2. The bill discrimination unit 22 outputs an input signal to the main CPU 41 based on the amount of the bill when the regular bill is received. Further, the bill discrimination unit 22 outputs an input signal to the main CPU 41 based on the number of coins recorded on the regular ticket 2S with the bar code.

The ticket printer 30 prints, on a ticket, a bar code in which the data of the credit number and the like stored in the RAM 43 is coded based on the control signal output from the main CPU 41, and outputs the ticket as the ticket 25 with the bar code.

The card reader 31 reads data from the smart card, transmits the data to the main CPU 41, or writes data onto the smart card based on the control signal from the main CPU 41. The key switch 33S is provided on the keypad 33 and outputs a prescribed input signal to the main CPU 41 when the keypad 33 is operated by the game player. The data indicator 32 displays the data read by the card reader 31 and data input by the game player via the keypad 33 based on a control signal output from the main CPU 41.

On the other hand, the control panel 20, the reverter 21S, the coin counter 21C, and a cold cathode tube 81 are connected to the door PCB 80. The control panel 20 is provided with a spin switch 13S corresponding to the spin button 13, a change switch 14S corresponding to the change button 14, a CASHOUT switch 15S corresponding to the CASHOUT button 15, a 1-BET switch 16S corresponding to the 1-BET button 16, and a maximum BET switch 17S corresponding to the maximum BET button 17. Each switch outputs an input signal to the main CPU 41 when a corresponding button is operated by the game player.

The coin counter 21C is provided inside the coin receiving opening 21, and checks the suitability of the coin inserted into the coin receiving opening 21 by the game player. Objects other than the regular coins are discharged from the coin payout opening 23, and an input signal is output to the main CPU 41 when the regular coin is detected.

The reverter 21S operates based on a control signal output from the main CPU 41, and distributes coins recognized as the regular coins by the coin counter 21C to a cashbox installed in the slot machine 1 (not illustrated) or the hopper 66. The cold cathode tube 81 is installed in the rear side of the lower image display panel 6 and the upper image display panel 7, lights up based on a control signal from the main CPU 41, and functions as a backlight.

Next, the winning combination and each payout thereof in the case where the base game is played on the slot machine 1 according to the present embodiment with the video reels 5L, 5C, and 5R are described with reference to FIG. 7. FIG. 7 is a payout table showing winning combinations, each probability to realize each winning combination, and the payout in the case where the game is played with the video reels 5L, 5C, and 5R.

Here, the payout shown in FIG. 7 indicates a payout in the case where the bet number is "1". Therefore, when the bet number is "1", the value of the payout shown in FIG. 7 is added to credits, but when the bet number is "2" or higher, a value obtained by multiplying the value of the payout shown in FIG. 7 by the bet number is added to the credits.

The respective realization probabilities of the winning combinations shown in FIG. 7 are different depending on payout rates (for example, 80%, 84%, 88%) in the game other than the bonus game.

Then, when a winning combination in which three symbols of BONUS 112 (refer to FIG. 5) are stopped and displayed along any one of the pay lines L1 to L5 is realized with a predetermined realization probability, the bonus game occurs.

On the other hand, when a winning combination in which three symbols of WILD 111 (refer to FIG. 5) are stopped and displayed along any one of the pay lines L1 to L5 is realized with a predetermined realization probability, 1000 credits are paid out as the payout. In the following, a realization probability (not illustrated) and the number of payouts is similarly set for each combination shown in FIG. 7. However, in the winning combination in which three symbols of single BAR 117 (refer to FIG. 5) are stopped and displayed along any one of the pay lines L1 to L5, the three numbers of payouts, that is, a relatively high payout of 500 credits, a relatively moderate payout of 80 credits, and a relatively low payout of 20 credits are set, and a realization probability of which the number of payouts is to be made is also set based on the above payout rate (for example, 80%, 84%, 88%).

When a combination of symbols which does not correspond to any one of the combinations shown in FIG. 7 is stopped and displayed, the game is lost such that the payout of credits is not performed.

Next, game contents performed by the slot machine 1 according to the present embodiment are described with reference to the drawings showing production images displayed on the lower image display panel 6 or the upper image display panel 7. As described above, the game played on the slot machine 1 according to the present embodiment comprises three game modes, that is, the base game, the bonus game, and the future game.

<Game Mode of Base Game>

First, the game mode of the base game is described. In the game mode of the base game, a so-called slot game is played in which a combination of specific symbols is stopped along each of the pay lines L1 to L5 with the video reels 5L, 5C, and 5R, and an amount of payout corresponding to the stopped combination is awarded to the game player.

<Normal Progress No-Payout Effect>

In the game mode of the base game, when a combination of symbols which does not correspond to any one of the combinations shown in FIG. 7 is stopped and displayed along each of the pay lines L1 to L5, an image of a normal progress no-payout effect is displayed on the lower image display panel 6 as shown in FIGS. 8A1 to 9C2.

That is, when the spin button 13 is pressed after a bet number is fixed by the operation of the 1-BET button 16 or the maximum BET button 17, a scrolling display is performed downward as shown in FIGS. 8A1 and 8B1 in the display windows 10L, 10C, and 10R as the video reels 5L, 5C, and 5R start to rotate. And after a predetermined period of time elapses, each of the video reels 5L, 5C, and 5R stops in the order of the above description so as to perform a static display in each of the display windows 10L, 10C, and 10R as shown in FIGS. 8C1, 9A1, and 9B1.

In the meantime, a scene of a laboratory in which the characters of Frankenstein 105 and the doctor 106 are staying is displayed on the lower image display panel 6 as shown in FIGS. 8A1, 8B1, 8C1, 9A1, and 9B1. Such display of the scene is maintained even after the static display of the reels is performed in the display windows 10L, 10C, and 10R as shown in FIG. 9C1.

On the other hand, on the upper image display panel 7, the respective payout display parts 91, 92, 93, and 94 of the progressive jackpots and the information annunciator part 95 are displayed as shown in FIGS. 8A2, 8B2, 8C2, 9A2, 9B2, and 9C2. Further, in the respective payout display parts 91, 92, 93, and 94 of the progressive jackpots, a part of the credit number corresponding to the fixed bet number is added and displayed when the bet number is fixed. However, the sum added changes depending on the kind of progressive jackpots (grand, major, minor, and mini). The English letters of "FRANKENSTEIN" are displayed on the information annunciator part 95 as the game name.

<Normal Progress Low-Payout Effect>

On the other hand, in the game mode of the base game, when any one of the combinations, payouts of which are "20", "15", "10", "5", and "2" (refer to FIG. 7), respectively, in the case where the bet number is "1", is stopped and displayed on any one of the pay lines L1 to L5, an image of a normal progress low-payout effect is displayed on the lower image display panel 6 as shown in FIGS. 10A1, 10B1, and 10C1.

That is, when the spin button 13 is pressed after the bet number is fixed by the operation of the 1-BET button 16 or the maximum BET button 17, a scrolling display is performed downward in the display windows 10L, 10C, and 10R as shown in FIGS. 10A1 and 10B1 as the video reels 5L, 5C, and 5R start to rotate. Then, when a predetermined period of time elapses, although not illustrated in FIGS. 10A1 to 10C1, each of the video reels 5L, 5C, and 5R stops in the order of the above description. Then, the static display is performed in the display windows 10L, 10C, and 10R as shown in FIGS. 8C1, 9A1, and 9B1. Then, after the static display is performed in the display windows 10L, 10C, and 10R, the respective window frames of the display windows 10L, 10C, and 10R may be brightened as shown in FIG. 10C1, or any one of the pay lines L1 to L5 (pay line L4 in FIG. 10C1) on which a combination, a payout of which is any one of "20", "15", "10", "5", and "2" (refer to FIG. 7) in the case where the bet number is "1", is stopped and displayed is brightened. The amount of payout ("15" in FIG. 10C1) is also displayed simultaneously. Here, the amount of payout is also displayed in the payout number display part 9.

In the meantime, a scene of the laboratory in which the characters of Frankenstein 105 and the doctor 106 are staying is displayed on the lower image display panel 6 as shown in FIGS. 10A1, 10B1, and 10C1.

On the other hand, the respective payout display parts 91, 92, 93, and 94 of the progressive jackpots and the information annunciator part 95 are displayed on the upper image display panel 7 as in a similar manner shown in FIGS. 8A2 to 9C2. However, a display indicating the win, a blink display, and the like may be performed in the information annunciator part 95.

<Normal Progress Moderate-Payout Effect>

On the other hand, in the game mode of the base game, when anyone of the combinations, payouts of which are "20", "15", "10", "5", and "2" (refer to FIG. 7), respectively, in the case where the bet number is "1", is stopped and displayed on any one of the pay lines L1 to L5, an image of a normal progress low-payout effect is displayed on the lower image display panel 6 as shown in FIGS. 10A1, 10B1, and 10C1.

In the game mode of the base game, when any one of the combinations, payouts of which are "80", "40", and "30" (refer to FIG. 7), respectively, in the case where the bet number is "1", is stopped and displayed on any one of the pay lines L1 to L5, an image of a normal progress moderate-payout effect is displayed on the lower image display panel 6 as shown in FIGS. 11A1, 11B1, and 11C1.

That is, when the spin button 13 is pressed after the bet number is fixed by the operation of the 1-BET button 16 or the maximum BET button 17, a scrolling display is performed downward in the display windows 10L, 10C, and 10R as shown in FIGS. 11A1 and 11B1 as the video reels 5L, 5C, and 5R start to rotate. Then, when a predetermined period of time elapses, although not illustrated in FIGS. 11A1 to 11C1, the video reels 5L, 5C, and 5R stop in the order of the above description as shown in FIGS. 8C1, 9A1 and 9B1 so as to perform the static display in the display windows 10L, 10C, and 10R. After the static display is performed in the display windows 10L, 10C, and 10R, as shown in FIG. 11C1, any one of the pay lines L1 to L5 (pay line L4 in FIG. 11C1) on which a combination, a payout of which is any one of "80", "40", and "30" (refer to FIG. 7) in the case where the bet number is "1", is stopped and displayed is brightened. And the amount of payout ("80" in FIG. 11(*c*)) is also displayed simultaneously. The amount of payout is displayed also in the payout number display part 9.

In the meantime, a scene of the laboratory in which the characters of Frankenstein 105 and the doctor 106 are staying is displayed on the lower image display panel 6 as shown in FIGS. 11A1, 11B1, and 11C1. Then, after the static display is performed in the display windows 10L, 10C and 10R, a scene showing that a pumpkin 121 and coins 122 fall and hit Frankenstein 105 is displayed as shown in FIG. 11C1.

On the other hand, the respective payout display parts 91, 92, 93, and 94 of the progressive jackpots and the information annunciator part 95 are displayed on the upper image display panel 7 as in a similar manner shown in FIGS. 8A2 to 9C2. However, a display indicating the win, a blink display, and the like may be performed in the information annunciator part 95.

<Normal Progress High-Payout Effect>

Further, in the game mode of the base game, when any one of the combinations, payouts of which are "1000", "500", and "100" (refer to FIG. 7), respectively, in the case where the bet number is "1", is stopped and displayed on any one of the pay lines L1 to L5, an image of a normal progress high-payout effect is displayed on the lower image display panel 6 as shown in FIGS. 12A1, 12B1, and 12C1.

That is, when the spin button 13 is pressed after the bet number is fixed by the operation of the 1-BET button 16 or the maximum BET button 17, a scrolling display is performed downward in the display windows 10L, 10C, and 10R as shown in FIGS. 12A1 and 12B1 as the video reels 5L, 5C, and 5R start to rotate. Then, when a predetermined period of time elapses, although not illustrated in FIGS. 12A1 to 12C1, the video reels 5L, 5C, and 5R stop in the order of the above description as shown in FIGS. 8C1, 9A1, and 9B1 so as to perform the static display in the display windows 10L, 10C, and 10R. After the static display is performed in the display windows 10L, 10C, and 10R, the respective window frames of the display windows 10L, 10C, and 10R are brightened as shown in FIG. 12C1. And any of the pay lines L1 to L5 (pay line L4 in FIG. 12C1) on which the combination whose payout is any one of "1000", "500", and "100" (refer to FIG. 7) in the case where the bet number is "1" is stopped and displayed are brightened, and the amount of payout ("100" in FIG. 12C1) is displayed simultaneously. The amount of payout is displayed also on the payout number display part 9.

In the meantime, a scene of the laboratory in which the characters of Frankenstein 105 and the doctor 106 are staying is displayed on the lower image display panel 6 as shown in FIGS. 12A1, 12B1, and 12C1. After the static display is performed in the display windows 10L, 10C, and 10R, the scene where Frankenstein 105 and the doctor 106 are surprised at a character of ghost 123 entering the laboratory from an opened door 107 is displayed as shown in FIG. 12C1.

On the other hand, the respective payout display parts 91, 92, 93, and 94 of the progressive jackpots and the information annunciator part 95 are displayed on the upper image display panel 7 as in a similar manner shown in FIGS. 8A2 to 9C2. However, a display indicating the win, a blink display, and the like may be performed in the information annunciator part 95.

<Moderate Payout Effect with Opened Door>

Further, in the game mode of the base game, when three symbols of single BAR 117 are stopped and displayed along any one of the pay lines L1 to L5, and when a payout is "80" in the case where the bet number is "1", an image of a moderate payout effect with an opened door may be displayed on the lower image display panel 6 as shown in FIG. 13A1.

That is, when the spin button 13 is pressed after the bet number is fixed by the operation of the 1-BET button 16 or the maximum BET button 17, a scrolling display is performed downward in the display windows 10L, 10C and 10R as shown in FIGS. 13A1 and 13B1 as the video reels 5L, 5C, and 5R start to rotate. The, when a predetermined period of time elapses, although not illustrated in FIG. 13A1 to 13C1, the video reels 5L, 5C, and 5R stop in the order of the above description as shown in FIGS. 8C1, 9A1, and 9B1 so as to perform the static display in the display windows 10L, 10C, and 10R. After the static display is performed in the display windows 10L, 10C, and 10R, the respective window frames of the display windows 10L, 10C, and 10R are brightened as shown in FIG. 13C1. And, some of the pay lines L1 to L5 (pay line L4 in FIG. 13C1) on which three symbols of single BAR 117 are stopped and displayed are brightened, and an amount of payout ("80" in FIG. 13C1) is displayed simultaneously. The amount of payout is displayed also on the payout number display part 9.

In the meantime, a scene of the laboratory in which the characters of Frankenstein 105 and the doctor 106 are staying is displayed on the lower image display panel 6 as shown in FIGS. 13A1, 13B1, and 13C1. And immediately after the scrolling display is started in the display windows 10L, 10C, and 10R, a scene where the doctor 106 turns round as the door 107 of the laboratory opens creakingly is displayed as shown in FIG. 13B1. After the static display is performed in the display windows 10L, 10C, and 10R, a scene where coins 122 pour down and a character of bat 124 enters the laboratory from the door 107 as Frankenstein 105 and the doctor 106 observe the character is displayed as shown in FIG. 13C1.

On the other hand, the respective payout display parts 91, 92, 93, and 94 of the progressive jackpots and the information annunciator part 95 are displayed on the upper image display panel 7 as in a similar manner shown in FIGS. 8A2 to 9C2. However, a display indicating the win, a blink display, and the like may be performed in the information annunciator part 95.

<High Payout Effect with Door Open>

Further, in the game mode of the base game, when three symbols of single BAR 117 are stopped and displayed along any one of the pay lines L1 to L5 and when a payout is "500" in the case where the bet number is "1", an image of a high payout effect with a door open may be displayed on the lower image display panel 6 as shown in FIG. 14A1 to 14C1.

That is, when the spin button 13 is pressed after the bet number is fixed by the operation of the 1-BET button 16 or the maximum BET button 17, a scrolling display is performed downward in the display windows 10L, 10C, and 10R as shown in FIGS. 14A1 and 14B1 as the video reels 5L, 5C, and 5R start to rotate. Then, when a predetermined period of time elapses, although not illustrated in FIGS. 14A1 to 14C1, the video reels 5L, 5C, and 5R stop in the order of the above description as shown in FIGS. 8C1, 9A1, and 9B1 such that the static display is performed in the display windows 10L, 10C, and 10R. Then, after the static display is performed in the display windows 10L, 10C, and 10R, the respective window frames of the display windows 10L, 10C, and 10R are brightened as shown in FIG. 14C1. And some of the pay lines L1 to L5 (pay line L4 in FIG. 14C1) on which three symbols of single BAR 117 are stopped and displayed are brightened, and an amount of payout ("500" in FIG. 14C1) is displayed simultaneously. The amount of payout is displayed also on the payout number display part 9.

In the meantime, a scene of the laboratory in which the characters of Frankenstein 105 and the doctor 106 are staying is displayed on the lower image display panel 6 as shown in FIGS. 14A1, 14B1, and 14C1. And immediately after the scrolling display is started in each of the display windows 10L, 10C, and 10R, a scene where the door 107 of the laboratory opens creakingly and the doctor 106 turns round as shown in FIG. 14B1. After the static display is performed in the display windows 10L, 10C, and 10R. A scene where Frankenstein 105 is happy at many coins 122 pouring down and the doctor 106 is surprised at coins 122 spat out from three pumpkins 121 entering from the door 107 of the laboratory are displayed as shown in FIG. 14C1.

On the other hand, the respective payout display parts 91, 92, 93, and 94 of the progressive jackpots and the information annunciator part 95 are displayed on the upper image display panel 7 as in a similar manner shown in FIGS. 8A2 and 9C2. However, a display indicating the win, a blink display, and the like may be performed in the information annunciator part 95.

<Moderate Payout Effect with Mischievous Expression>

Further, in the game mode of the base game, when three symbols of single BAR 117 are stopped and displayed along any one of the pay lines L1 to L5 and when a payout is "80" in the case where the bet number is "1", an image of a moderate payout effect with mischievous expression may be displayed on the lower image display panel 6 as shown in FIGS. 15A1 to 15D1.

That is, when the spin button 13 is pressed after the bet number is fixed by the operation of the 1-BET button 16 and the maximum BET button 17, a scrolling display is performed downward in each of the display windows 10L, 10C, and 10R as shown in FIGS. 15A1, 15B1, and 15C1 as the video reels 5L, 5C, and 5R start to rotate. Then, when a predetermined period of time elapses, although not illustrated in FIGS. 15A1 to 15D1, the video reels 5L, 5C, and 5R stop in the order of the above description as shown in FIGS. 8C1, 9A1, and 9B1 such that the static display is performed in the display windows 10L, 10C, and 10R. Then, after the static display is performed in each of the display windows 10L, 10C, and 10R, some of the pay lines L1 to L5 (pay line L4 in FIG. 15D1) on which three symbols of single BAR 117 are stopped and displayed are brightened as shown in FIG. 15D1, and an amount of payout ("80" in FIG. 15D1) is displayed simultaneously. The amount of payout is displayed also on the payout number display part 9.

In the meantime, a scene of the laboratory in which the characters of Frankenstein 105 and the doctor 106 are staying is displayed on the lower image display panel 6 as shown in FIGS. 15A1, 15B1, 15C1 and 15D1. And immediately after the scrolling display is started in each of the display windows 10L, 10C, and 10R, a scene where equipment in the laboratory explodes in a small scale because of prank punches by Frankenstein 105, the chair of Frankenstein 105 discharges electricity and sparkles, and the panicked doctor 106 walks around in the laboratory is displayed as shown in FIGS. 15B1 and 15C1. After the static display is performed in each of the display windows 10L, 10C, and 10R, a scene where Frankenstein 105 is happy at many coins 122 pouring down and the doctor 106 is surprised in the dark laboratory due to the power outage is displayed as shown in FIG. 15D1.

On the other hand, the respective payout display parts 91, 92, 93, and 94 of the progressive jackpots and the information annunciator part 95 are displayed on the upper image display panel 7 as in a similar manner shown in FIGS. 8A2 and 9C2. However, a display indicating the win, a blink display, and the like may be performed in the information annunciator part 95.

<High Payout Effect with Mischievous Expression>

Further, in the game mode of the base game, when three symbols of single BAR 117 are stopped and displayed along any one of the pay lines L1 to L5 and when a payout is "500" in the case where the bet number is "1", an image of a high payout effect with mischievous expression as shown in FIGS. 16A1 to 16D1 may be displayed on the lower image display panel 6.

That is, when the spin button 13 is pressed after the bet number is fixed by the operation of the 1-BET button 16 or the maximum BET button 17, a scrolling display is performed downward in each of the display windows 10L, 10C, and 10R as shown in FIGS. 16A1, 16B1 and 16C1 as the video reels 5L, 5C, and 5R start to rotate. Then, when a predetermined period of time elapses, although not illustrated in FIGS. 16A1 to 16D1, the video reels 5L, 5C, and 5R stop in the order of the above description as shown in FIGS. 8C1, 9A1, and 9B1 such that the static display is performed in each of the display windows 10L, 10C, and 10R. Then, after the static display is performed in each of the display windows 10L, 10C, and 10R, the respective window frames of the display windows 10L, 10C, and 10R are brightened and some of the pay lines L1 to L5 (pay line L4 in FIG. 16D1) on which three symbols of single BAR 117 are stopped and displayed are brightened as shown in FIG. 16D1. An amount of payout ("500" in FIG. 16D1) is displayed simultaneously. The amount of payout is displayed also on the payout number display part 9.

In the meantime, a scene of the laboratory in which the characters of Frankenstein 105 and the doctor 106 are staying is displayed on the lower image display panel 6 as shown in FIGS. 16A1, 16B1, 16C1, and 16D1. Then, immediately after the scrolling display is started in each of the display windows 10L, 10C, and 10R, a scene where equipment in the laboratory explodes in a small scale due to prank punches by Frankenstein 105, the chair of Frankenstein 105 discharges electricity and sparkles, and the panicked doctor 106 walks around in the laboratory is displayed as shown in FIGS. 16B1 and 16C1. Further, after the static display is performed in each of the display windows 10L, 10C, and 10R, a scene where the equipment in the laboratory explodes in a larger scale, Frankenstein 105 is happy at the pouring coins 122, and the doctor 106 is surprised is displayed as shown in FIG. 16D1.

On the other hand, the respective payout display parts 91, 92, 93, and 94 of the progressive jackpots and the information annunciator part 95 are displayed on the upper image display panel 7 as in a similar manner shown in FIGS. 8A2 and 9C2. However, a display indicating the win, a blink display, and the like may be performed in the information annunciator part 95.

<WILD Expansion Effect>

Further, in the game mode of the base game, when the symbol of WILD 111 is stopped and displayed in the display window 10C, images of WILD effects are displayed on the lower image display panel 6 as shown in FIGS. 17A1 to 18D1.

That is, when the spin button 13 is pressed after the bet number is fixed by the operation of the 1-BET button 16 or the maximum BET button 17, a scrolling display is performed downward in each of the display windows 10L, 10C, and 10R as shown in FIGS. 17A1 and 17B1 as the video reels 5L, 5C and 5R start to rotate. Then, when a predetermined period of time elapses, although not illustrated in FIGS. 17A1 to 17D1, the video reels 5L, 5C, and 5R stop in the order of the above description as shown in FIGS. 8C1, 9A1, and 9B1 such that a static display is performed in each of the display windows 10L, 10C, and 10R.

In the meantime, on the lower image display panel 6, a scene of the laboratory in which the characters of Frankenstein 105 and the doctor 106 are staying is displayed as shown in FIGS. 17A1 and 7B1. Then, after the static display is performed in each of the display windows 10L, 10C, and 10R, a scene where electricity is discharged from Frankenstein 105 and the symbol of WILD 111 stopped and displayed in the display window 10C is displayed as shown in FIGS. 17C1 and 17D1. Further, as shown in FIG. 18A1, the symbol of WILD 111 stopped and displayed in the display window 10C is fully expanded and displayed in the display window 10C. Then, as shown in FIGS. 18B1 and 18C1, some of the pay lines L1 to L5 (pay lines L2 and L5 in FIGS. 18B1 and 18C1) on which a combination of symbols shown in FIG. 7 is stopped and displayed are brightened. And an amount of payout ("35" in FIGS. 18B1 and 18C1) is displayed simultaneously. Further, a scene where electricity is discharged from Frankenstein 105 standing up, a medicine bottle 125 thrown by the doctor 106 toward the display window 102 explodes, and the scrolling display of the video reel 103 in the display window 102 is performed downward is displayed. Then, when a predetermined period of time elapses, the video reel 103 stops such that the static display is performed in the display window 102 as shown in FIG. 18D1. A scene where the respective window frames of the display windows 10L, 10C, and 10R are brightened, the coins 122 are poured in large quantities, and the doctor 106 is delighted is displayed, and an amount of payout ("350" in FIG. 18D1) increased by a multiplication factor ("10×" in FIG. 18D1) stopped and displayed at the left position of the arrow 104 in the display window 102 is also displayed simultaneously. At this time, the amount of payout is displayed also on the payout number display part 9.

The effects as shown in FIGS. 17D1, 18A1, 18B1, 18C1, and 18D1 may be also performed after each display of the normal progress low-payout effect in FIGS. 10A1 to 10C1, the normal progress moderate-payout effect in FIGS. 11A1 to 11C1, the normal progress high-payout effect in FIGS. 12A1 to 12C1, the moderate payout effect with the door open in FIGS. 13A1 to 13C1, the high payout effect with the door open in FIGS. 14A1 to 14C1, the moderate payout effect with mischievous expression in FIGS. 15A1 to 15D1, and the high payout effect with mischievous expression in FIGS. 16A14 to 16D1.

On the other hand, on the upper image display panel 7, the respective payout display parts 91, 92, 93, and 94 of the progressive jackpots and the information annunciator part 95 are displayed as in a similar manner shown in FIGS. 8A2 and 9C2. However, a display indicating the win, a blink display, and the like may be performed in the information annunciator part 95.

In addition, the symbol of WILD 111 is roughly sketched in FIG. 17 for convenience of description.

<Bonus Game Acquisition Effect>

Further, in the game mode of the base game, when three symbols of BONUS 112 are stopped and displayed along any one of the pay lines L1 to L5, the images of a bonus game acquisition effect (or bonus game getting effect) as shown in FIGS. 19A1 to 21D1 are displayed on the lower image display panel 6.

That is, when the spin button 13 is pressed after the bet number is fixed by the operation of the 1-BET button 16 or the maximum BET button 17, a scrolling display is performed downward in each of the display windows 10L, 10C, and 10R as shown in FIGS. 19A1 and 19B1 as the video reels 5L, 5C, and 5R start to rotate. When a predetermined period of time elapses, the video reels 5L, 5C, and 5R stop in the order of the above description as shown in FIGS. 19C1, 20A1, and 20B1 such that the static display is performed in each of the display windows 10L, 10C, and 10R.

In the meantime, on the lower image display panel 6 as shown in FIGS. 19A1, 19B1, 19C1, 20A1, and 20B1, a scene of the laboratory in which the characters of Frankenstein 105 and the doctor 106 are staying is displayed. At this time, whenever the symbol of BONUS 112 is stopped and displayed in any one of the display windows 10L, 10C, and 10R, a scene where the doctor 106 switches on the equipment in the laboratory is displayed, and a scene where electricity is discharged from the symbol of BONUS 112 and Frankenstein 105 is displayed as shown in FIGS. 19C1, 20A1, and 20B1. When the symbol of BONUS 112 is stopped and displayed in the display window 10R in particular, a scene where Frankenstein 105 discharging electricity from the body stands up and gets excited is displayed as shown in FIG. 20B1. Then, after the static display is performed in each of the display windows 10L, 10C, and 10R, while the English letters of "CASTLE BONUS" indicating the acquisition of the bonus game are displayed as shown in FIGS. 21A1, 21B1 and 21C1, a scene where Frankenstein 105 and the doctor 106 leave quickly from the door 107 of the laboratory from which the coins 122 pour down is displayed. Further, the English letters of "CASTLE BONUS" indicating the acquisition of the bonus game are displayed as shown in FIG. 21D1, and a state of Frankenstein 105 going by motorbike to a Dracula castle rising in a forest, and the like is displayed.

On the other hand, on the upper image display panel 7, the respective payout display parts 91, 92, 93, and 94 of the progressive jackpots and the information annunciator part 95 are displayed as in a similar manner shown in FIGS. 8A2 and 9C2. However, a display indicating the win, a blink display, and the like may be performed in the information annunciator part 95.

However, after the English letters of "CASTLE BONUS" indicating the acquisition of the bonus game is displayed on the lower image display panel 6, the English letters of "CASTLE BONUS" indicating the acquisition of the bonus game is displayed in the information annunciator part 95 instead as shown in FIGS. 21A2, 21B2, and 21C2. Further, while the English letters of "CASTLE BONUS" indicating the acquisition of the bonus game is displayed as shown in FIG. 21D2, the Dracula castle rising in the forest is displayed.

In addition, the symbol of BONUS 112 is roughly sketched in FIGS. 19A1 to 21C1 for convenience of description.

<Feature Game Acquisition Effect>

Further, in the game mode of the base game, when a feature game is acquired as a result of an internal lottery (so-called mystery) regardless of a combination of symbols stopped and displayed along each of the pay lines L1 to L5, the image of a feature game acquisition effect is displayed on the lower image display panel 6 as shown in FIGS. 22A1 to 24C1.

That is, when the spin button 13 is pressed after the bet number is fixed by the operation of the 1-BET button 16 or the maximum BET button 17, a scrolling display is performed downward in each of the display windows 10L, 10C, and 10R as shown in FIGS. 22A1 and 22B1 as the video reels 5L, 5C and 5R start to rotate. Then, when a predetermined period of time elapses, the video reels 5L, 5C, and 5R stop in the order of the above description as shown in FIGS. 22C1, 23A1, and 23B1 such that the static display is performed in each of the display windows 10L, 10C, and 10R.

In the meantime, as shown in FIGS. 22A1, 22B1, 22C1, 23A1, and 23B1, a scene of the laboratory in which the characters of Frankenstein 105 and the doctor 106 are staying is displayed on the lower image display panel 6. At this time, when symbols are stopped and displayed in the display windows 10L, 10C, and 10R, a scene where the doctor 106 switches on the equipment in the laboratory and electricity is discharged from the symbols and Frankenstein 105 is displayed as shown in FIGS. 22B1, 22C1, 23A1, and 23B1. When a symbol is stopped and displayed in the display window 10R in particular, a scene where Frankenstein 105 discharging the electricity from the body stands up and gets excited is also displayed as shown in FIG. 23B1. Then, after the static display is performed in each of the display windows 10L, 10C, and 10R, the English letters of "MONSTERS FORTUNE" indicating the acquisition of the feature game is displayed as shown in FIGS. 24A1, 24B1, and 24C1, and the respective window frames of the display windows 10L, 10C, and 10R are brightened, and a scene where Frankenstein 105 and the doctor 106 leave quickly from the door 107 of the laboratory in which the coins 122 pour down is displayed.

On the other hand, the respective payout display parts 91, 92, 93, and 94 of the progressive jackpots and the information annunciator part 95 are displayed on the upper image display panel 7 as in a similar manner shown in FIGS. 8A2 and FIG. 9C2. However, a display indicating the win, a blink display, and the like may be performed in the information annunciator part 95.

However, after the English letters of "MONSTERS' FORTUNE" indicating the acquisition of the feature game are displayed on the lower image display panel 6, the English letters of "MONSTERS' FORTUNE" indicating the acquisition of the feature game are displayed on the information annunciator part 95 instead as shown in FIGS. 24A2, 24B2, and 24C2.

When the images of the future game acquisition effect as shown in FIGS. 22A1 to 24C1 are displayed, a symbol of progressive bonus may be stopped and displayed along any one of the display windows 10L, 10C, and 10R.

<Game Mode of Bonus Game>

Next, the game mode of the bonus game is described. The game mode of the bonus game is performed after the images of the bonus game acquisition effect as shown in FIGS. 19A1 to 21D1 are displayed in the game mode of the base game. Further, in the game mode of the bonus game, a plurality of selectable objects as options are displayed on the lower image display panel 6 as described above, and a game is played via the touch panel 11 for awarding a payout associated with an object selected by the game player among the displayed objects.

<Introductory Effect>

When a game is shifted to the game mode of the bonus game, the images of an introductory effect as shown in FIGS. 25A1 to 25B2 are displayed first on the lower image display panel 6 and the upper image display panel 7. That is, a state inside the entrance of the Dracula castle and the English letters of "CASTLE BONUS" are displayed on the lower image display panel 6 as shown in FIG. 25A1. Then, as shown in FIG. 25B1, a scene of the entrance hall of the Dracula castle is darkly displayed, and letters of "CLICK SCREEN", which means "Please click the screen.", and "CAN SELECT UNTIL COLLECT APPEARS. TO FEATURE UPON GHOST HAUNTING.", which means "You can make selection until COLLECT appears. The game will shift into the feature game when a ghost haunts." are displayed. Further, frame corner parts 201 to 209 are displayed, each indicating four corners of a rectangular area which the game player can click via the touch panel 11 with four L-shaped marks.

In this regard, a door is displayed in the rectangular corner-framed part 201, and the door in the rectangular corner-framed part 201 can be selected as an object by clicking the rectangular corner-framed part 201. In the same way, each door in each of the rectangular corner-framed parts 202 and 203 is selected. A candle is displayed in the rectangular corner-framed part 204, and the candle in the rectangular corner-framed part 204 can be selected as an object by clicking the rectangular corner-framed part 204. In the same way, each candle in each of the rectangular corner-framed parts 205 and 206 is selected. A portrait of Dracula is displayed in the rectangular corner-framed part 207, and the portrait of Dracula in the rectangular corner-framed part 207 can be selected as an object by clicking the rectangular corner-framed part 207. A clock is displayed in the rectangular corner-framed part 208, and the clock in the rectangular corner-framed part 208 can be selected as an object by clicking the rectangular corner-framed part 208. A suit of armor is displayed in the rectangular corner-framed part 209, and the armor in the rectangular corner-framed part 209 can be selected as an object by clicking the rectangular corner-framed part 209.

Thus, on the lower image display panel 6 shown in FIG. 25, three doors, three candles, one portrait, one clock, and one armor are displayed as the objects selectable by the game player.

The letters of "CAN SELECT UNTIL COLLECT APPEARS. TO FEATURE UPON GHOST HAUNTING.", which means "You can select until COLLECT appears. The game will shift to the feature game when a ghost haunts.", displayed on the lower image display panel 6 are erased when a predetermined period of time elapses.

On the other hand, the English letters of "CASTLE BONUS" indicating the execution of the bonus game, and the Dracula castle rising in the forest are displayed on the upper image display panel 7 as shown in FIGS. 25A2 and 25B2.

<Basic Effect>

When the game player selects any one of the objects displayed in the rectangular corner-framed parts 201 to 209 of the lower image display panel 6 via the touch panel 11, the selected object reacts, and an amount of payout corresponding to the selected object is displayed. That is, the images of a basic effect are displayed on the lower image display panel 6 and the upper image display panel 7 as shown in FIGS. 26A1 to 27B2.

In the lower image display panel 6, as shown in FIG. 26A1, for example, when the door displayed in the rectangular corner-framed part 201 is selected as the object after the introductory effect of FIGS. 25A1 and 25B1, the character of a mummy man 211 appears as shown in FIG. 26B1, and an amount of payout ("+50" in FIG. 26C1) is displayed with coins 212 pouring as shown in FIG. 26C1. The game player can select the object until "COLLECT" is displayed in the same manner as the amount of payout corresponding to the selected object is displayed. In this regard, FIG. 27A1 shows a scene where "COLLECT" is displayed as an amount of payout corresponding to the door in the rectangular corner-framed part 203 when the door displayed in the rectangular corner-framed part 203 is selected after the door displayed in the rectangular corner-framed part 201 and the door displayed in the rectangular corner-framed part 202 is selected. When "COLLECT" is displayed, the bonus game is terminated and the total amount of payout ("WIN 100" in FIG. 27B1) is displayed as shown in FIG. 27B1.

In the present embodiment, five kinds of payouts corresponding to the respective objects are shown: "+50", "+100", "+200", "COLLECT", and "ghost". And the correspondent relationship between the payouts and the objects is determined by lottery whenever the bonus game is executed excluding the relationship between "COLLECT" and the objects.

On the other hand, in the upper image display panel 7, the English letters of "CASTLE BONUS" indicating the execution of the bonus game, and the Dracula castle rising in the forest are displayed as shown in FIGS. 26A1 and 26B1 until the payout of the selected object is displayed on the lower image display panel 6. Subsequently, as shown in FIG. 26C1, the English letters of "WINNER" indicating the gain of the payout and the amount of payout ("+50" in FIG. 26C1) are superimposed and displayed on the upper image display panel 7. However, when the payout corresponding to the selected object is "COLLECT", the English letters of "COLLECT" indicating the termination of the bonus game are superimposed and displayed as shown in FIG. 27A2. When the bonus game is terminated, the English letters of "WINNER" indicating that the player got the total payout, and the number of the total payouts ("100" in FIG. 27B2) are superimposed and displayed on the upper image display panel 7 as shown in FIG. 27B2.

<Feature Effect>

In the game mode of the bonus game, the images of a feature effect as shown in FIGS. 28A1 to 29C2 may be displayed on the lower image display panel 6 and the upper image display panel 7.

That is, as shown in FIGS. 28A1 to 28B2, for example, provided that the character of a ghost 213 appears as a payout of a selected object, and then when "COLLECT" is displayed as a payout corresponding to the selected object as shown in FIG. 28C1, the letters of "FEATURE CHANCE !!" indicating shift into the feature game mode, the display window 102, the video reel 103, and the arrow 104 are displayed as shown in FIG. 29A1. In addition, the display window 102, the video reel 103, and the arrow 104 are the same as those displayed in the game mode of the base game (refer to FIG. 3, for example). After a scene of the ghost 213 rotating the video reel 103 in the display window 102 is displayed as shown in FIG. 29B1, the static display of the video reel 103 in the display window 102 is performed as shown in FIG. 29C1, and a scene of the ghost 213 moving loiteringly while a scene where coins 214 pour in the entrance hall of the Dracula castle is displayed. Further, the amount of total payout ("500" in FIG. 29C1) increased by a multiplication factor stopped and displayed on the left position of the arrow 104, and the like are displayed.

The object in which the ghost 213 appears as a payout is determined by lottery whenever the bonus game is executed. The multiplication factor determined by the static display of the video reel 103 in the display window 102 and the arrow 104 is determined by lottery whenever the ghost 213 appears.

On the other hand, in the upper image display panel 7, the English letters of "CASTLE BONUS" indicating the execution of the bonus game, and the Dracula castle rising in the forest are displayed as shown in FIG. 28A2 until the ghost 213 is displayed on the lower image display panel 6 as the payout of the selected object. Subsequently, when the ghost 213 is displayed on the lower image display panel 6 as the payout of the selected object, a ghost 215 is superimposed and displayed on the upper image display panel 7 as shown in FIG. 28B2. When the payout corresponding to the selected object is "COLLECT", the English letters of "COLLECT" indicating the termination of the bonus game is superimposed and displayed on the upper image display panel 7 as shown in FIG. 28C2. Then, as shown in FIGS. 29A2 and 29B2, while the total amount of payouts so far obtained ("50" in FIGS. 29A2 and 29B2) and the letters of "FEATURE CHANCE !!" indicating the development into the feature are displayed on the upper image display panel 7 instead of the Dracula castle rising in the forest. Further, when the video reel 103 in the display window 102 is stopped and displayed on the lower image display panel 6, pouring coins 216 as shown in FIG. 29C2 are displayed on the upper image display panel 7, and the English letters of "WINNER" indicating the gain of the total payout increased by the multiplication factor stopped and displayed on the left position of the arrow 104, and the total amount of payout ("500" in FIG. 29C1) are superimposed and displayed.

<Reaction Effect 1>

Further, in the game mode of the bonus game, when the door displayed in the rectangular corner-framed part 201 of the lower image display panel 6 is selected, the images of a reaction effect are normally displayed on the lower image display panel 6 and the upper image display panel 7 as shown in FIGS. 30A1 to 30C2.

That is, in the lower image display panel 6, when the door displayed in the rectangular corner-framed part 201 is selected as shown in FIG. 30A1, the character of the mummy man 211 appears restlessly as shown in FIG. 30B1, and then, a scene where the coins 212 pour and the mummy man 211 runs out is displayed along with the amount of payout ("+50" in FIG. 30C1) as shown in FIG. 30C1.

On the other hand, in the upper image display panel 7, the English letters of "CASTLE BONUS" indicating the execution of the bonus game and the Dracula castle rising in the forest are displayed as shown in FIGS. 30A1 and 30B1 until the mummy man 211 appears from the door in the rectangular corner-framed part 201 in the lower image display panel 6. Then, the English letters of "WINNER" indicating the gain of the payout and the amount of payout ("50" in FIG. 30C2) are superimposed and displayed as shown in FIG. 30C2.

<Reaction Effect 2>

Further, in the game mode of the bonus game, when the door displayed in the rectangular corner-framed part 202 of the lower image display panel 6 is selected, the images of a reaction representation are normally displayed on the lower image display panel 6 and the upper image display panel 7 as shown in FIGS. 31A1 to 31C2.

That is, in the lower image display panel 6, when the door displayed in the rectangular corner-framed part 202 is selected as shown in FIG. 31A1, a large bat 217 flies out and the large moon 218 appears as shown in FIG. 31B1, and then a scene of pouring coins 212 and the amount of payout ("+100" in FIG. 31C1) are displayed as shown in FIG. 31C1.

On the other hand, in the upper image display panel 7, the English letters of "CASTLE BONUS" indicating the execution of the bonus game, and the Dracula castle rising in the forest are displayed as shown in FIGS. 31A2 and 31B2 until the bat 217 flies out from the door in the rectangular corner-framed part 202 in the lower image display panel 6. Subsequently, the English letters of "WINNER" indicating the gain of the payout and the payout amount ("100" in FIG. 31C2) are superimposed and displayed as shown in FIG. 31C2.

<Reaction Effect 3>

Further, in the game mode of the bonus game, when the door displayed in the rectangular corner-framed part 203 of the lower image display panel 6 is selected, the images of a reaction effect as shown in FIGS. 32A1 to 32C2 are normally displayed on the lower image display panel 6 and the upper image display panel 7.

That is, in the lower image display panel 6, when the door displayed in the rectangular corner-framed part 203 is selected as shown in FIG. 32A1, a wolf man (or werewolf) 219 appears searchingly as shown in FIG. 32B1, then a scene of pouring coins 212 with the jump of the wolf man 219, and the amount of payout ("+50" in FIG. 32C1) are displayed as shown in FIG. 32C1.

On the other hand, in the upper image display panel 7, the English letters of "CASTLE BONUS" indicating the execution of the bonus game, and the Dracula castle rising in the forest are displayed as shown in FIGS. 32A2 and 32B2 until the wolf man 219 appears from the door in the rectangular corner-framed part 203 in the lower image display panel 6. Subsequently, the English letters of "WINNER" indicating the gain of the payout and the amount of payout ("50" in FIG. 32C2) are superimposed and displayed as shows in FIG. 32C2.

<Reaction Effect 4>

Further, in the game mode of the bonus game, when the candle displayed in the rectangular corner-framed part 206 of the lower image display panel 6 is selected, the images of a reaction effect is normally displayed on the lower image display panel 6 and the upper image display panel 7 as shown in FIGS. 33A1 to 33C2.

That is, in the lower image display panel 6, when the candle displayed in the rectangular corner-framed part 206 is selected as shown in FIG. 33A1, the three candles in the entrance hall of the Dracula castle burn up greatly as shown in FIG. 33B1, and then, a scene of pouring coins 212 and the amount of payout ("+100" in FIG. 33C1) are displayed as shown in FIG. 33C1.

On the other hand, in the upper image display panel 7, the English letters of "CASTLE BONUS" indicating the execution of the bonus game, and the Dracula castle rising in the forest are displayed as shown in FIGS. 33A2 and 33B2 until the candle in the rectangular corner-framed part 206 burns up greatly in the lower image display panel 6. Then, the English letters of "WINNER" indicating the gain of the payout and the amount of payout ("100" in FIG. 33C2) are superimposed and displayed as shows in FIG. 33C2.

In addition, also when the candles displayed in the rectangular corner-framed parts 204 and 205 of the lower image display panel 6 are selected, respectively, the images of the same reaction effect is displayed.

<Reaction Effect 5>

Further, in the game mode of the bonus game, when the portrait of Dracula displayed in the rectangular corner-framed part 207 of the lower image display panel 6 is selected, the images of a reaction effect as shown in FIGS. 34A1 to 34C2 are normally displayed on the lower image display panel 6 and the upper image display panel 7.

That is, in the lower image display panel 6, when the portrait of Dracula 220 displayed in the rectangular corner-framed part 207 is selected as shown in FIG. 34A1, Dracula 220 of the portrait in the rectangular corner-framed part 207 begins to laugh out loud as shown in FIG. 34B1, and then, a scene of pouring coins 212 and the amount of payout ("+200" in FIG. 34(*c*)) is displayed as shown in FIG. 34C1.

On the other hand, in the upper image display panel 7, the English letters of "CASTLE BONUS" indicating the execution of the bonus game, and the Dracula castle rising in the forest are displayed as shown in FIGS. 34A2 and 34B2 until Dracula 220 of the portrait in the rectangular corner-framed part 207 begins to laugh out loud in the lower image display panel 6. Subsequently, the English letters of "WINNER" indicating the gain of the payout and the amount of payout ("200" in FIG. 34C2) are superimposed and displayed as shown in FIG. 34C2.

<Reaction Effect 6>

Further, in the game mode of the bonus game, when the clock displayed in the rectangular corner-framed part 208 of the lower image display panel 6 is selected, the images of a reaction effect as shown in FIGS. 35A1 to 35C2 are normally displayed on the lower image display panel 6 and the upper image display panel 7.

That is, in the lower image display panel 6, when the clock displayed in the rectangular corner-framed part 208 is selected as shown in FIG. 35A1, the dial face of the clock in the rectangular corner-framed part 208 comes away, and coins 221 begin to fall as shown in FIG. 35B1, then, a scene of pouring coins 212 and the amount of payout ("+50" in FIG. 35(*c*)) is displayed as shown in FIG. 35C1.

On the other hand, in the upper image display panel 7, the English letters of "CASTLE BONUS" indicating the execution of the bonus game, and the Dracula castle rising in the forest are displayed as shown in FIG. 35A2 and 35B2 until the dial face of the clock in the rectangular corner-framed part 208 of the lower image display panel 6 comes away and the coins 221 begin to fall. Then, the English letters of "WINNER" indicating the gain of the payout, and the amount of payout ("50" in FIG. 35C2) are superimposed and displayed as shown in FIG. 35C2.

<Reaction Effect 7>

Further, in the game mode of the bonus game, when the armor displayed in the rectangular corner-framed part 209 of the lower image display panel 6 is selected, the images of a reaction effect as shown in FIGS. 36A1 to 36C2 are normally displayed on the lower image display panel 6 and the upper image display panel 7.

That is, in the lower image display panel 6, when the armor displayed in the rectangular frame part 209 is selected as shown in FIG. 36A1, the armor in the rectangular corner-framed part 209 begins to move choppily like a marionette as shown in FIG. 36B1, and then a scene of pouring coins 212 and the amount of payout ("+100" in FIG. 36C1) are displayed as shown in FIG. 36C1.

On the other hand, in the upper image display panel 7, the English letters of "CASTLE BONUS" indicating the execution of the bonus game, and the Dracula castle rising in the forest are displayed as shown in FIGS. 36A2 and 36B2 until the armor in the rectangular corner-framed part 209 begins to move choppily like the marionette in the lower image display panel 6. Subsequently, the English letters of "WINNER" indicating the gain of the payout and the amount of payout ("100" in FIG. 36C2) are superimposed and displayed as shown in FIG. 36C2.

<Reaction Effects 1 to 7>

However, the images of the respective reaction effects as shown in FIGS. 30A1 to 36C2 form parts of images of the basic effects in FIGS. 26A1 to 27B2, and parts of the feature effects in FIGS. 28A1 to 29C2.

<Game Mode of Feature Game>

Next, the game mode of the feature game is described. The game mode of the feature game is performed after the images of the feature game acquisition effects as shown in FIGS. 22A1 to 24C2 are displayed during the game mode of the base game. Further, in the game mode of the feature game, a game is played for awarding a payout with respect to, among the progressive jackpots of grand, major, minor, and mini, a progressive jackpot in which three points are saved wherein the points are awarded as triggered by the game player's operation of the attack button displayed on the lower image display panel 6.

<Introductory Effect>

Figure 37:
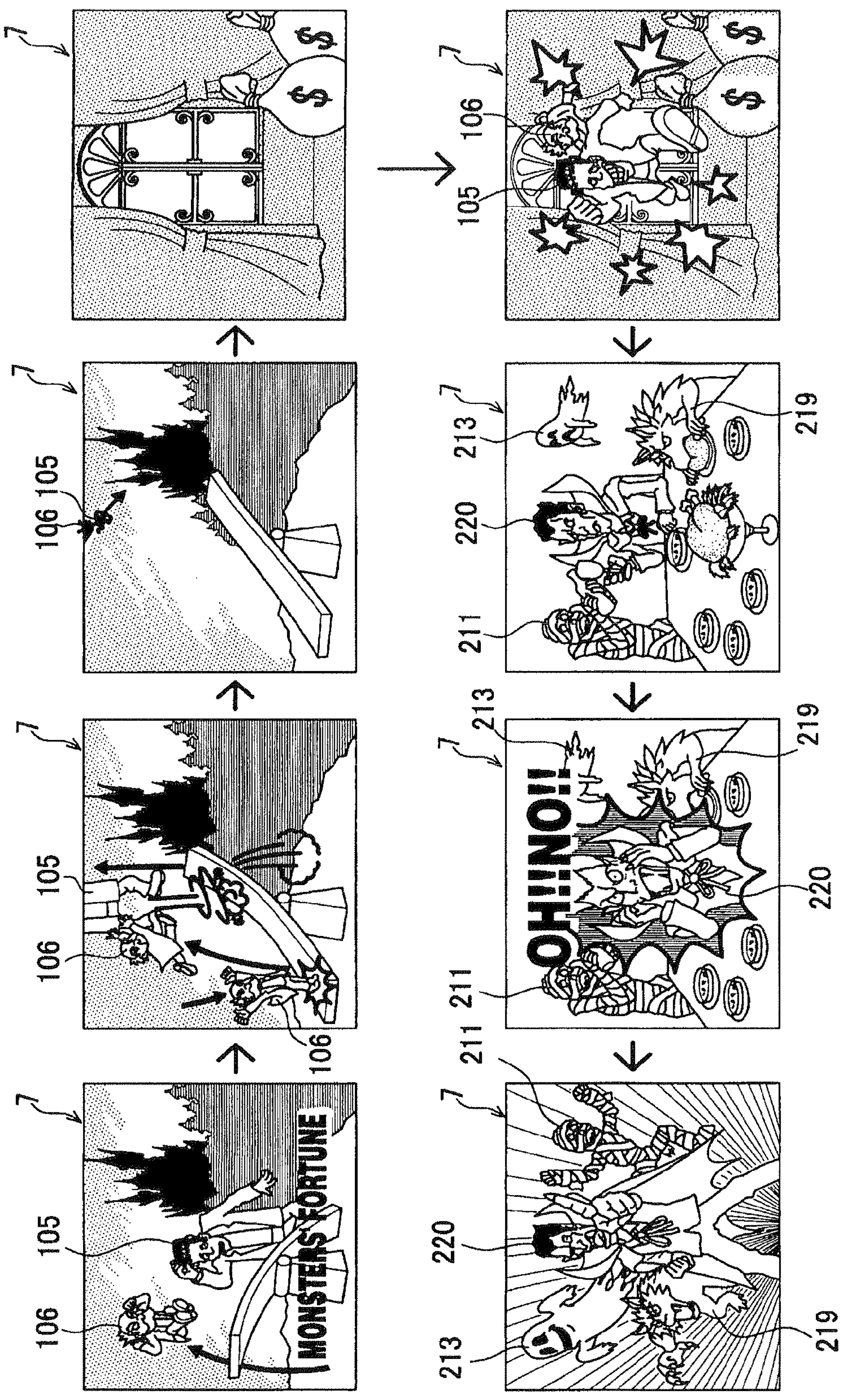
FIG. 37 is a view showing an example of image of an introductory effect to be displayed during a feature game with the slot machine.

When a game is shifted to the game mode of the feature game, the images of an introductory effect as shown in FIG. 37 are displayed on the upper image display panel 7 first. That is, in the upper image display panel 7, a noisy farce of a Western style animation is displayed as shown in FIG. 37, in which Frankenstein 105 and the doctor 106 break into the Dracula castle, causing an emergency alarm to go off, and then Dracula 220 instructs all the monsters (mummy man 211, ghost 213, wolf man 219) to capture Frankenstein 105 and the doctor 106.

<Basic Effect>

After the images of the introductory effects of FIG. 37 are displayed on the upper image display panel 7, the images of a basic effect as shown in FIGS. 38A1 to 38B2 are displayed on the lower image display panel 6 and the upper image display panel 7.

That is, as shown in FIG. 38A1, in the lower image display panel 6, the English letters of "MONSTERS' FORTUNE" indicating the feature game being in execution, the letters of "LOOK UP", which means "See the upper part.", for urging the game player to pay attention to the upper image display panel 7, and an up-arrow are displayed, and further an attack button 401 and a point acquisition display field 402 are displayed.

In this regard, the attack button 901 is a button which can be operated by the game player via the touch panel 11. The English letters of "GRAND", "MAJOR", "MINOR", and "MINI" which indicate the respective progressive jackpots of grand, major, minor, and mini, are displayed on the point acquisition display field 402 along with three white (or open) circles ("○"). On the other hand, in the upper image display panel 7, a scene where Frankenstein 105 carrying a treasure bag 403 and the doctor 106 are escaping in a corridor in the Dracula castle is displayed with the English letters of "MONSTERS' FORTUNE".

Subsequently, as shown in FIG. 38B2, while the blinking of the attack button 401 is displayed on the lower image display panel 6, the English letters of "MONSTERS' FORTUNE" are erased on the upper image display panel 7.

<Action Effect 1>

After the images of the basic effect of FIGS. 38A1 to 38B2 are displayed on the lower image display panel 6 and the upper image display panel 7, the images of an action effect as shown in FIGS. 39A1 to 40C2 may be displayed on the lower image display panel 6 and the upper image display panel 7.

That is, in the upper image display panel 7, when a scene of the mummy man 211 rushing at Frankenstein 105 and the doctor 106 who are escaping in the corridor of the Dracula castle is displayed as shown in FIGS. 39A2 and 39B2, the letters of "OPERATE FRANKEN TO DEFEAT ENEMY", which means "Operate Franken to defeat the enemy", are displayed for urging the game player to operate the attack button 401 of the lower image display panel 6, as shown in FIGS. 39C1 and 39C2. In the meantime, in the lower image display panel 6, the English letters of "MONSTERS' FORTUNE" indicating the feature game being in execution, the letters of "LOOKUP", which means "See the upper part," for urging the game player to pay attention to the upper image display panel 7, and an up-arrow are displayed as shown in FIGS. 39A1 and 39B1. When the letters of "OPERATE FRANKEN TO DEFEAT ENEMY" are displayed on the upper image display panel 7, the letters of "OPERATE FRANKEN TO DEFEAT ENEMY" for urging the game player to operate the attack button 401 and a down-arrow are displayed also on the lower image display panel 6 instead of the letters of "LOOK UP" for urging the game player to pay attention to the upper image display panel 7 and the up-arrow as shown in FIG. 39C1.

Subsequently, in the lower image display panel 6, when the attack button 401 is pressed as shown in FIG. 40A, the letters of "LOOK UP" for urging the game player to pay attention to the upper image display panel 7 and the up-arrow are displayed again, and simultaneously a scene of the attack button 401 discharging electricity is displayed instead of the letters of "OPERATE FRANKEN TO DEFEAT ENEMY" for urging the operation of the attack button 401 and the down-arrow as shown in FIGS. 40B1 and 40C2. On the other hand, in the upper image display panel 7, as shown in FIGS. 40A1, 40B1 and 40C1, a scene of the mummy man 211 punched and defeated by Frankenstein 105 is displayed.

<Action Effect 2>

After the images of the basic effect of FIGS. 38A1 to 38B2 are displayed on the lower image display panel 6 and the upper image display panel 7, the images of an action effect as shown in FIGS. 41A1 to 42C2 may be displayed on the lower image display panel 6 and the upper image display panel 7.

That is, in the upper image display panel 7, when a scene of the ghost 213 rushing at Frankenstein 105 and the doctor 106 who are escaping in the corridor of the Dracula castle is displayed as shown in FIGS. 41A2 and 41B2, the letters of "OPERATE FRANKEN TO DEFEAT ENEMY" for urging the game player to operate the attack button 401 of the lower image display panel 6 are displayed as shown in FIGS. 41C1 and 41C2. In the meantime, in the lower image display panel 6, the English letters of "MONSTERS' FORTUNE" indicating the feature game being in execution, the letters of "LOOK UP" for urging the game player to pay attention to the upper image display panel 7, and an up-arrow are displayed as shown in FIG. 41A1 and 41B1. When the letters of "OPERATE FRANKEN TO DEFEAT ENEMY" are displayed on the upper image display panel 7, the letters of "OPERATE FRANKEN TO DEFEAT ENEMY" for urging the game player to operate the attack button 401 and a down-arrow are displayed as shown in FIG. 41C1 also on the lower image display panel 6 instead of the letters of "LOOK UP" for urging the game player to pay attention to the upper image display panel 7 and the up-arrow.

Subsequently, in the lower image display panel 6, when the attack button 401 is pressed as shown in FIG. 42A1, the letters of "LOOK UP" for urging the game player to pay attention to the upper image display panel 7 and the up-arrow are displayed again as shown in FIGS. 42B1 and 42C1 instead of the letters of "OPERATE FRANKEN TO DEFEAT ENEMY" for urging the game player to operate the attack button 401 and the down-arrow, and simultaneously, a scene of the attack button 401 discharging electricity is displayed. On the other hand, in the upper image display panel 7, a scene of the ghost 213 punched and defeated by Frankenstein 105 is displayed as shown in FIGS. 42A2, 42B2, and 42C2.

<Action Effect 3>

After the images of the basic effect of FIGS. 38A1 to 38B2 are displayed on the lower image display panel 6 and the upper image display panel 7, the images of an action effect as shown in FIGS. 43A1 to 44C2 may be displayed on the lower image display panel 6 and the upper image display panel 7.

That is, in the upper image display panel 7, when a scene of the wolf man 219 rushing at Frankenstein 105 and the doctor 106 who are escaping in the corridor of the Dracula castle is displayed as shown in FIGS. 43A2 and 43B2, the letters of "OPERATE FRANKEN TO DEFEAT ENEMY" for urging the game player to operate the attack button 401 of the lower image display panel 6 are displayed as shown in FIG. 43C1. In the meantime, in the lower image display panel 6, the English letters of "MONSTERS' FORTUNE" indicating the feature game being in execution, the letters of "LOOK UP" for urging the game player to pay attention to the upper image display panel 7, and an up-arrow are displayed as shown in FIGS. 43A1 and 43B1. When the letters of "OPERATE FRANKEN TO DEFEAT ENEMY" is displayed on the upper image display panel 7, the letters of "OPERATE FRANKEN TO DEFEAT ENEMY" for urging the game player to operate the attack button 401 and a down-arrow are displayed as shown in FIG. 43C1 also on the lower image display panel 6 instead of the letters of "LOOK UP" for urging the game player to pay attention to the upper image display panel 7 and the up-arrow.

Subsequently, in the lower image display panel 6, when the attack button 401 is pressed as shown in FIG. 44A1, the letters of "LOOK UP" for urging the game player to pay attention to the upper image display panel 7 and the up-arrow are displayed again as shown in FIGS. 44B1 and 44C1 instead of the letters of "OPERATE FRANKEN TO DEFEAT ENEMY" for urging the game player to operate the attack button 401 and the down-arrow, and simultaneously, a scene of the attack button 401 discharging electricity is displayed. On the other hand, in the upper image display panel 7, a scene of the wolf man 219 punched and defeated by Frankenstein 105 is displayed as shown in FIGS. 44A2, 44B2 and 44C2.

<Action Effect 4>

After the images of the basic effect of FIGS. 38A1 to 38B2 are displayed on the lower image display panel 6 and the upper image display panel 7, the images of an action effect as shown in FIGS. 45A1 and 46C2 may be displayed on the lower image display panel 6 and the upper image display panel 7.

That is, in the upper image display panel 7, when a scene of Dracula 220 rushing at Frankenstein 105 and the doctor 106 who are escaping in the corridor of the Dracula castle is displayed as shown in FIGS. 45A2 and 45B2, the letters of "OPERATE FRANKEN TO DEFEAT ENEMY" for urging the game player to operate the attack button 401 of the lower image display panel 6 are displayed as shown in FIG. 45C1. In the meantime, in the lower image display panel 6, the English letters of "MONSTERS' FORTUNE" indicating the feature game being in execution, the letters of "LOOK UP" for urging the game player to pay attention to the upper image display panel 7, and an up-arrow are displayed as shown in FIGS. 45A1 and 45B1. When the letters of "OPERATE FRANKEN TO DEFEAT ENEMY" is displayed on the upper image display panel 7, the letters of "OPERATE FRANKEN TO DEFEAT ENEMY" for urging the game player to operate the attack button 401 and a down-arrow are displayed as shown in FIG. 45C1 also on the lower image display panel 6 instead of the letters of "LOOK UP" for urging the game player to pay attention to the upper image display panel 7 and the up-arrow.

Subsequently, in the lower image display panel 6, when the attack button 401 is pressed as shown in FIG. 46A1, the letters of "LOOK UP" for urging the game player to pay attention to the upper image display panel 7 and the up-arrow are displayed again as shown in FIGS. 46B1 and 46C1 instead of the letters of "OPERATE FRANKEN TO DEFEAT ENEMY" for urging the game player to operate the attack button 401 and the down-arrow, and simultaneously a state of the attack button 401 discharging electricity is displayed. On the other hand, a scene of Dracula 220 punched and defeated by Frankenstein 105 is displayed on the upper image display panel 7 as shown in FIGS. 46A2, 46B2, and 46C2.

<Point Acquisition Effect>

In the game mode of the feature game, when one of the respective action effects of FIGS. 39A1 to 46C2 are performed, one point is given to any one of the progressive jackpots of grand, major, minor, and mini by internal lottery. At this time, the images of a point acquisition effect are displayed on the lower image display panel 6 and the upper image display panel 7. As such an example, the images of the point acquisition effect displayed when one point is awarded to the grand progressive jackpot are shown in FIGS. 47A1 and 47A2.

That is, as shown in FIGS. 47A1 and 47A2, one of the white circles ("○") corresponding to "GRAND" in the point acquisition display field 402 is changed into a black (or closed) circle ("●") and displayed on the lower image display panel 6, while a scene of Frankenstein 105 carrying the treasure bag 403 and the doctor 106 who are escaping in the corridor of the Dracula castle is displayed on the upper image display panel 7. Simultaneously, "GRAND POINT" indicating that one point was given to the grand progressive jackpot is displayed.

When one point is awarded to each of the progressive jackpots of major, minor, and mini, the point acquisition effect is similarly performed.

In the game mode of the feature game, any one of the action effects of FIGS. 39A1 to 46C2 is repeatedly performed until three points are accumulated to any one of the progressive jackpots of grand, major, minor, and mini.

<Mini Progressive Jackpot Acquisition Effect>

When three points are awarded first to the mini progressive jackpot among the progressive jackpots of grand, major, minor, and mini, the mini progressive jackpot is obtained, and the images of a mini progressive jackpot acquisition effect as shown in FIGS. 48A1 to 48B2 are displayed on the lower image display panel 6 and the upper image display panel 7, whereby the game mode of the feature game is terminated.

That is, in the lower image display panel 6 as shown in FIG. 48A1, when all the three white circles ("○") corresponding to "MINI" in the point acquisition display field 402 are displayed in black circles ("●"), the English letters of "CON- GRATULATIONS!!" and the amount of payout ("$12345" in FIGS. 48B1 and 48B2) of the obtained mini progressive jackpot are displayed as shown in FIG. 48B1 instead of the attack button 401 and the point acquisition display field 402.

In addition, the number of white circles ("○") and black circles ("●") corresponding to "GRAND", "MAJOR", and "MINOR" in the point acquisition display field 402 shown in FIG. 48A1 indicates one example.

On the other hand, in the upper image display panel 7, a scene of Frankenstein 105 carrying the treasure bag 403 and the doctor 106 who are escaping in the corridor of the Dracula castle is displayed as shown in FIG. 48A2, and the English letters of "MINI JACKPOT WINNER" indicating the acquisition of the mini progressive jackpot are superimposed and displayed. Subsequently, a scene of Frankenstein 105 and the doctor 106 who snatch the treasure bag 403 and ride on a motorbike 404 to escape from the Dracula castle is displayed as shown in FIG. 48B2, and the English letters of "MINI JACKPOT WINNER", the English letters of "CONGRATULATIONS!!", and the mount of payout ("$12345" in FIG. 48B2) of the obtained mini progressive jackpot are displayed.

<Minor Progressive Jackpot Acquisition Effect>

When three points are given first to the minor progressive jackpot among the progressive jackpots of grand, major, minor, and mini, the minor progressive jackpot is obtained, and the images of a minor progressive jackpot acquisition effect as shown in the FIGS. 49A1 to 49B2 are displayed on the lower image display panel 6 and the upper image display panel 7.

That is, in the lower image display panel 6, when all the three white circles ("○") corresponding to "MINOR" in the point acquisition display field 402 are displayed in black circles ("●") as shown in FIG. 49A1, the English letters of "CONGRATULATIONS!!" and an amount of payout ("$123456" in FIG. 49B1) of the obtained minor progressive jackpot are displayed as shown in FIG. 49B1 instead of the attack button 401 and the point acquisition display field 402, and the game mode of the feature game is terminated.

In addition, the number of white circles ("○") and black circles ("●") corresponding to "GRAND", "MAJOR", and "MINI" in the point acquisition display field 402 shown in FIG. 49A1 indicates one example.

On the other hand, in the upper image display panel 7, a scene of Frankenstein 105 carrying the treasure bag 403 and the doctor 106 who are escaping in the corridor of the Dracula castle is displayed as shown in FIG. 49A2, and the English letters of "MINOR JACKPOT WINNER" indicating the acquisition of the minor progressive jackpot are superimposed and displayed. Subsequently, as shown in FIG. 49B2, a scene of Frankenstein 105 and the doctor 106 who snatch the treasure bag 403 and ride on the motorbike 404 to escape from the Dracula castle is displayed, and the English letters of "MINOR JACKPOT WINNER", the English letters of "CONGRATULATIONS!!", and the amount of payout ("$123456" in FIG. 49B2) of the gained minor progressive jackpot are displayed.

<Major Progressive Jackpot Acquisition Effect>

When three points are awarded first to the major progressive jackpot among the progressive jackpots of grand, major, minor, and mini, the major progressive jackpot is gained, and the images of a major progressive jackpot acquisition representation as shown in FIG. 50A1 are displayed on the lower image display panel 6 and the upper image display panel 7.

That is, in the lower image display panel 6, when all the three white circles ("○") corresponding to "MAJOR" in the point acquisition display field 402 are displayed in black circle ("●") as shown in FIG. 50A1, the English letters of "CONGRATULATIONS!!" and an amount of payout ("$1234567" in FIG. 50B1) of the obtained major progressive jackpot are displayed as shown in FIG. 50B1 instead of the attack button 401 and the point acquisition display field 402, and the game mode of the feature game is terminated.

In addition, the number of white circles ("○") and black circles ("●") corresponding to "GRAND", "MINOR", and "MINI" in the point acquisition display field 402 shown in FIG. 50A1 indicates one example.

On the other hand, in the upper image display panel 7, a scene of Frankenstein 105 carrying the treasure bag 403 and the doctor 106 who are escaping in the corridor of the Dracula castle is displayed as shown in FIG. 50A2, and the English letters of "MAJOR JACKPOT WINNER" indicating the acquisition of the major progressive jackpot are superimposed and displayed. Subsequently, a scene of Frankenstein 105 and the doctor 106 who are happy in front of a gold mine is displayed with pouring coins 405 as shown in FIG. 50B2, and the English letter of "MAJOR JACKPOT WINNER", the English letters of "CONGRATULATIONS!!", and the amount of payout ("$1234567" in FIG. 50B2) of the obtained major progressive jackpot are displayed.

<Grand Progressive Jackpot Acquisition Effect>

When three points are given first to the grand progressive jackpot among the progressive jackpots of grand, major, minor, and mini, the grand progressive jackpot is obtained, and the images of a grand progressive jackpot acquisition effect as shown in FIGS. 51A1 to 51B2 are displayed on the lower image display panel 6 and the upper image display panel 7.

That is, in the lower image display panel 6, when all the three white circles ("○") corresponding to "GRAND" in the point acquisition display field 402 are displayed in black circles ("●") as shown in FIG. 51A1, the English letters of "CONGRATULATIONS!!" and an amount of payout ("$12345678" in FIG. 51B1) of the obtained grand progressive jackpot are displayed as shown in FIG. 51B1 instead of the attack button 401 and the point acquisition display field 402, and the game mode of the feature game is terminated.

In addition, the number of white circles ("○") and black circles ("●") corresponding to "MAJOR", "MINOR", and "MINI" in the point acquisition display field 402 shown in FIG. 51A1 indicates one example.

On the other hand, in the upper image display panel 7, a state of Frankenstein 105 carrying the treasure bag 403 and the doctor 106 who escape in the passage of the Dracula castle is displayed as shown in FIG. 51A2, and the English letters of "GRAND JACKPOT WINNER" indicating the acquisition of the grand progressive jackpot are superimposed and displayed. Subsequently, a state of Frankenstein 105 and the doctor 106 who are happy in front of a gold mine is displayed with pouring coins 405 as shown in FIG. 51B2, and the English letter of GRAND JACKPOT WINNER", the English letters of "CONGRATULATIONS!!", and the amount of payout ("$12345678" in FIG. 51B2) of the obtained grand progressive jackpot are displayed.

Figure 52:
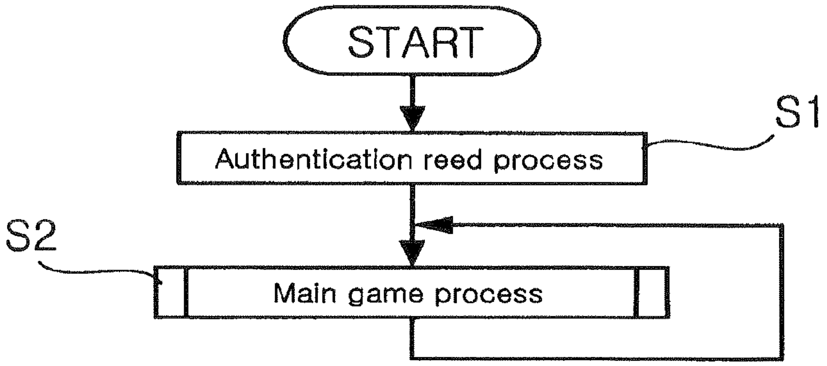
FIG. 52 is a view showing a flow chart of a main control program of the slot machine.

Next, a main control program for executing the game contents with the slot machine 1 according to the present embodiment is described in detail with reference to the drawings. FIG. 52 is a flowchart of the main control program.

In the slot machine 1, the memory card 53 is assumed to be already inserted in the card slot 53S of the gaming board 50, and the GAL 54 is assumed to be attached to the IC socket 54S.

First, when a power switch is turned on in the power supply unit 45 (application of power), the mother board 40 and the gaming board 50 are activated, and authentication read processing of step (hereinafter abbreviated as 'S') 1 is executed. In the authentication read processing, the mother board 40 and the gaming board 50 perform respectively separate processing in parallel.

That is, in the gaming board 50, the CPU 51 reads the preliminary authentication program stored in the boot ROM 52, and performs preliminary authentication in accordance with the read preliminary authentication program for confirming and certifying that the authentication program is not altered in advance before loading into the mother board 40.

On the other hand, in the mother board 40, the main CPU 41 executes the BIOS stored in the ROM 42 to decompress compressed data built into the BIOS into the RAM 43, and executes the BIOS decompressed in the RAM 43, the diagnoses and the initialization of the various peripheral devices.

Then, the main CPU 41 reads the authentication program stored in the ROM 55, and performs authentication for confirming and certifying that the game program stored in the memory card 53 inserted in the card slot 53S is not altered. When the authentication process is terminated normally, the main CPU 41 writes the game program subjected to the authentication (authenticated) and the like in the RAM 43, and acquires the payout rate setting data and the country identification information.

After performing the above processing, the main CPU 41 terminates the authentication read processing.

Then, in S2, the main CPU 41 reads sequentially from the RAM 43 the game program and the like authenticated by the authentication read processing in S1 to execute them, and performs the main game processing. At this time, each data relating to image representations read in the RAM 43 is transmitted to the graphic board 68 in advance. The game in the slot machine 1 according to the present embodiment is performed by executing the main game processing. Then, the main game processing is repeatedly executed while the power is supplied to the slot machine 1.

Figure 53:
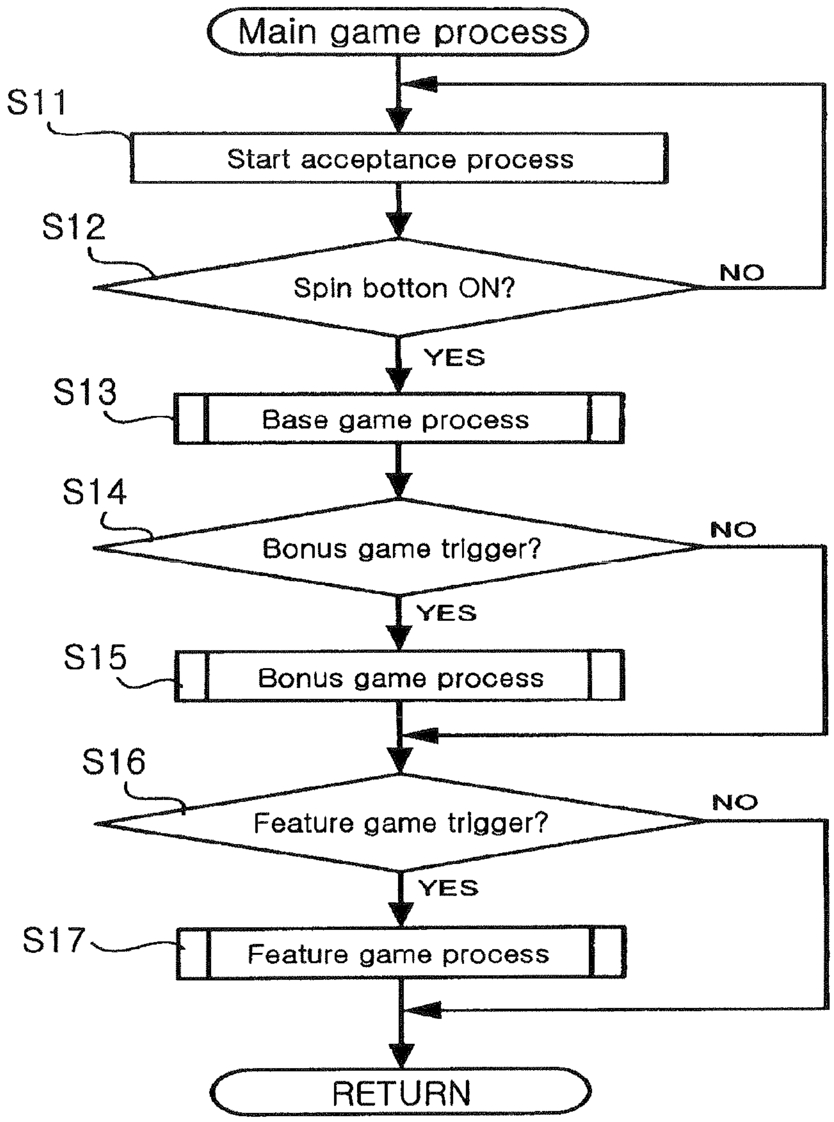
FIG. 53 is a view showing a flow chart of a main game process program of the slot machine.

Next, the main game process in S2 of FIG. 52 is described with reference to FIG. 53. FIG. 53 is a flowchart of the main game process program in the slot machine 1 according to the present embodiment. The program shown below in the flowchart of FIG. 53 is stored in the ROM 42 and the RAM 43 provided to the slot machine 1, and executed by the main CPU 41.

First, as shown in FIG. 53, the main CPU 41 performs predetermined initial settings in S11, and then performs start acceptance process for setting the insertion of coins, bet numbers for the respective pay lines L1 to L5, and the like. At this time, in the start acceptance process, the game player performs the insertion of coins and bet operations using the 1-BET button 16 and the maximum BET button 17.

Next, in S12, the main CPU 41 determines whether or not the spin button 13 is pressed. The determination whether or not the spin button 13 is pressed is made based on whether or not an input signal from the spin switch 13S is received.

When the spin button 13 is not pressed (S12: NO), the main CPU 41 returns to the start acceptance process (S11) again. Operations such as the correction of the bet number are enabled at this time.

On the other hand, when the spin button 13 is pressed (S12: YES), the bet numbers set to the respective pay lines L1 to L5 based on the operations of the 1-BET button 16 and the maximum BET button 17 are subtracted from an owned credit number, and the resultant number is stored in the RAM 43 as bet information.

Further, a credit number corresponding to a specified proportion among the bet numbers set to the respective pay lines L1 to L5 is added as each progressive jackpot, and the resultant number is stored in the RAM 43 as progressive jackpot information. The specified proportion changes depending on the kind of progressive jackpots (grand, major, minor, and mini), and becomes smaller in the order of the description.

Then, in S13, the main CPU 41 executes a base game process for performing the game using the video reels 5L, 5C, and 5R, and the like. The details of the base game process are to be described later.

Then, in S14, the CPU 41 determines whether or not a bonus game trigger is realized in the base game. Specifically, when the payout table of FIG. 7 is used, it is determined that the bonus game trigger is realized when three symbols of BONUS 112 are stopped and displayed on any one of pay lines L1 to L5.

Then, when it is determined that the bonus game trigger is realized (S14: YES), the main CPU 41 executes, in S15, a bonus game process for performing a game using the rectangular corner-framed parts 201 to 209 and the like. The details of the bonus game process are to be described later.

On the other hand, when it is determined that the bonus game trigger is not realized (S14: NO), or after the bonus game process of S15 is executed, the CPU 41 determines in S16 whether or not a feature game trigger is realized in the base game.

The determination is made based on a result of internal lottery executed in the base game process to be described later. Alternatively, the determination may be performed according to the symbol stopped and displayed in the base game.

Then, when it is determined that the feature game trigger is realized (S16: YES), the main CPU 41 executes, in S17, a feature game process for performing a game using the attack button 401 and the like. The details of the feature game process are to be described later.

On the other hand, when it is determined that the feature game trigger is not realized (S16: NO), or after the feature game process of S17 is executed, the CPU 41 executes this program again.

Figure 54:
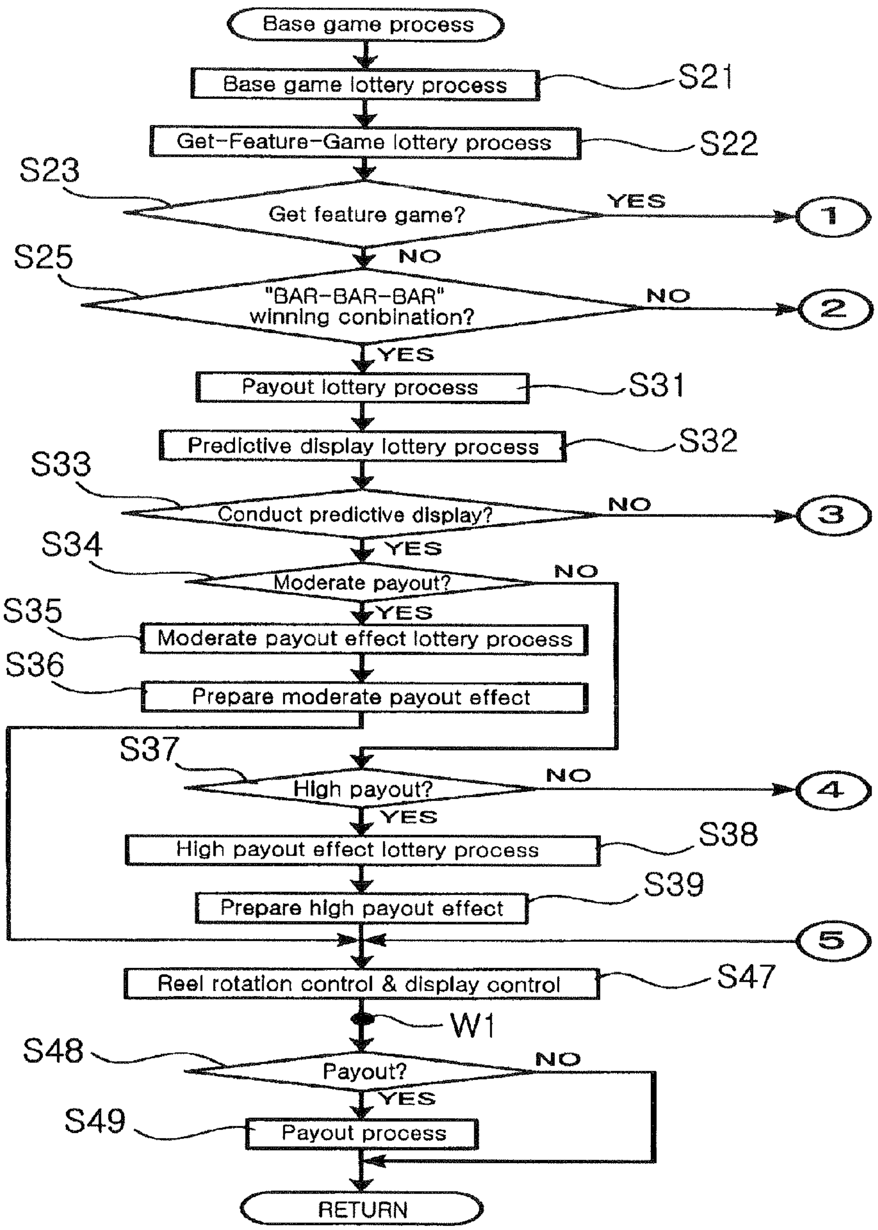
FIG. 54 is a view showing a flow chart of a base game process program of the slot machine.
Figure 55:
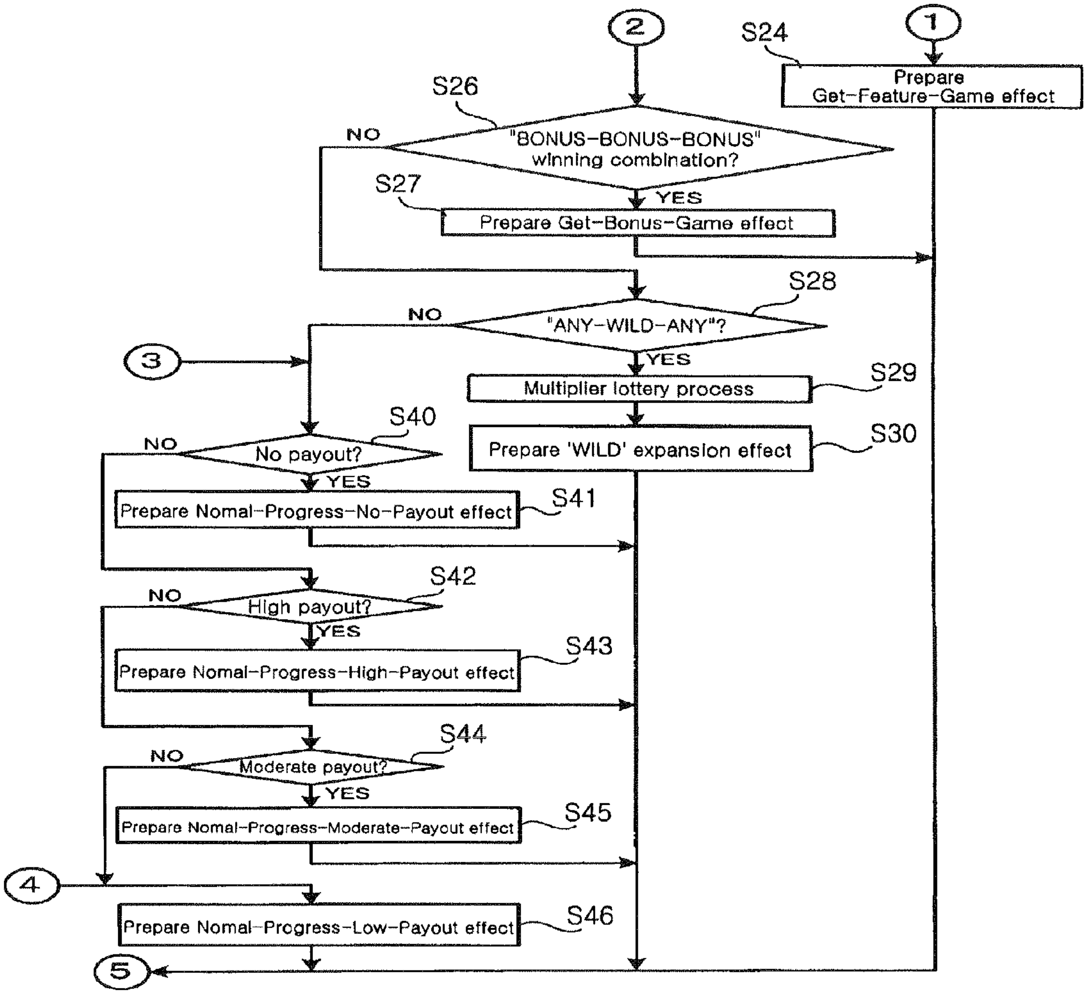
FIG. 55 is a view showing a flow chart of the base game process program of the slot machine.

Next, the base game process in S13 of FIG. 53 is described based on FIGS. 54 and 55. FIGS. 54 and 55 are the flowcharts of the base game process program in the slot machine 1 of the present embodiment. The program shown below in the flowcharts of FIGS. 54 and 55 is stored in the ROM 42 and the RAM 43 provided to the slot machine 1, and executed by the main CPU41.

First, as shown in FIG. 54, the main CPU 41 performs the base game lottery process in S21. Specifically, random number values corresponding to the respective three video reels 5L, 5C, and 5R are selected from a numeric value range of "0 to 255" by executing a program for random number generation included in a lottery program stored in the RAM 43. Then, the code numbers of the respective video reels 5L, 5C, and 5R are determined with reference to the symbol weighting data corresponding to the payout rate setting data and based on the selected three random number values. After the determined code numbers of the respective video reels 5L, 5C, and 5R are stored in the RAM 43, the main CPU 41 shifts to S22.

Here, since the code numbers of the respective video reels 5L, 5C, and 5R correspond to the code numbers of the symbols stopped and displayed on the pay line L1, combinations to be stopped and displayed on the respective pay lines L1 to L5 are determined when the main CPU 41 determines the code numbers of the respective video reels 5L, 5C, and 5R. Thus, a lottery related to the combinations in the game (refer to FIG. 7) is held by determining the code numbers of the respective video reels 5L, 5C, and 5R.

At this time, a payout in the case where the bet number corresponding to the combination stopped and displayed on any one of the pay lines L1 to L5 is "1" (refer to FIG. 7) is also stored in the RAM 43. However, for the combination of "BAR-BAR-BAR" (refer to FIG. 7), a payout of "20" is temporary stored in the RAM 43.

Then, in S22, the main CPU 41 performs feature game acquisition lottery process. Specifically, one random number value is selected from the numeric value range of "0 to 255" by executing the program for random number generation included in the lottery program stored in the RAM 43. Then, it is determined whether or not the feature game is obtained with reference to the symbol weighting data corresponding to the payout rate setting data and based on the one selected random number value. After the determined result is stored in the RAM 43, the main CPU 41 shifts to S23.

In S23, the main CPU 41 determines whether or not the feature game is obtained. The determination is made based on the determined result stored in the RAM 43 in S22. Here, when it is determined that the feature game is obtained (S23: YES), the main CPU 41 proceeds to S24 of FIG. 55 to issue a display preparation instruction for the feature game acquisition effects (refer to FIGS. 22A1 to 24C2) to the graphic board 68. Then, the main CPU 41 proceeds to S97 of FIG. 54 to be described later. On the other hand, in S23 of FIG. 54, when it is determined that the feature game is not obtained (S23: NO), the main CPU 41 proceeds to S25.

In S25, the main CPU 41 determines whether or not three symbols stopped and displayed along any one of the pay lines L1 to L5 are composed of the single BAR 117 (combination of "BAR-BAR-BAR" (refer to FIG. 7)). The determination is made based on the code numbers stored in the RAM 43 in S21. Here, when it is determined that the three symbols are not composed of the combination of "BAR-BAR-BAR" (refer to FIG. 7) (S25: NO), the main CPU 41 proceeds to S26 of FIG. 55.

In S26, the main CPU 41 determines whether or not the three symbols stopped and displayed on any one of the pay lines L1 to L5 are composed of BONUS 112 (combination of "BONUS-BONUS-BONUS" (refer to FIG. 7)). The determination is made based on the code numbers stored in the RAM 43 in S21. Here, when the three symbols are determined to be of the combination of "BONUS-BONUS-BONUS" (refer to FIG. 7) (S26: YES), the main CPU 41 proceeds to S27 to issue a display preparation instruction for the bonus game acquisition effects (refer to FIGS. 19A1 to 21D2) to the graphic board 68. Then, the main CPU 41 proceeds to S47 of FIG. 54 to be described later. On the other hand, in 526 of FIG. 55, when the three symbols are determined not to be composed of the combination of "BONUS-BONUS-BONUS" (refer to FIG. 7) (S26: NO), the main CPU 41 proceeds to S28.

In S28, the main CPU 41 determines whether or not the symbols stopped and displayed in the display window 10C include at least one WILD 111 ("ANY-WILD-ANY"). The determination is made based on the code numbers stored in the RAM 43 in S21. Here, when the symbols are determined to be "ANY-WILD-ANY" (S28: YES), the main CPU 41 proceeds to S29 to perform multiplication factor lottery process. Specifically, one random number value is selected from the numeric value range of "0 to 255" by executing the program for random number generation included in the lottery program stored in the RAM 43. Then, one of six kinds of multiplication factors (2×, 3×, 5×, 10×, 20×, and 100×) and a blank (an area where a multiplication factor does not exist) is determined with reference to the symbol weighting data corresponding to the payout rate setting data and based on the selected one random number value. After storing the determined result in the RAM 43, the main CPU 41 shifts to S30. In S30, the main CPU 41 issues a display preparation instruction for the wild expanded representation (refer to FIGS. 17A1 to 18D2) to the graphic board 68. Then, the main CPU 41 proceeds to S47 of FIG. 54 to be described later. On the other hand, when the symbols are determined not to be "ANY-WILD-ANY" (S28: NO), the main CPU 41 proceeds to S40 to be described later.

In S25 of FIG. 54, when the symbols are determined to be the combination of "BAR-BAR-BAR" (S25: YES) (refer to FIG. 7), the main CPU 41 proceeds to S31 to perform payout lottery processing. Specifically, one random number value is selected from the numeric value range of "0 to 25" by executing the program for random number generation included in the lottery program stored in the RAM 43. Then, one payout is determined from three types of payouts ("500", "80", and "20") with reference to the symbol weighting data corresponding to the payout rate setting data and based on the selected one random number value. After storing the determined result in the RAM 43, the main CPU 41 shifts to S32.

In S32, the main CPU 41 performs a predictive display lottery process. Specifically, one random number value is selected from the numeric value range of "0 to 255" by executing the program for random number generation included in the lottery program stored in the RAM 43. Then, based on the one selected random number value, the main CPU 41 determines whether or not to perform the predictive display. After storing the determined result in the RAM 43, the main CPU 41 shifts to S33.

In S33, the main CPU 41 determines whether or not to perform the predictive display. The determination is made based on the determined result stored in the RAM 43 in S32. Here, when it is determined not to perform the predictive display (S33: NO), the main CPU 41 proceeds to S40 of FIG. 55 to be described later. On the other hand, in S33 of FIG. 54, when it is determined to perform the predictive display (S33: YES), the main CPU 41 proceeds to S34.

In S34, the main CPU 41 determines whether or not the predictive display is for the moderate payout. In the determination, the predictive display is assumed to be the moderate payout when the determined result stored in the RAM 43 in S31 is the payout of "80". Here, when it is determined to be the moderate payout (S34: YES), the main CPU 41 proceeds to S35 to perform a moderate payout effect lottery process. Specifically, one random number value is selected from the numeric value range of "0 to 255" by executing the program for random number generation included in the lottery program stored in the RAM 43. Then, after determining one of the moderate payout representation with a door open (refer to FIGS. 13A1 to 13C1) and the moderate payout effect with mischievous expression (refer to FIGS. 15A1 to 15D1) based on the one selected random number value, the main CPU 41 shifts to S35.

In S35, the main CPU 41 issues a display preparation instruction to the graphic board 68 for either the moderate payout effect with a door open (refer to FIGS. 13A1 to 13C1) or the moderate payout effect with mischievous expression (refer to FIG. 15A1 to 15C1) determined in S34. Then, the main CPU 41 proceeds to S47 to be described later.

On the other hand, when it is determined not to be the moderate payout (S34: NO) in S34, the main CPU 41 proceeds to S37 to determine whether or not it is the high payout. In the determination, it is assumed to be the high payout when the determined result stored in the RAM 43 in S31 is the payout of "500". Here, when it is determined not to be the high payout (S37: NO), the main CPU 41 proceeds to S46 of FIG. 55 to be described later. On the other hand, when it is determined to be the high payout (S37: YES) in S37 of FIG. 54, the main CPU 41 proceeds to S38 to perform high payout effect lottery process. Specifically, one random number value is selected from the numeric value range of "0 to 255" by executing the program for random number generation included in the lottery program stored in the RAM 43. Then, after determining one of the high payout effect with a door open (refer to FIGS. 14A1 to 14C1) and the high payout effect with mischievous expression (refer to FIGS. 16A1 to 16C1) based on the one selected random number value, the main CPU 41 shifts to S39.

In S39, the main CPU 41 issues a display preparation instruction to the graphic board 68 for either the high payout effect with the door open (refer to FIG. 14) or the high payout effect with mischievous expression (refer to FIGS. 16A1 to 16D1) determined in S38. Then, the main CPU 41 proceeds to S47 to be described later.

When it is determined not to be "ANY-WILD-ANY" in S28 of FIG. 55 (S28: NO), or when it is determined not to perform the predictive display in S33 of FIG. 54 (S33: NO), the main CPU 41 proceeds to S40 of FIG. 55 to determine whether or not it is for a no-payout, as described above. The determination is made based on the payout stored in the RAM 43 in S21 and S31 of FIG. 54. In S40 of FIG. 55, when it is determined to be for the no-payout (S40: YES), the main CPU 41 proceeds to S41 to issue a display preparation instruction for the normal progress no-payout representation (refer to FIGS. 8A1 and 9C2) to the graphic board 68. Then, the main CPU 41 proceeds to S47 of FIG. 54 to be described later.

On the other hand, in 540 of FIG. 55, when it is determined to be not for the no-payout (S40: NO), the main CPU 41 proceeds to S42 to determine whether or not it is for the high payout. The determination of the high payout is made when the payout stored in the RAM 43 in S21 and S31 of FIG. 54 is any one of "1000", "500" and "100". When there are a plurality of payouts stored in the RAM 43 in S21 and S31 of FIG. 54, the determination is made based on the maximum payout. In S42 of FIG. 55, when it is determined to be the high payout (S42: YES), the main CPU proceeds to S43 to issue a display preparation instruction for the normal progress high-payout effect (refer to FIGS. 12A1 to 12C2) to the graphic board 68. Then, the main CPU 41 proceeds to S47 of FIG. 54 to be described later.

On the other hand, in S42 of FIG. 55, when it is determined not to be the high payout (S42: NO), the main CPU 41 proceeds to S44 to determine whether or not it is the moderate payout. The determination of the moderate payout is made when the payout stored in the RAM43 in S21 and S31 of FIG. 54 is any one of "80", "40" and "30". When there are a plurality of payouts stored in the RAM 43 in S21 and S31 of FIG. 54, the determination is made based on the maximum payout. In S44 of FIG. 55, when it is determined to be the moderate payout (S44: YES), the main CPU 41 proceeds to S45 to issue a display preparation instruction for the normal progress moderate-payout effect (refer to FIGS. 11A1 to 11C2) to the graphic board 68. Then, the main CPU 41 proceeds to S47 of FIG. 54 to be described later.

On the other hand, in S44 of FIG. 55, when it is determined not to be the moderate payout (S44: NO), the main CPU 41 proceeds to S46 to issue a display preparation instruction for the normal progress low-payout effect (refer to FIGS. 11A1 to 11C2) to the graphic board 68. Then, the main CPU 41 proceeds to S47 of FIG. 54 to be described later. At this time, the payout stored in the RAM 43 in S21 and in S31 of FIG. 54 is any one of "20", "15", "10", "5" and "2".

Then, in S47 of FIG. 54, the main CPU 41 instructs the graphic board 68 to perform reel rotation control and the display control. Specifically, in the display windows 10L, 10C, and 10R of the lower image display panel 6, after all the video reels 5L, 5C, and 5R start to rotate, the rotation of each of the video reels 5L, 5C, and 5R is stopped so that the combination of the symbols determined in the base game lottery process (S21) is stopped and displayed on the pay line L1. Simultaneously, an effect being determined to be a subject of the display preparation instruction (any one of S24, S27, S30, S35, S38, S41, S43, S45 and S46) is displayed on the lower image display panel 6 and the upper image display panel 7.

When the wild expansion effect (refer to FIGS. 17A1 to 18D2) is determined to be the subject of the display preparation instruction (S30), the symbol of WILD 111 stopped and displayed in the display window 100 is fully expanded and displayed in the display window 10C as shown in FIG. 18A1, and after the video reel 103 starts to rotate in the display window 102 of the lower image display panel 6 as shown in FIG. 18B1, 18C1, and 18D1, the rotation of the video reel 103 is stopped so that the multiplication factor or the blank determined in the multiplication factor lottery process (S29) is stopped and displayed on the left of the arrow 104.

Then, the main CPU 41 proceeds to S48 to determine whether or not there is a payout. The determination is made based on the payouts stored in the RAM 43 in the above S21 and S31. Here, when it is determined that there is the payout (S48: YES), the main CPU 41 proceeds to S49 to sum up the payouts stored in the RAM 43 in S21 and S31 and multiply the thus-summed amount by the bet number such that the product result is paid out to the game player. In this regard, when the wild expansion effect (refer to FIGS. 17A1 to 18D2) is determined to be the subject of the display preparation instruction (S30), the payouts stored in the RAM 43 in S21 are summed up after being increased by the multiplication factor determined in the multiplication factor lottery process (S29), and then multiplied by the bet number, excluding the case where the blank is determined in the multiplication factor lottery process (S29).

At this time, it is also possible to pay out coins corresponding to the credit number (one credit corresponds to one coin) according to the press action of the CASHOUT button 15, and also to pay out a ticket 25 with a bar code. Then, the main CPU 41 returns to the main game process of FIG. 53. On the other hand, when it is determined that there is no payout (S48: NO), the main CPU 41 returns to the main game process of FIG. 53 without doing anything.

Figure 56:
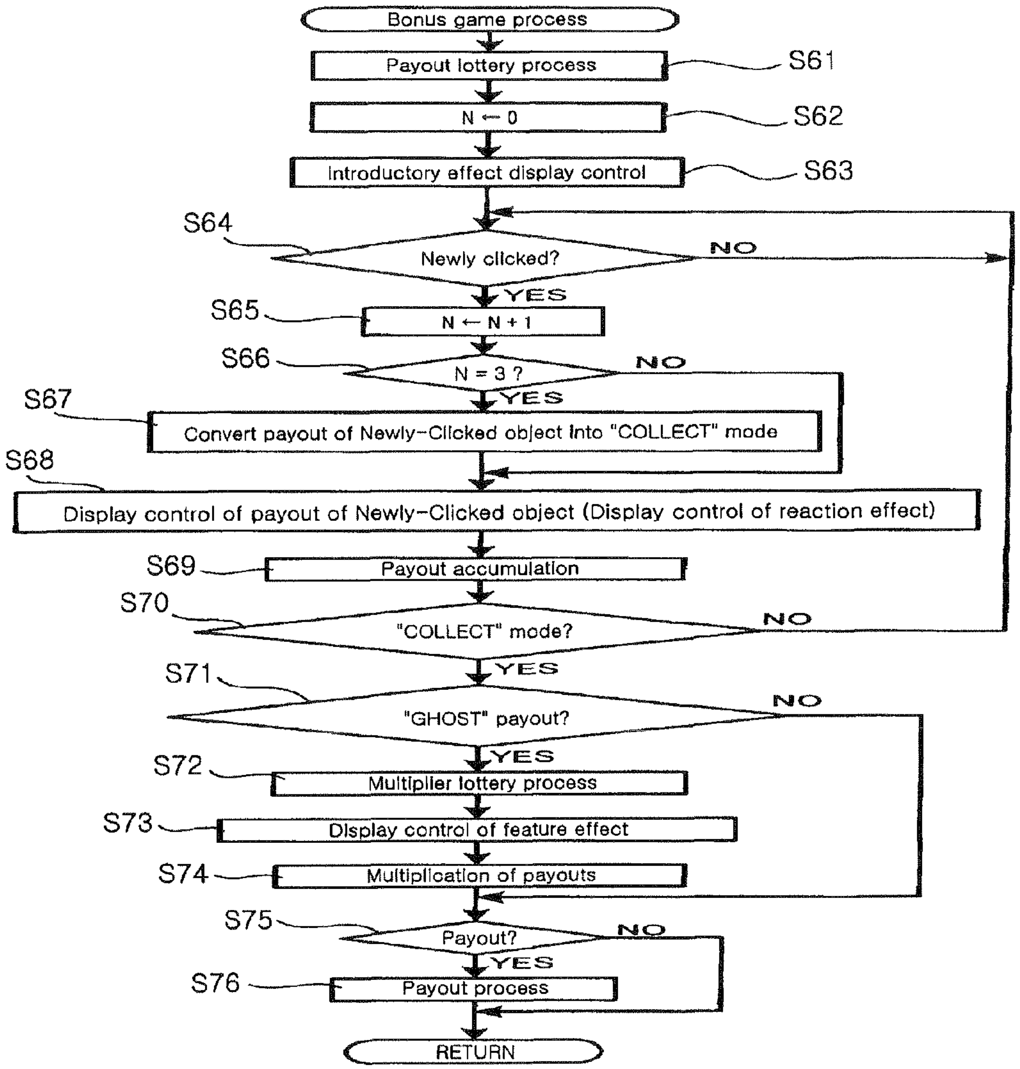
FIG. 56 is a view showing a flow chart of a bonus game process program of the slot machine.

Next, the bonus game processing in S15 of FIG. 53 is described based on FIG. 56. FIG. 56 is a flowchart of a bonus game process program in the slot machine 1 according to the present embodiment. The program shown below in a flowchart of FIG. 56 is stored in the ROM 42 and the RAM 43 provided to the slot machine 1, and executed by the main CPU 41.

First, as shown in FIG. 56, the main CPU 41 performs a payout lottery process in S61. Specifically, nine random number values are selected from the numeric value range of "0 to 255" by executing the program for random number generation included in the lottery program stored in the RAM 43. Then, one payout is determined for each of the nine rectangular frame parts 201 to 209 from four kinds ("+50", "+100", "+200", and "ghost") with reference to the symbol weighting data corresponding to the payout rate setting data and based on the selected nine random number values. After storing the determined results in the RAM 43, the main CPU 41 shifts to S62.

Figure 57:
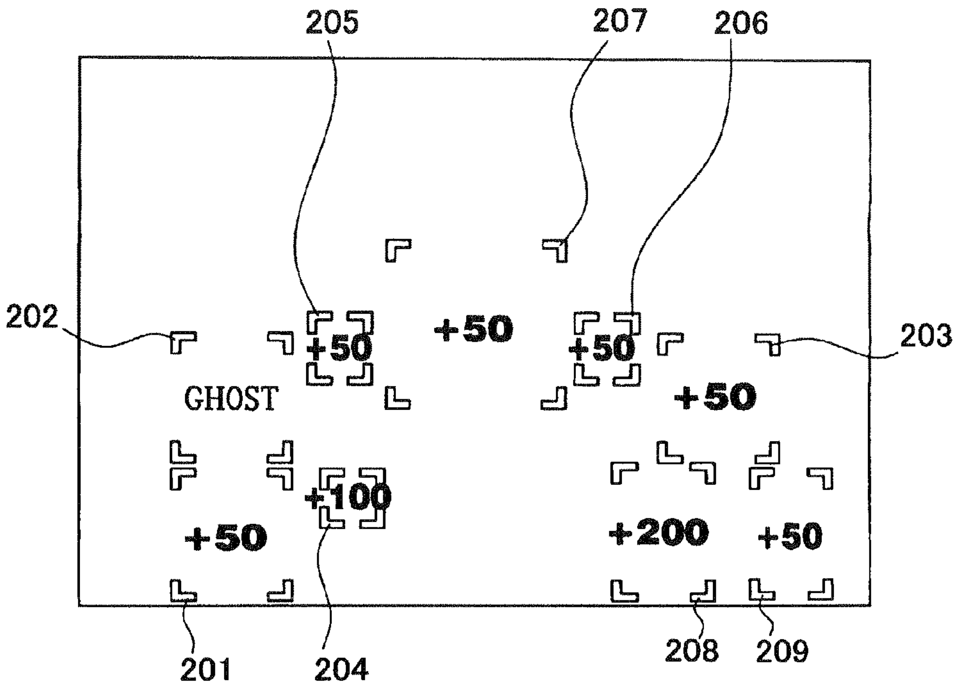
FIG. 57 is a conceptual view showing an example of result of a payout lottery of the bonus game process program of the slot machine.

A conceptual diagram of FIG. 57 shows an example of the determined results stored in the RAM43 at this time. The conceptual diagram of FIG. 57 shows that the payout for each of the four rectangular corner-framed parts 201, 203, 205, 206 and 209 is determined to be "+50", the payout for each of the rectangular corner-framed parts 204 and 207 is determined to be "+100", the payout for the rectangular corner-framed part 208 is determined to be "+200", and the payout for the rectangular corner-framed part 202 is determined to be the "ghost".

Here, the determined results as shown in the conceptual diagram of FIG. 57 are newly prepared by the payout lottery process in S61. In this regard, a plurality of determined results as shown in the conceptual diagram of FIG. 57 and having different contents may be prepared in advance to determine one of them to be used for the payout lottery process in S61.

Returning to FIG. 56, in S62, the main CPU 41 substitutes "0" for a variable: N secured in the RAM 43 (let N=0) as the number of times of clicking via the touch panel 11, and then proceeds to S63.

In S63, the main CPU 41 issues a display instruction for the introductory effect (refer to FIG. 25) to the graphic board 68, and then proceeds to S64. The introductory effect shown in FIG. 25 is thereby displayed on the lower image display panel 6 and the upper image display panel 7.

Figure 58A:
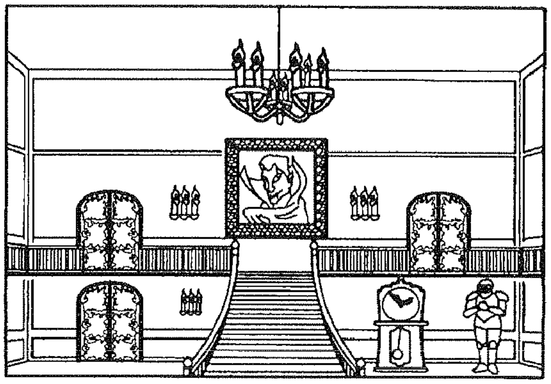
FIGS. 58A to 58D are views showing respective images constituting an introductory effect to be displayed in the bonus game with the slot machine.
Figure 58B:
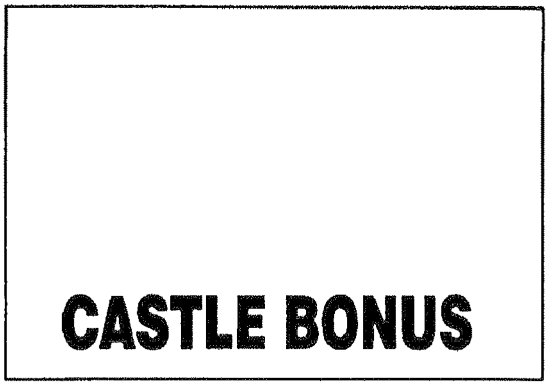
Figure 58C:
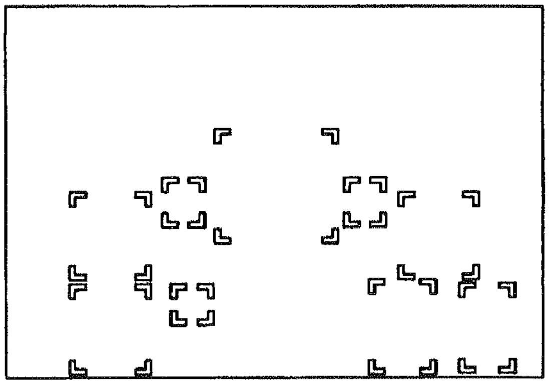
Figure 58D:
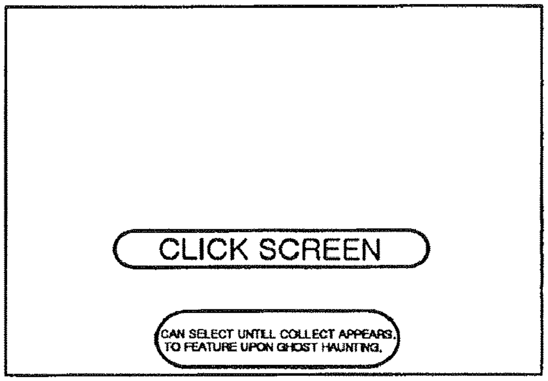

In this regard, in the introductory effect displayed on the lower image display panel 6, the letter image of "CASTLE BONUS" of FIG. 58B is superimposed and displayed on a scenery image of the entrance hall of the Dracula castle of FIG. 58A (refer to FIG. 25A1), the touch images of nine rectangular corner-framed parts 201 to 209 of FIG. 58C, and the indication images of "CLICK SCREEN" and "CAN SELECT UNTIL COLLECT APPEARS. TO FEATURE UPON GHOST HAUNTING." of FIG. 58D are superimposed and displayed (refer to FIG. 25B1).

Returning to FIG. 56, the main CPU 41 proceeds to S64 to determine whether or not there is a new click. The determination is made based on whether or not any one of the rectangular corner-framed parts 201 to 209 each displayed on the lower image display panel 6 is newly touched in accordance with the information from the touch panel 11. Here, when it is determined that there is no new click (S64: NO), the main CPU 41 returns to S64 to repeat this determination. On the other hand, when it is determined that there is a new click (S64: YES), the main CPU 41 proceeds to S65 to add "1" to the variable: N secured in the RAM 43, and then proceeds to S66.

Newly clicked information is also stored in the RAM 43 for each of the rectangular corner-framed parts 201 to 209 during the determination process in S64.

In S66, the main CPU 41 determines whether or not the variable: N secured in the RAM 43 is "3". When the variable: N secured in the RAM 43 is not "3" here (S66: NO), the main CPU 41 proceeds to S68 to cause the graphic board 68 to display a reaction effect corresponding to a newly clicked object (any one of three doors, three candles, one portrait, one clock, and one armor) in the rectangular corner-framed parts 201 to 209 on the lower image display panel 6, and simultaneously display a payout amount corresponding to the newly clicked object on the lower image display panel 6 while superimposing the payout on the rectangular corner-framed parts 201 to 209 subjected to the click. The display of the payout is made based on the determined result stored in the RAM 43 in S61 (refer to FIG. 57).

When any one of the doors being the objects of the rectangular corner-framed parts 201, 202 and 203 is newly clicked on the touch panel 11, each of the reaction effects as shown in FIGS. 30A1 to 30C2, 31A1 to 31C2, and 32A1 to 32C2, for example, is displayed on the lower image display panel 6 and the upper image display panel 7. When the candle being the object of the rectangular corner-framed part 204 is newly clicked from the touch panel 11, the reaction representation as shown in FIG. 33, for example, is displayed on the lower image display panel 6 and the upper image display panel 7. It is also the same when one of the candles being the objects of the rectangular corner-framed parts 205 and 206 is newly clicked from the touch panel 11. When the portrait being the object of the rectangular frame part 207 is newly clicked from the touch panel 11, the reaction effect as shown in FIGS. 34A1 to 34C2, for example, is displayed on the lower image display panel 6 and the upper image display panel 7. When the clock being the object of the rectangular corner-framed part 208 is newly clicked from the touch panel 11, the reaction effect as shown in FIGS. 35A1 to 35C2, for example, is displayed on the lower image display panel 6 and the upper image display panel 7. When the armor being the object of the rectangular corner-framed part 209 is newly clicked from the touch panel 11, the reaction effect as shown in FIGS. 36A1 to 36C2, for example, is displayed on the lower image display panel 6 and the upper image display panel 7.

Returning to FIG. 56, the main CPU 41 proceeds to S69 to sum up the payouts. Here, the payout corresponding to newly clicked one of the rectangular corner-framed parts 201 to 209 and the payouts corresponding to already clicked rectangular corner-framed parts 201 to 209 are summed up and stored in the RAM 43.

On the other hand, when the variable: N secured in the RAM 43 is determined to be "3" in S66 (S66: YES), the main CPU 41 proceeds to S67 to rewrite the payout corresponding to the newly clicked one of the rectangular corner-framed parts 201 to 209 from the determined result stored in the RAM 43 in S61 to "COLLECT". Then, the main CPU 41 executes the above S68 and S69.

Then, the main CPU 41 proceeds to S70 to determine whether or not the payout corresponding to the newly clicked one of the rectangular corner-framed parts 201 to 209 is "COLLECT". The determination is made based on the determined result stored in the RAM 43 in S61 or rewritten in S67. Here, when the payout corresponding to the newly clicked one of the rectangular corner-framed parts 201 to 209 is determined not to be "COLLECT" (S70: NO), the main CPU 41 returns to S64 and repeats the above process. On the other hand, when the payout corresponding to the newly clicked one of the rectangular corner-framed parts 201 to 209 is "COLLECT" (S70: YES), the main CPU 41 proceeds to S71. As a result, at the third click for the nine rectangular corner-framed parts 201 to 209, the payout of "COLLECT" is necessarily displayed on the lower image display panel 6, and the main CPU 41 inevitably proceeds to S71.

In S71, the main CPU 41 determines whether or not the "ghost" is assigned to any one of the rectangular corner-framed parts that have been clicked among the corner-framed parts 201 to 209. The determination is made based on the determined result stored in the RAM 43 in S61 or rewritten in S67. Here, when it is determined that no "ghost" is assigned to any one that has been clicked among the rectangular corner-framed parts 201 to 209 (S71: NO), the main CPU 41 proceeds to S75 to be described later. On the other hand, when it is determined that the "ghost" is assigned to at least one that has been clicked among the rectangular frame parts 201 to 209 (S72: YES), the main CPU 41 proceeds to S72.

In S72, the main CPU 41 performs the multiplication factor lottery process. Specifically, one random number value is selected from the numeric value range of "0 to 255" by executing the program for random number generation included in the lottery program stored in the RAM 43. Then, one of six kinds of multiplication factors (2×, 3×, 5×, 10×, 20×, and 100×) and a blank (an area where a multiplication factor is not assigned) is determined with reference to the symbol weighting data corresponding to the payout rate setting data and based on the selected one random number value. After storing the determined result in the RAM 43, the main CPU 41 shifts to S73. In S73, the main CPU 41 issues a display instruction for the feature effect (refer to FIGS. 29A1 to 29C2) to the graphic board 68, and then proceeds to S74. The feature effect shown in FIGS. 29A1 to 29C2 is thereby displayed on the lower image display panel 6 and the upper image display panel 7. At this time, in the display window 102 of the lower image display panel 6, after the video reel 103 starts to rotate, the rotation of the video reel 103 is stopped so that any one of the multiplication factors or the blank determined in the multiplication factor lottery process (S72) is stopped and displayed on the left position of the arrow 104 as shown in FIGS. 29A1, 29B1 and 29C1.

In S74, the main CPU 41 increases the payout stored in the RAM 43 in S69 by multiplying the number of payout by the multiplication factor determined in the multiplication factor lottery process (S72) unless the blank is determined in the multiplication factor lottery process (S72).

Then, the main CPU 41 proceeds to S75 to determine whether or not to conduct the payout. The determination is made based on the payout stored in the RAM 43 in S69 or in S74. Here, when it is determined to conduct the payout (S75: YES), the main CPU 41 proceeds to S76 and causes as many payouts as stored in the RAM 43 in S69 or in S74 to award the game player. At this time, it is also possible to pay out coins corresponding to the credit number (one credit corresponds to one coin) according to the press operation of the CASHOUT button 15, and to pay out a ticket 25 with a bar code. Then, the main CPU 41 returns to the main game process of FIG. 53. On the other hand, when it is determined not to conduct the payout (S75: NO), the main CPU 41 returns to the main game process of FIG. 53 without doing anything.

Figure 59:
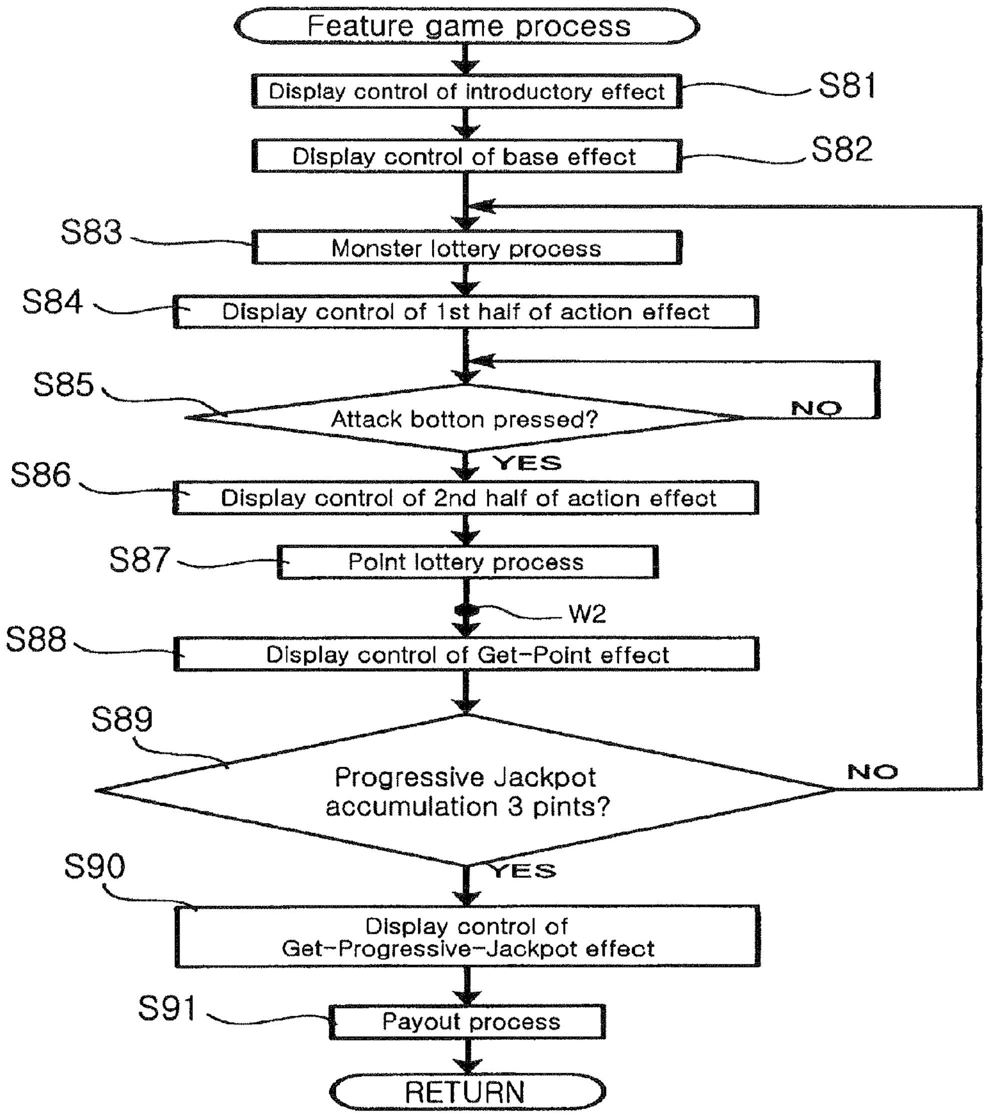
FIG. 59 is a view showing a flow chart of a feature game process program of the slot machine.

Next, the feature game process in S17 of FIG. 53 is described based on FIG. 59. FIG. 59 is a flowchart of a feature game process program in the slot machine 1 according to the present embodiment. The program shown below in the flowchart of FIG. 59 is stored in the ROM 42 and the RAM 43 provided to the slot machine 1, and executed by the main CPU 41.

First, as shown in FIG. 59, the main CPU 41 issues a display instruction for the introductory effect (refer to FIG. 37) to the graphic board 68 in S81, and then proceeds to S82. The introductory effect shown in FIG. 37 is thereby displayed on the upper image display panel 7.

In S82, the main CPU 41 issues a display instruction for the basic effect (refer to FIGS. 38A1 to 38B2) to the graphic board 68, and then proceeds to S83. The basic effect shown in FIG. 38 is thereby displayed on the lower image display panel 6 and the upper image display panel 7.

Figure 60A:
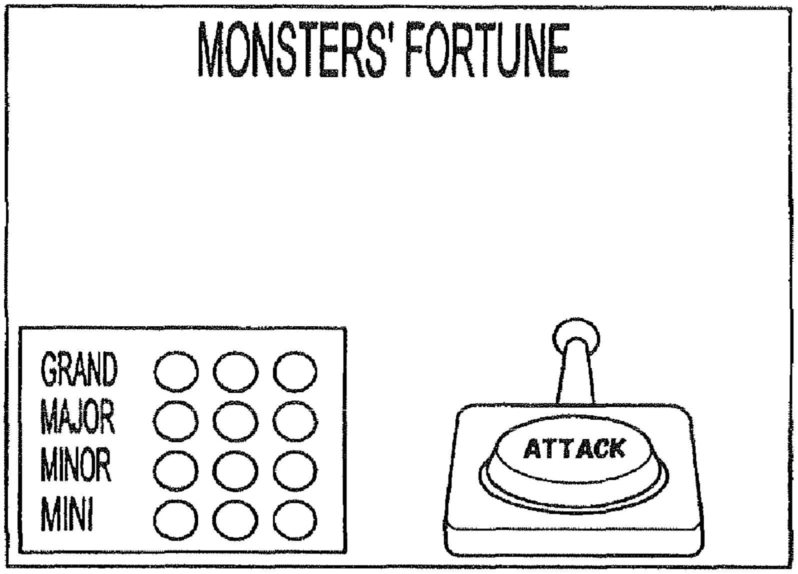
FIGS. 60A and 60B are views showing respective images constituting a basic effect to be displayed in the feature game with the slot machine.
Figure 60B:
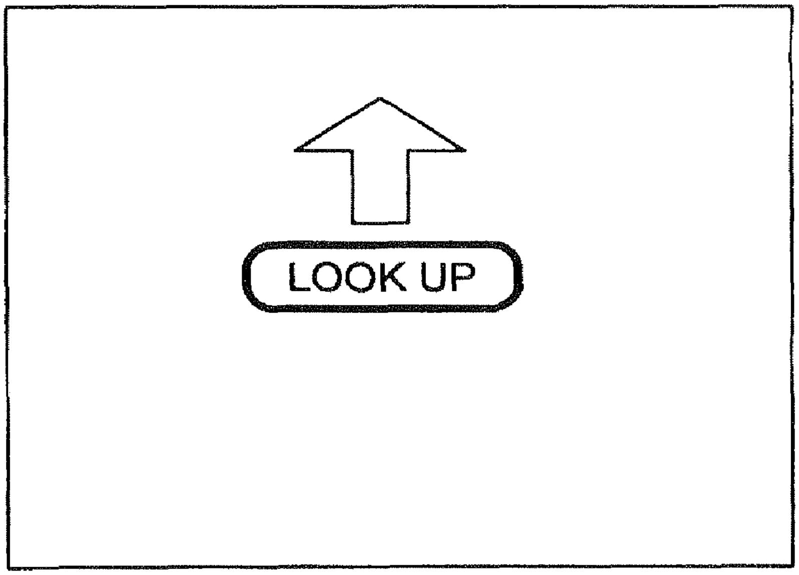

In this regard, in the basic effect displayed on the lower image display panel 6, the indication images of FIG. 60B, such as "LOOK UP", are superimposed and displayed on the images of the attack button 401 and the like of FIG. 60A (refer to FIGS. 38A1 and 38B1).

Returning to FIG. 59, the main CPU 41 performs a monster lottery process in S83. Specifically, one random number value is selected from the numeric value range of "0 to 255" by executing the program for random number generation included in the lottery program stored in the RAM 43. Then, based on the one selected random number value, one monster is determined from the four kinds of monsters (mummy man 211, ghost 213, wolf man 219, and Dracula 220). After storing the determined result in the RAM 43, the main CPU 41 shifts to S84. In S84, the main CPU 41 performs the first half display control of an action effect corresponding to the monster of the determined result stored in the RAM 43 in S83 via the graphic board 68.

In this regard, when the determined result stored in the RAM 43 in S83 is the mummy man 211, the action effect as shown in FIGS. 39A1 to 39B2, for example, is displayed on the lower image display panel 6 and the upper image display panel 7. When the determined result stored in the RAM 43 in S83 is the ghost 213, the action effect as shown in FIGS. 41A1 to 41C2, for example, is displayed on the lower image display panel 6 and the upper image display panel 7. When the determined result stored in the RAM 43 in S83 is the wolf man 219, the action effect as shown in FIGS. 43A1 to 43C2, for example, is displayed on the lower image display panel 6 and the upper image display panel 7. When the determined result stored in the RAM 43 in S83 is Dracula 220, the action effect as shown in FIGS. 45A1 to 45C2, for example, is displayed on the lower image display panel 6 and the upper image display panel 7.

Then, the main CPU 41 proceeds to S85 to determine whether or not the attack button 401 is pressed. The determination is made based on whether or not the attack button 401 displayed on the lower image display panel 6 is touched in accordance with the information from the touch panel 11. Here, when it is determined that the attack button 401 is not pressed (S85: NO), the main CPU 41 returns to S85, and waits until the attack button 401 is pressed. On the other hand, when it is determined that the attack button 401 is pressed (S85: YES), the main CPU 41 proceeds to S86.

In S86, the main CPU 41 performs the second half display control of the action effect corresponding to the monster of the determined result stored in the RAM 43 in S83 via the graphic board 68.

In this regard, when the determined result stored in the RAM 43 in S83 is the mummy man 211, the action effect as shown in FIGS. 40A1 to 40C2, for example, is displayed on the lower image display panel 6 and the upper image display panel 7. When the determined result stored in the RAM 43 in S83 is the ghost 213, the action effect as shown in FIGS. 42A1 to 42C2, for example, is displayed on the lower image display panel 6 and the upper image display panel 7. When the determined result stored in the RAM 43 in S83 is the wolf man 219, the action effect as shown in FIGS. 44A1 to 44C2, for example, is displayed on the lower image display panel 6 and the upper image display panel 7. When the determined result stored in the RAM 43 in S83 is Dracula 220, the action effect as shown in FIGS. 46A1 to 46C2, for example, is displayed on the lower image display panel 6 and the upper image display panel 7.

That is, for example, the data on the action effect shown in FIGS. 39A1 to 39C2 and 40A1 to 40C2 is divided in first half data up to FIGS. 39A1, 39A2, 39B1, 39B2, 39C1, and 39C2, and second half data up to FIGS. 40B1, 40B2, 40C1, and 40C2. The first half data up to FIGS. 39A1, 39A2, 39B1, 39B2, 39C1, and 39C2 is used in the first half display control of S84, and the second half data up to FIGS. 40B1, 40B2, 40C1, and 40C2 is used in the second half display control of S86. In addition, the display content of FIGS. 40A1 and 40A2 is the same as the display content of FIGS. 39C1 and 39C2, and illustrated in FIGS. 40A1 and 40A2 for convenience of description.

Figure 61A:
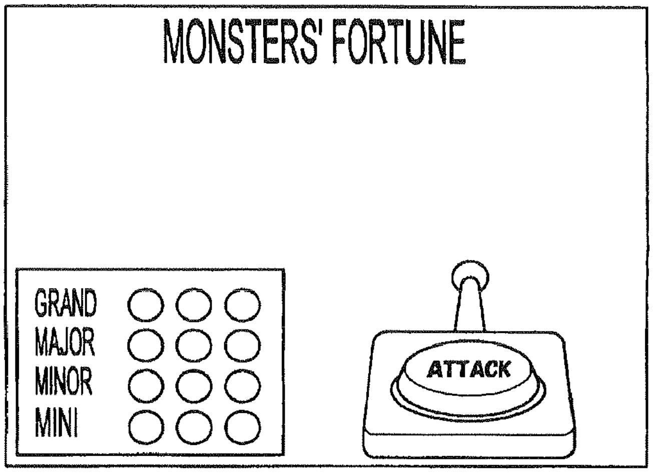
FIGS. 61A to 61C are views showing respective images on a lower image display panel constituting data of a first half of an action effect to be displayed in the feature game with the slot machine.
Figure 61B:
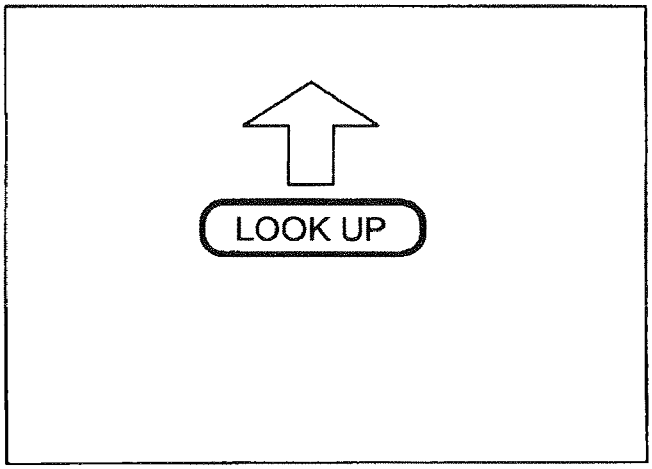
Figure 61C:
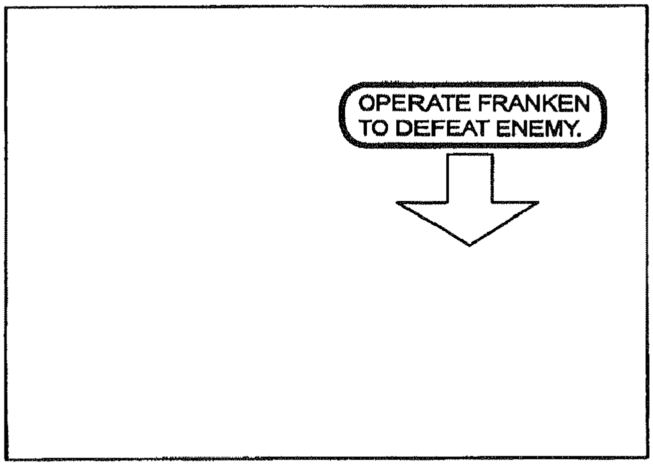
Figure 62A:
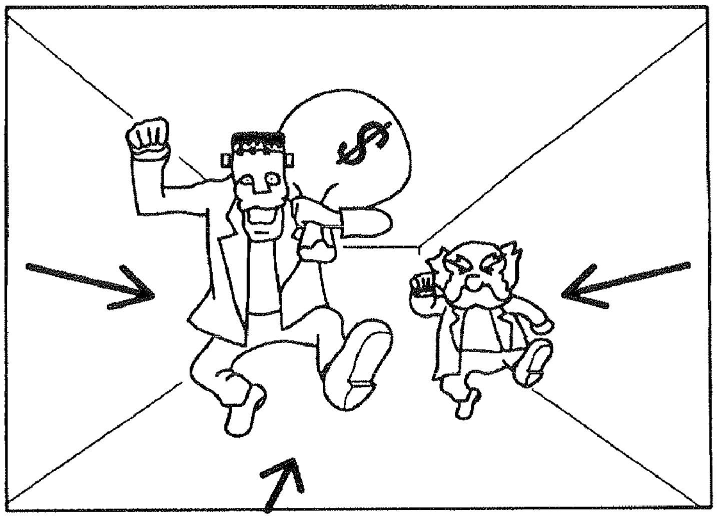
FIGS. 62A to 62C are views showing respective images on an upper image display panel constituting data of the first half of the action effect to be displayed in the feature game with the slot machine.
Figure 62B:
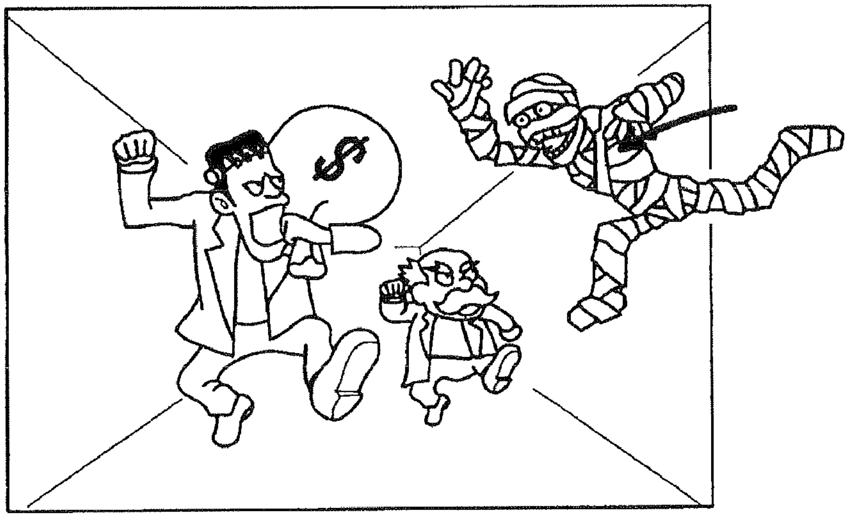
Figure 62C:
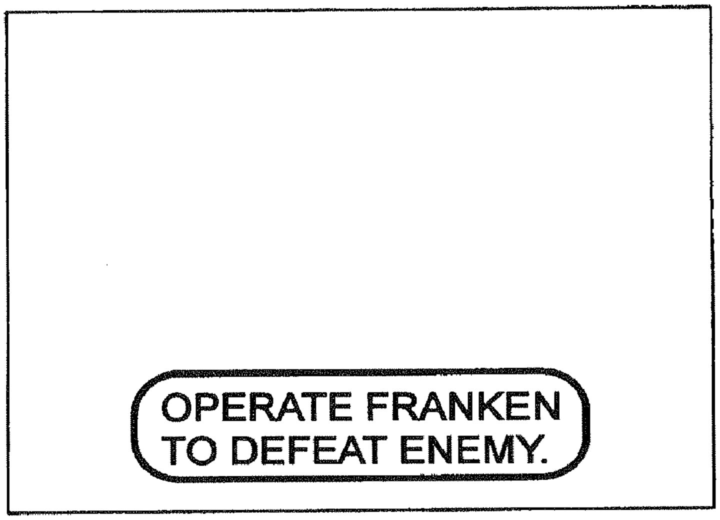

Then, in the first half data of the action effect displayed on the lower image display panel 6, the indication images of FIG. 61B, such as "LOOK UP", or the indication images of FIG. 61C, such as "OPERATE FRANKEN TO DEFEAT ENEMY", are superimposed and displayed on the images of the attack button 401 and the like of FIG. 61A (refer to FIGS. 39A1 to 39C1). On the other hand, in the first half data of the action effect displayed on the upper image display panel 7, including the images of Frankenstein 105 and the like of FIGS. 62A and 62B, the indication image of "OPERATE FRANKEN TO DEFEAT ENEMY" of FIG. 62C is superimposed and displayed on the image of Frankenstein 105 and the like of FIG. 62B (refer to FIG. 39C2)

Figure 63A:
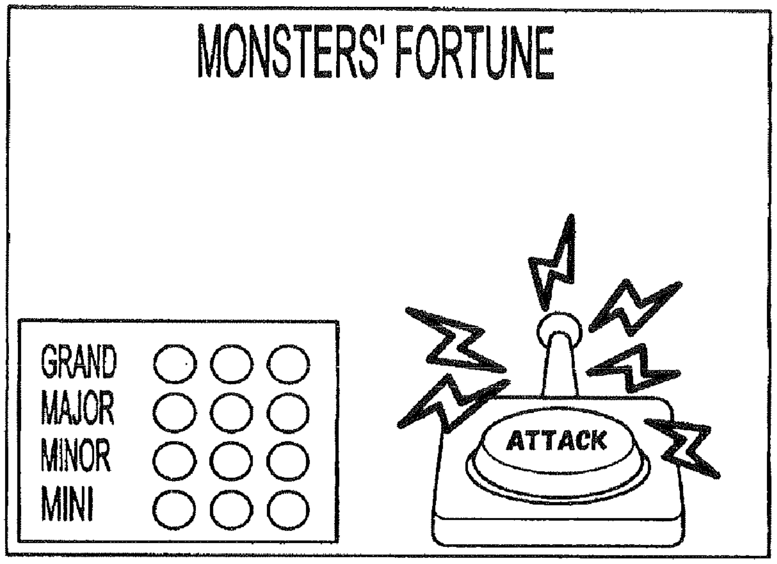
FIGS. 63A and 63B are views showing respective images on the lower image display panel constituting data of a second half of an action effect to be displayed in the feature game with the slot machine.
Figure 63B:
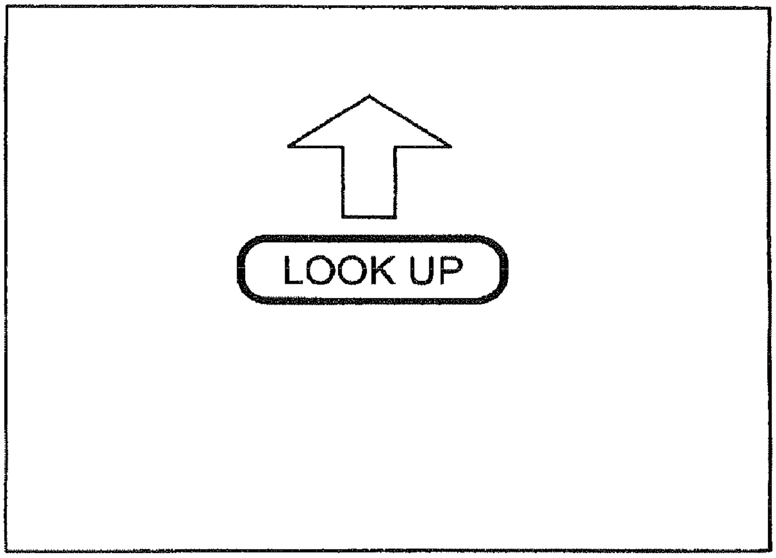
Figure 64A:
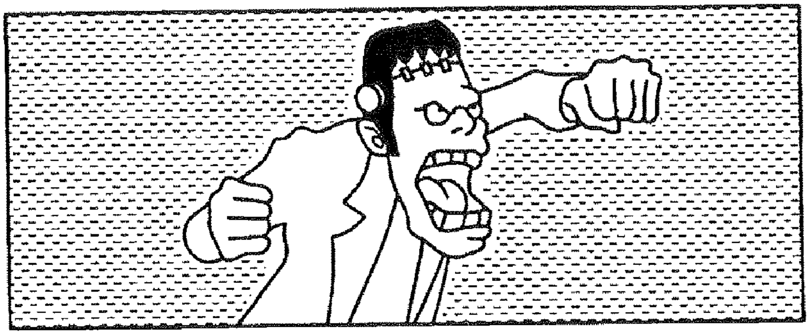
FIGS. 64A and 64B are views showing respective images on the upper image display panel constituting data of the second half of the action effect to be displayed in the feature game with the slot machine.
Figure 64B:
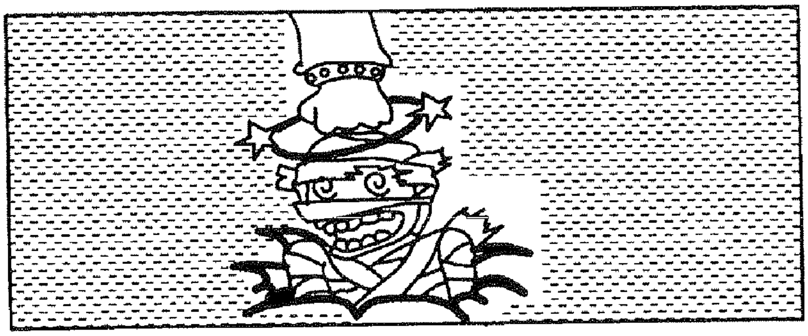

On the other hand, in the second half data of the action effect displayed on the lower image display panel 6, the indication images of FIG. 63B, such as "LOOK UP", is superimposed and displayed on the images of the attack button 401 and the like of FIG. 63A (refer to FIGS. 40B1 and 40C1). On the other hand, in the second half data of the action effect displayed on the upper image display panel 7, the image of Frankenstein 105 of FIG. 64A or the images of the mummy man 211 and the like of FIG. 64B are superimposed and displayed on the images of Frankenstein 105 and the like of FIG. 62A (refer to FIGS. 40B2 and 40C2)

Here, these aspects are applied in the same manner to the data on the action effect shown in FIGS. 41A1 to 42C2, the data on the action effect shown in FIGS. 43A1 to 44C2, and the data on the action effect shown in FIGS. 45A1 and 46C2.

Returning to FIG. 59, the main CPU 41 proceeds to S87, and performs a point lottery process. Specifically, one random number value is selected from the numeric value range of "0 to 255" by executing the program for random number generation included in the lottery program stored in the RAM 43. Then, one jackpot is determined from the four kinds of progressive jackpots (grand, major, minor, and mini) with reference to the symbol weighting data corresponding to the payout rate setting data and based on the selected one random number value. After storing the determined result in the RAM 43 also including the number of times of determination, the main CPU 41 shifts to S87.

In S88, the main CPU 41 performs the display control of the point acquisition effect (or get-point effect) corresponding to the progressive jackpot of the determined result stored in the RAM 43 in S87 via the graphic board 68. Specifically, when the progressive jackpot of the determined result stored in the RAM 43 in S87 is "grand", the point acquisition effect shown in FIG. 47 is displayed, for example, and one of the white circles ("○") corresponding to "GRAND" in the point acquisition display field 402 is changed into a black circle ("●") and displayed on the lower image display panel 6. On the other hand, a scene of Frankenstein 105 carrying the treasure bag 403 and the doctor 106 who are escaping in the corridor of the Dracula castle is displayed on the upper image display panel 7, and "GRAND POINT" indicating that one point is provided to the grand progressive jackpot is also displayed.

In addition, the display control of the point acquisition effect is similarly performed for any progressive jackpots of major, minor, and mini of the determined result stored in the RAM 43 in S87.

Then, the main CPU 41 proceeds to S89 to determine whether or not there is any progressive jackpot in which three points are accumulated. In the determination, it is determined that there is a progressive jackpot in which the three points are accumulated when the number of times of determination in the determined result stored in the RAM 43 in S87 reaches three with respect to the progressive jackpot. When there is the progressive jackpot in which the number of times of determination reaches three in the determined result stored in the RAM 43 in S87, at the time (in S88), all the three white circles ("○") corresponding to any one of "GRAND", "MAJOR", "MINOR", and "MINI" in the point acquisition display field 402 are changed into the black circles ("●") and displayed on the lower image display panel 6.

Here, when it is determined that there is no progressive jackpot in which three points are accumulated (S89: NO), the main CPU 41 returns to S83 and repeats the above processing. On the other hand, when it is determined that there is a progressive jackpot in which three points are accumulated (S89: YES), the main CPU 41 proceeds to S90.

In S90, the main CPU 41 performs, via the graphic board 68, the display control of the progressive jackpot acquisition effect corresponding to the kind of progressive jackpots (any one of grand, major, minor, and mini) determined that three points are saved (or accumulated) in S89. In this regard, when the progressive jackpot in which three points are accumulated is "mini", the images of the mini progressive jackpot acquisition effect of FIGS. 48A1 to 48B2, for example, are displayed on the lower image display panel 6 and the upper image display panel 7. When the progressive jackpot in which three points are accumulated is "minor", the images of the minor progressive jackpot acquisition effect of FIGS. 49A1 to 49B2, for example, are displayed on the lower image display panel 6 and the upper image display panel 7. When the progressive jackpot in which three points are accumulated is "major", the images of the major progressive jackpot acquisition effect of FIGS. 50A1 to 50B2, for example, are displayed on the lower image display panel 6 and the upper image display panel 7. When the progressive jackpot in which three points are accumulated is "grand", the images of grand progressive jackpot acquisition effect of FIGS. 51A1 to 51B2, for example, are displayed on the lower image display panel 6 and the upper image display panel 7.

Then, the main CPU 41 proceeds to S91 to make a payout corresponding to the kind of progressive jackpot (any one of grand, major, minor, and mini) determined that three points are accumulated in S89 to the game player. The payout is based on the progressive jackpot information stored in the RAM 43 in S12 of FIG. 53. At this time, it is also possible to pay out coins corresponding to the credit number (one credit corresponds to one coin) according to the press operation of the CASHOUT button 15, and to pay out a ticket 25 with a bar code. Then, the main CPU 41 returns to the main game process of FIG. 53.

Figure 65:
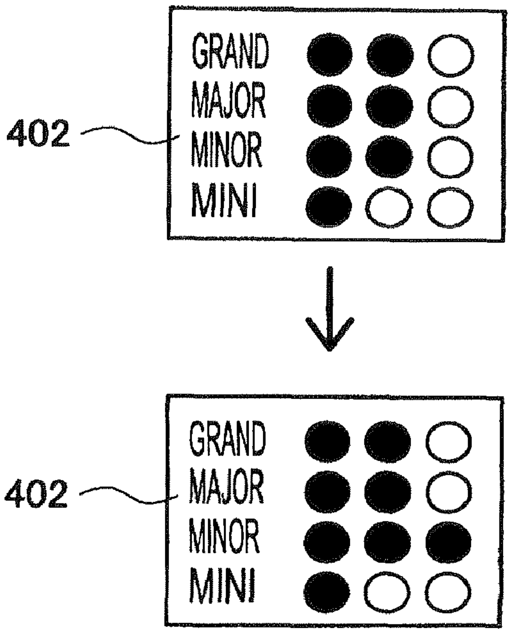
FIG. 65 is a view showing an example of point acquisition display column to be displayed during the feature game with the slot machine.
Figure 66:
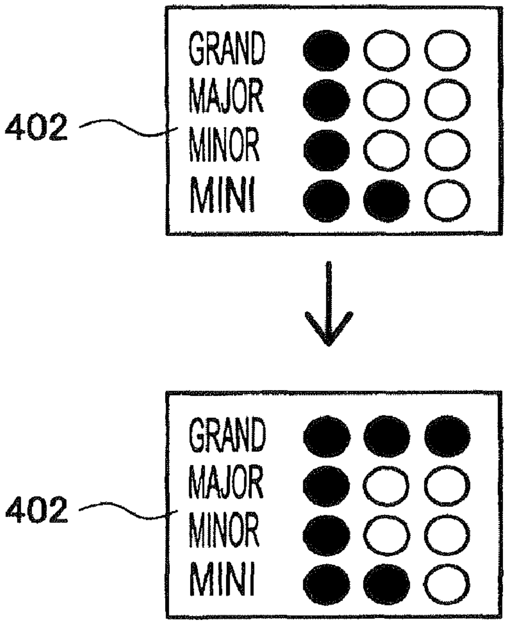
FIG. 66 is a view showing an example of point acquisition display column to be displayed during the feature game with the slot machine.
Figure 67:
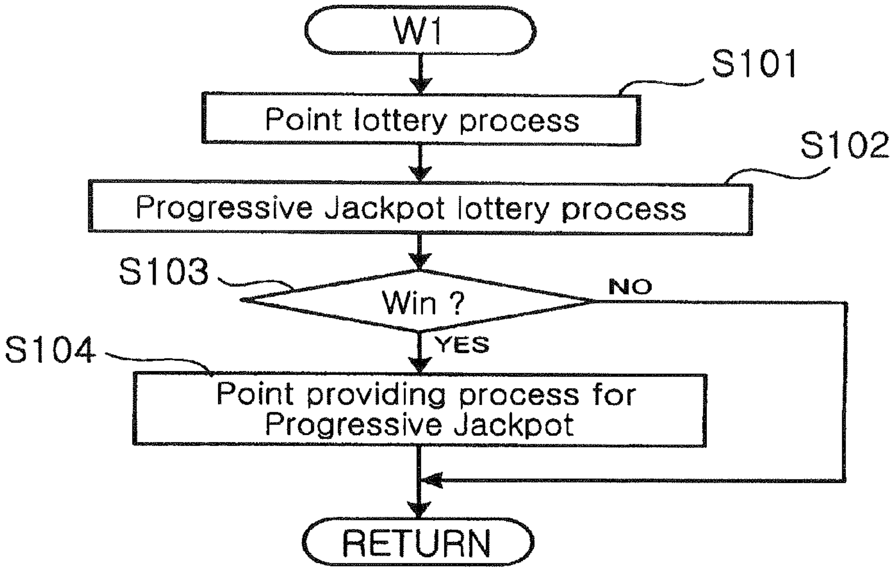
FIG. 67 is a view showing a flow chart of an additional part of a base game process program of the slot machine.
Figure 68:
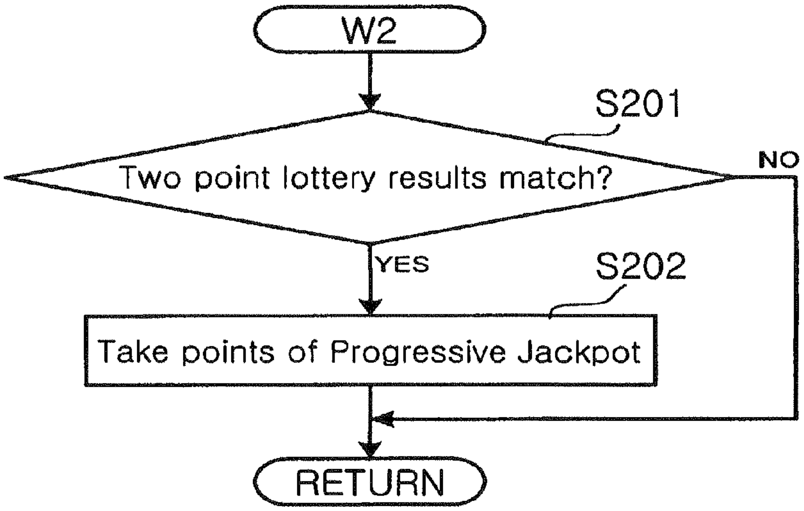
FIG. 68 is a view showing a flow chart of an additional part of a feature game process program of the slot machine.

Therefore, in the feature game executed by the feature game process of FIG. 59, three points may be accumulated first in the progressive jackpot of minor, for example, in such a case where two points are accumulated previously in the progressive jackpots of grand, major, and minor, respectively, as shown in FIG. 65. However, it is possible to accumulate one more point in the progressive jackpot of minor such that the game player may be disappointed because the player had expectation to get another point in the progressive jackpots of grand so as to get the high payout. On the other hand, as shown in FIG. 66, even though two points are accumulated in the progressive jackpot of mini, it is also possible to get two more points in progressive jackpot of grand such that three points are accumulated. Therefore, the player may enjoy such game development to have an exited feeling of satisfaction to cancel the previous disappointment.

As described above in detail, in the slot machine 1 according to the present embodiment, when the spin button 13 is pressed (S12: YES), the symbols are displayed variably and stopped in the display windows 10L, 10C, and 10R of the lower image display panel 6. When a combination of symbols stopped and displayed along any one of the five pay lines L1 to L5 is a predetermined combination at this time, a payout corresponding to the combination is awarded (S49, FIG. 7).

In this regard, the symbols are stopped and displayed in the display windows 10L, 10C, and 10R of the lower image display panel 6 by determining the code numbers of the symbols to be stopped and displayed along the pay line L1 in the base game lottery process (S21) performed as triggered by the input from the spin button 13.

When the three symbols of single BAR 117 are stopped and displayed along any one of the pay lines L1 to L5 at this time (S25: YES), one payout is determined from the three kinds of payouts ("500", "80", and "20") by performing successively the payout lottery process (S31) and an effect corresponding to the thus-determined payout level is determined (S35 or S38). For example, when "80" is determined as a payout (S34: YES) in the payout lottery process (S31), the moderate payout effect lottery process (S35) is performed to determine one of the moderate payout effect with a door open (refer to FIGS. 13A1 to 13C1) and the moderate payout effect with mischievous expression (refer to FIGS. 15A1 to 15D1), and the display preparation instruction for the determined moderate payout effect is issued (S36). When "500" is determined as a payout (S37: YES) by the payout lottery process (S31), the high payout effect lottery process (S38) is performed to determine one of the high payout effect with a door open (refer to FIGS. 14A1 to 14C1) and the high payout effect with mischievous expression (refer to FIGS. 16A1 to 16D1), and the display preparation instruction for the determined high payout effect is issued (S39). When "20" is determined as a payout (S34: NO and S37: NO) by the payout lottery process (S31), the display preparation instruction for the normal progress moderate-payout effect (refer to FIGS. 11A1 to 11C1) is issued (S45).

Then, the payout effect corresponding to each of the display preparation instructions (S36, S39, and S45) is displayed on the lower image display panel 6 when the symbols are variably displayed in the display windows 10L, 10C, and 10R of the lower image display panel 6 (S47).

That is, when the symbols are started to be displayed variably in the display windows 10L, 10C, and 10R of the lower image display panel 6, the moderate payout effect (refer to FIGS. 13A1 to 13C1 and 15A1 to 15D1) or the high payout effect (refer to FIGS. 14A1 to 14C1 and 16A1 to 16D1) is displayed simultaneously on the lower image display panel 6. In the moderate payout effect (refer to FIGS. 13A1 to 13C1 and 15A1 to 15D1) or the high payout effect (refer to FIGS. 14A1 to 14C1 and 16A1 to 14D1), the door 107 of the laboratory opens (refer to FIGS. 13B1 and 14B1), or the mischievous prank by the punches of Frankenstein 105 is made (refer to FIGS. 15B1 and 16B1) during the variable display of the symbols in the display windows 10L, 10C, and 10R of the lower image display panel 6. On the other hand, when the normal progress effect is displayed simultaneously on the lower image display panel 6, in the normal progress effect (refer to FIGS. 11A1 to 11C1), the state of the laboratory (door 107, Frankenstein 105, and the like) does not change (refer to FIG. 11B1) during the variable display of the symbols in the display windows 10L, 10C, and 10R of the lower image display panel 6. Therefore, the sign of a payout to be awarded according to the three symbols of single BAR 117 stopped and displayed along any one of the pay lines L1 to L5 can be displayed with the state of the door 107 of the laboratory and the action of Frankenstein 105 at a stage in which the symbols are still displayed variably in the display windows 10L, 10C, and 10R of the lower image display panel 6.

When the three symbols of single BAR 117 are stopped and displayed along any one of the pay lines L1 to L5 (S25: YES) and "80" is determined as a payout (S34: YES), there are two kinds of effects: the moderate payout effect with a door open (refer to FIGS. 13A1 to 13C1) and the moderate payout effect with mischievous expression (refer to FIGS. 15A1 to 15D1), displayed simultaneously with the variable display of the symbols in the display windows 10L, 10C, and 10R of the lower image display panel 6. When "500" is determined as a payout (S37: YES), there are two kinds of effects: the high payout effect with a door open (refer to FIGS. 14A1 to 14C1) and the high payout effect with mischievous expression (refer to FIGS. 16A1 to 16D1), displayed simultaneously with the variable display of the symbols in the display windows 10L, 10C, and 10R of the lower image display panel 6.

That is, there are two kinds of effects: the moderate payout effect with the door open (refer to FIGS. 13A1 to 13C1) and the moderate payout effect with mischievous expression (refer to FIGS. 15A1 to 15D1) for the payout of "80", and there are two kinds of effects: the high payout effect with the door open (refer to FIGS. 14A1 to 14C1) and the high payout effect with mischievous expression (refer to FIGS. 16A1 to 16C1) for the payout of "500". Thus, when the variable display of the symbols is started in the display windows 10L, 10C, and 10R of the lower image display panel 6, there are also two kinds of effects in the effects with the door 107 open in the laboratory and the effects with mischievous prank by Frankenstein 105, respectively (refer to FIGS. 13A1 to 13C1, 14A1 A1 to 14C1, 15A1 to 15D1, and 16A1 to 16D1).

Therefore, the sign of the payout to be awarded according to the three symbols of single BAR 117 stopped and displayed along any one of the pay lines L1 to L5 may be rich in variations thereof.

Also, when the three symbols of single BAR 117 are stopped and displayed along any one of the pay lines L1 to L5 (S25: YES), even if either "80" or "500" is determined as a payout, the moderate payout effect (refer to FIGS. 13A1 to 13C1 and 15A1 to 15D1) or the high payout effect (refer to FIGS. 14A1 to 14C1 and 16A1 to 16D1) may not be displayed on the lower image display panel 6 (S33: NO) depending on the lottery result of the predictive display lottery process (S32).

Thus, in addition to the moderate payout effect (refer to FIGS. 13A1 to 13C1 and 15A1 to 15D1), the high payout effect (refer to FIGS. 14A1 to 14C1 and 16A1 to 16D1), and the normal progress moderate-payout effect (refer to FIGS. 11A1 to 11C1), various kinds of effects displayed when the three symbols of single BAR 117 are not stopped and displayed along the pay lines L1 to L5 may also be performed, when the three symbols of single BAR 117 are stopped and displayed along any one of the pay lines L1 to L5. Therefore, the predictive effects may be rich in variations.

As described above, various embodiments and modified embodiments are explained, and in addition the following may be included in the scope of the present invention.

As described above, a gaming machine (e.g., slot machine 1) may comprises: a display device (e.g., lower image display panel 6) for displaying symbols variably and statically on a display screen thereof; a starting device (e.g., spin button 13) for an operation to start a variable display of the symbols on the display screen of the display device; a symbol combination determination device (e.g., main CPU 41, S21) for determining a combination of symbols to be displayed statically on the display screen of the display device based on a result of a first lottery as triggered by the operation of the starting device; and a payout provision device (e.g., main CPU 41, S49) for providing a payout corresponding to the determined combination of symbols. The gaming machine further comprises: a payout level determination device (e.g., main CPU 41, S31) for determining a payout level corresponding to each combination of symbols determined by the symbol combination determination device based on a result of a second lottery as triggered by the operation of the starting device; a storage device (e.g., video RAM 69) for storing a plurality of predictive effect images corresponding to respective payout levels determined by the payout level determination device; and the display control device (e.g., main CPU 41, graphic board 68, S47) for causing the display device to display on the display screen one predictive effect image of the predictive effect images corresponding to the payout level determined by the payout determination device by reading out the one predictive effect image from the storage device simultaneously with the variable display of the symbols.

Also, the gaming machine (e.g., slot machine 1) as described above, further comprises: a predictive effect permission device (e.g., main CPU 41, S33) for determining whether or not to display the predictive effect image stored in the storage device (e.g., video RAM 69) on the display screen of the display device (e.g., lower image display panel 6) based on a result of a third lottery.

The gaming machine (e.g., slot machine 1) as described above, further comprises: a predictive effect determination device (e.g., main CPU 41, S35, S38) for determining one predictive effect image to be displayed on the display screen of the display device (e.g., lower image display panel 6) among the plurality of predictive effect images corresponding to the payout level by determined by the payout level determination device (e.g., main CPU 41, S31) based on a result of a fourth lottery.

The gaming machine (e.g., slot machine 1) as described above is characterized in that the payout levels to be determined by the payout level determination device (e.g., main CPU 41, S31) are composed of three levels: high, moderate, and low levels corresponding to payout amounts to be awarded by the payout provision device (e.g., main CPU 41, S49).

That is, in a gaming machine according to the present invention, a combination of symbols displayed variably and statically on a display screen of the display device is determined based on a result of the first lottery as triggered by an operation of the starting device. The payout corresponding to the determined combination of symbols is provided. The payout level corresponding to the determined combination of symbols is determined based on a result of the second lottery as triggered by the operation of the starting device. One of the predictive effect images corresponding to the determined payout level is read out of the storage device and displayed on the display screen of the display device simultaneously with the variable display of the symbols. Therefore, it is possible to show a sign of payout to be provided with a payout amount in a very early stage.

The invention claimed is:

1. A gaming machine comprising:

a display device for displaying symbols variably and statically on a display screen;

a starting device for an operation to start a variable display of the symbols;

a storage device for storing a plurality of predictive effect images and a plurality of effect images, the plurality of predictive effect images corresponding to respective winning combinations; and a processor being operable to:

conduct an internal lottery to determine a combination of symbols to be displayed statically on the display screen as triggered by the operation of the starting device;

conduct a predictive display lottery after the conducting of the internal lottery to determine whether a predictive display is conducted or not;

select one of the plurality of predictive effect images when determining to conduct the predictive display in accordance with a result of the predictive display lottery;

cause the display device to display a selected one predictive effect image on the display screen as well as the variable display of symbols on the display screen, wherein the selected predictive effect image is associated with the combination of symbols to be displayed statically such that the winning combination may be expected before an operation to stop the variable display.

2. The gaming machine according to claim 1, wherein the processor is operable to:

select one of the plurality of effect images when determining not to conduct the predictive display in accordance with the result of the predictive display lottery; and cause the display device to display the selected effect image on the display screen as well as the variable display of symbols on the display screen.

3. The gaming machine according to claim 1, wherein the selected predictive effect image includes an effect image displayed before the operation to stop the variable display.

4. The gaming machine according to claim 1, wherein the plurality of predictive effect images individually correspond to a high payout, a moderate payout, or a low payout.

5. The gaming machine according to claim 1, wherein the selected predictive effect image indicates a corresponding winning combination to be displayed statically after stopping the variable display.

6. The gaming machine according to claim 1, wherein the predictive display is conducted when the combination of symbols to be displayed statically matches one of the winning combination of symbols.

7. The gaming machine according to claim 2, wherein the plurality of effect images correspond to respective winning combinations.

8. The gaming machine according to claim 2, wherein the selected effect image is different from the predictive effect images.

9. The gaming machine according to claim 2, wherein the plurality of effect images individually correspond to a normal progress low payout effect, a normal progress moderate payout effect, or a normal progress high payout effect.

* * * * *